(12) United States Patent
Cole

(10) Patent No.: US 12,547,391 B2
(45) Date of Patent: Feb. 10, 2026

(54) MOBILE APPLICATION UPDATES FOR ANALYTE DATA RECEIVING DEVICES

(71) Applicant: ABBOTT DIABETES CARE INC., Alameda, CA (US)

(72) Inventor: Jean-Pierre Cole, Tracy, CA (US)

(73) Assignee: ABBOTT DIABETES CARE INC., Alameda, CA (US)

( * ) Notice: Subject to any disclaimer, the term of this patent is extended or adjusted under 35 U.S.C. 154(b) by 0 days.

(21) Appl. No.: 17/956,380

(22) Filed: Sep. 29, 2022

(65) Prior Publication Data

US 2023/0096239 A1    Mar. 30, 2023

Related U.S. Application Data

(60) Provisional application No. 63/249,843, filed on Sep. 29, 2021.

(51) Int. Cl.
| | |
|---|---|
| *G06F 8/65* | (2018.01) |
| *H04W 4/80* | (2018.01) |
| *H04W 76/11* | (2018.01) |

(52) U.S. Cl.
CPC ............. *G06F 8/65* (2013.01); *H04W 4/80* (2018.02); *H04W 76/11* (2018.02)

(58) Field of Classification Search
CPC .......... G06F 8/65; H04W 4/80; H04W 76/11; G16H 10/60; G16H 40/40
See application file for complete search history.

(56) References Cited

U.S. PATENT DOCUMENTS

| | | |
|---|---|---|
| 4,561,443 A | 12/1985 | Hogrefe et al. |
| 5,390,671 A | 2/1995 | Lord et al. |

(Continued)

FOREIGN PATENT DOCUMENTS

| | | |
|---|---|---|
| DE | 202015010002 U1 | 12/2022 |
| EP | 2 407 094 | 1/2012 |

(Continued)

OTHER PUBLICATIONS

U.S. Appl. No. 60/614,683, filed Sep. 30, 2004, Brister, et al.

(Continued)

*Primary Examiner* — Daxin Wu
(74) *Attorney, Agent, or Firm* — Workman Nydegger

(57) ABSTRACT

Embodiments described herein include a method and system for updating a data receiving device for an analyte sensor by a computing device. The method includes receiving, by the computing device, an application update package including an update for an application installed on the computing device and a software or firmware update for the data receiving device. The application and the software or firmware are configured to communicate with or process data from the analyte sensor. The method includes establishing, by the computing device, a short-range wireless communication session with the data receiving device. The method includes transmitting, by the computing device, the software or firmware update for the data receiving device to the data receiving device through the short-range wireless communication session with the data receiving device. The method includes receiving, by the computing device, confirmation of installation of the software or firmware update by the data receiving device.

21 Claims, 35 Drawing Sheets

(56) References Cited

U.S. PATENT DOCUMENTS

| | | |
|---|---|---|
| 5,482,473 A | 1/1996 | Lord et al. |
| 5,660,163 A | 8/1997 | Schulman et al. |
| 5,690,119 A | 11/1997 | Rytky et al. |
| 6,096,268 A | 8/2000 | Inbar |
| 6,159,181 A | 12/2000 | Crossman et al. |
| 6,175,752 B1 | 1/2001 | Say et al. |
| 6,266,551 B1 | 7/2001 | Osadchy et al. |
| 6,293,925 B1 | 9/2001 | Safabash et al. |
| 6,298,255 B1 | 10/2001 | Cordero et al. |
| 6,560,471 B1 | 5/2003 | Heller et al. |
| 6,565,509 B1 | 5/2003 | Say et al. |
| 6,689,056 B1 | 2/2004 | Kilcoyne et al. |
| 6,695,860 B1 | 2/2004 | Ward et al. |
| 7,344,500 B2 | 3/2008 | Talbot et al. |
| 7,643,798 B2 | 1/2010 | Ljung |
| 7,693,485 B2 | 4/2010 | Parys |
| 8,401,194 B2 | 3/2013 | Nierzwick et al. |
| 9,000,914 B2 | 4/2015 | Baker et al. |
| 9,211,065 B2 | 12/2015 | Marsh et al. |
| 9,344,777 B2 | 5/2016 | He et al. |
| 9,647,990 B2 * | 5/2017 | Alonso Diaz .......... G16H 10/60 |
| 9,980,140 B1 | 5/2018 | Spencer et al. |
| 10,375,222 B2 | 8/2019 | Mandapaka et al. |
| 11,020,003 B2 * | 6/2021 | Eteminan ................ A61B 5/021 |
| 11,238,133 B1 * | 2/2022 | Brewer .................. G16H 20/17 |
| 11,563,812 B2 | 1/2023 | Sloan et al. |
| 11,991,175 B2 | 5/2024 | Rolfe et al. |
| 2002/0109621 A1 | 8/2002 | Khair et al. |
| 2003/0050009 A1 | 3/2003 | Kurisko et al. |
| 2003/0065536 A1 | 4/2003 | Hansen et al. |
| 2003/0100821 A1 | 5/2003 | Heller et al. |
| 2003/0144581 A1 | 7/2003 | Conn et al. |
| 2003/0153900 A1 | 8/2003 | Aceti et al. |
| 2004/0106860 A1 | 6/2004 | Say et al. |
| 2004/0117204 A1 | 6/2004 | Mazar et al. |
| 2004/0122353 A1 | 6/2004 | Shahmirian et al. |
| 2004/0127958 A1 | 7/2004 | Mazar et al. |
| 2004/0133164 A1 | 7/2004 | Funderburk et al. |
| 2005/0027463 A1 | 2/2005 | Goode, Jr. et al. |
| 2005/0049501 A1 | 3/2005 | Conero et al. |
| 2005/0101912 A1 | 5/2005 | Faust et al. |
| 2005/0177398 A1 | 8/2005 | Watanabe et al. |
| 2005/0204134 A1 | 9/2005 | Von Arx et al. |
| 2005/0240245 A1 | 10/2005 | Bange et al. |
| 2005/0242479 A1 | 11/2005 | Petisce et al. |
| 2005/0261563 A1 | 11/2005 | Zhou et al. |
| 2005/0283114 A1 | 12/2005 | Bresina et al. |
| 2006/0016700 A1 | 1/2006 | Brister et al. |
| 2006/0019327 A1 | 1/2006 | Brister et al. |
| 2006/0025663 A1 | 2/2006 | Talbot et al. |
| 2006/0081469 A1 | 4/2006 | Lee |
| 2007/0038044 A1 | 2/2007 | Dobbles et al. |
| 2007/0043279 A1 | 2/2007 | Mannheimer et al. |
| 2007/0060801 A1 | 3/2007 | Neinast |
| 2007/0073129 A1 | 3/2007 | Shah et al. |
| 2007/0142727 A1 | 6/2007 | Zhang et al. |
| 2007/0173710 A1 | 7/2007 | Petisce et al. |
| 2007/0219480 A1 | 9/2007 | Kamen et al. |
| 2007/0288265 A1 | 12/2007 | Quinian et al. |
| 2008/0009805 A1 | 1/2008 | Ethelfeld |
| 2008/0097246 A1 | 4/2008 | Stafford |
| 2008/0129486 A1 | 6/2008 | Jeckelmann et al. |
| 2008/0139910 A1 * | 6/2008 | Mastrototaro .......... G16H 20/13 600/365 |
| 2008/0269687 A1 | 10/2008 | Chong et al. |
| 2008/0275313 A1 | 11/2008 | Brister et al. |
| 2008/0278333 A1 | 11/2008 | Fennell et al. |
| 2008/0300476 A1 | 12/2008 | Stafford |
| 2008/0312512 A1 | 12/2008 | Brukalo et al. |
| 2008/0319414 A1 | 12/2008 | Yodfat et al. |
| 2009/0112626 A1 * | 4/2009 | Talbot .................... G16H 40/67 600/300 |
| 2009/0240193 A1 | 9/2009 | Mensinger et al. |
| 2010/0014626 A1 | 1/2010 | Fennell et al. |
| 2010/0045425 A1 | 2/2010 | Chivallier |
| 2010/0198034 A1 | 8/2010 | Thomas et al. |
| 2010/0198142 A1 | 8/2010 | Sloan et al. |
| 2010/0230285 A1 | 9/2010 | Hoss et al. |
| 2010/0274218 A1 | 10/2010 | Yodfat et al. |
| 2010/0302979 A1 | 12/2010 | Reunamäki |
| 2010/0327063 A1 | 12/2010 | Medina et al. |
| 2011/0125000 A1 | 5/2011 | Rantala |
| 2011/0177780 A1 | 7/2011 | Sato et al. |
| 2011/0193704 A1 | 8/2011 | Harper et al. |
| 2011/0213225 A1 | 9/2011 | Bernstein et al. |
| 2011/0282671 A1 | 11/2011 | Dicks et al. |
| 2011/0320130 A1 | 12/2011 | Valdes et al. |
| 2012/0003933 A1 | 1/2012 | Baker et al. |
| 2012/0078071 A1 | 3/2012 | Bohm et al. |
| 2012/0096451 A1 * | 4/2012 | Tenbarge ................ G16H 40/40 717/170 |
| 2012/0123227 A1 | 5/2012 | Sun et al. |
| 2012/0182917 A1 | 7/2012 | Edlund |
| 2012/0237022 A1 | 9/2012 | Berson et al. |
| 2012/0255875 A1 | 10/2012 | Vicente et al. |
| 2012/0260323 A1 | 10/2012 | San Vicente et al. |
| 2012/0265035 A1 | 10/2012 | Bohm et al. |
| 2013/0078912 A1 | 3/2013 | San Vicente et al. |
| 2013/0310896 A1 | 11/2013 | Mass |
| 2014/0096264 A1 * | 4/2014 | Root ...................... A61B 5/14532 726/27 |
| 2014/0167974 A1 * | 6/2014 | Pontin .................... G01D 4/002 340/870.02 |
| 2014/0247140 A1 * | 9/2014 | Proud .................... A61B 90/98 340/870.02 |
| 2014/0250430 A1 * | 9/2014 | Proud .................... H02J 50/20 717/168 |
| 2014/0266776 A1 | 9/2014 | Miller et al. |
| 2014/0266785 A1 | 9/2014 | Miller et al. |
| 2014/0273858 A1 | 9/2014 | Panther et al. |
| 2014/0282486 A1 * | 9/2014 | Hisamoto ................ G06F 8/65 717/172 |
| 2014/0313052 A1 | 10/2014 | Yarger et al. |
| 2014/0379273 A1 | 12/2014 | Petisce et al. |
| 2015/0038818 A1 | 2/2015 | Cole |
| 2015/0089222 A1 | 3/2015 | White et al. |
| 2015/0118658 A1 | 4/2015 | Mayou et al. |
| 2015/0123810 A1 | 5/2015 | Hernandez-Rosas et al. |
| 2015/0164391 A1 | 6/2015 | Hernandez-Rosas et al. |
| 2015/0205947 A1 * | 7/2015 | Berman .................. G06F 21/44 726/16 |
| 2015/0207796 A1 | 7/2015 | Love et al. |
| 2015/0289124 A1 | 10/2015 | Palin et al. |
| 2016/0066826 A1 | 3/2016 | Larvenz et al. |
| 2016/0081597 A1 | 3/2016 | Bhavaraju et al. |
| 2016/0165649 A1 | 6/2016 | Polo et al. |
| 2016/0210099 A1 | 7/2016 | Hampapuram et al. |
| 2016/0234020 A1 | 8/2016 | Nix |
| 2016/0330573 A1 * | 11/2016 | Masoud ............ H04W 12/0431 |
| 2016/0357546 A1 * | 12/2016 | Chang .................... G06F 21/57 |
| 2017/0026800 A1 * | 1/2017 | Kim ........................ H04W 4/80 |
| 2017/0039372 A1 * | 2/2017 | Koval .................... H04L 67/06 |
| 2017/0288976 A1 * | 10/2017 | Wang .................... H04L 9/0816 |
| 2019/0286437 A1 * | 9/2019 | Mahbod ................. G06F 8/71 |
| 2019/0347086 A1 | 11/2019 | Kiaie et al. |
| 2020/0037939 A1 * | 2/2020 | Castagna ................ A61B 5/0004 |
| 2020/0059834 A1 * | 2/2020 | Kim ..................... H04W 12/084 |
| 2020/0089487 A1 * | 3/2020 | Ramic ...................... G06F 8/65 |
| 2020/0151335 A1 | 5/2020 | Ayoub et al. |
| 2022/0019422 A1 * | 1/2022 | Anderson ................ G06F 8/65 |
| 2022/0030402 A1 * | 1/2022 | Bartholic ................ G06F 8/71 |
| 2022/0292378 A1 * | 9/2022 | Ahmed .................... G06N 5/02 |

FOREIGN PATENT DOCUMENTS

| | | |
|---|---|---|
| EP | 3 158 922 A1 | 4/2017 |
| EP | 3240352 A1 | 11/2017 |
| EP | 3 435 866 | 11/2020 |
| EP | 3 730 045 | 3/2022 |
| EP | 3 797 685 | 5/2022 |
| JP | WO2015/194381 A1 | 12/2015 |
| WO | WO 99/58190 | 11/1999 |
| WO | WO 02/15778 | 2/2002 |

(56) References Cited

FOREIGN PATENT DOCUMENTS

| | | |
|---|---|---|
| WO | WO 03/026728 | 4/2003 |
| WO | WO 03/026728 A1 | 4/2003 |
| WO | WO 2004/006982 | 1/2004 |
| WO | WO 2005/018450 | 3/2005 |
| WO | WO 2005/046780 | 5/2005 |
| WO | WO 2005/046780 A1 | 5/2005 |
| WO | WO 2006/040083 | 4/2006 |
| WO | WO 2006/094513 | 9/2006 |
| WO | WO 2006/121921 | 11/2006 |
| WO | WO 2006/121921 A2 | 11/2006 |
| WO | WO 2007/002189 A2 | 1/2007 |
| WO | WO 2007/097754 | 8/2007 |
| WO | WO 2007/104755 A1 | 9/2007 |
| WO | WO 2008/065646 | 6/2008 |
| WO | WO 2008/065646 A1 | 6/2008 |
| WO | WO 2008/073813 | 6/2008 |
| WO | WO 2008/114223 | 9/2008 |
| WO | WO 2008/115409 | 9/2008 |
| WO | WO 2008/144325 A1 | 11/2008 |
| WO | WO 2008/157821 | 12/2008 |
| WO | WO 2008/157821 A1 | 12/2008 |
| WO | WO 2009/007287 | 1/2009 |
| WO | WO 2009/035773 | 3/2009 |
| WO | WO 2009/039013 | 3/2009 |
| WO | WO 2009/039013 A1 | 3/2009 |
| WO | WO-2009126484 A2 * | 10/2009 ............... G06F 8/65 |
| WO | WO 2013/044153 A1 | 3/2013 |
| WO | WO 2013/069894 A1 | 5/2013 |
| WO | WO 2013/090731 A1 | 6/2013 |
| WO | WO 2013/090791 A1 | 6/2013 |
| WO | WO 2014/011488 A2 | 1/2014 |
| WO | WO 2014/158405 A2 | 10/2014 |
| WO | WO 2014/165172 A1 | 10/2014 |
| WO | WO 2014/179343 A1 | 11/2014 |
| WO | WO 2015/069797 A1 | 5/2015 |
| WO | WO 2016/064184 A1 | 4/2016 |
| WO | WO 2016/092448 | 6/2016 |
| WO | WO 2016/092448 A1 | 6/2016 |
| WO | WO 2016/101774 A1 | 6/2016 |
| WO | WO 2017/172781 A1 | 10/2017 |
| WO | WO 2018/017484 A1 | 1/2018 |
| WO | WO 2018/075333 A2 | 4/2018 |

OTHER PUBLICATIONS

Dowla, "The Basics of Radio Frequency Identification (RFID) Technology", Handbook of RF & Wireless Technologies, Chapter 14, 44 pages (2004).
Evans, et al., "Clinical temperature acquisition using proximity telemetry", J. Biomed. Eng., 13:83-86 (1991).
Finkenzeller, "RFID Handbook: Fundamentals and Applications in Contactless Smart Cards and Identification", Second Edition, 114 pages (2003).
Heller, et al., "Electrochemical Glucose Sensors and Their Applications in Diabetes Management", Chemical Reviews, 108(7):2482-2505 (2008).
Lee, "RFID Coil Design", Microchip Technology Inc., DS00678B, pp. 1-19 (1998).
Liang, et al., "An implantable bi-directional wireless transmission system for transcutaneous biological signal recording", Physiological Measurement, 26:83-97 (2005).
Radio Frequency Identification RFID, AIM Inc., White Paper, Document Version 1.2, 17 pages (2001).
Sorrells, "Passive RFID Basics", Microchip Technology Inc., DS00680B, pp. 1-5 (1998).
Bluetooth Specification, Version 4.0, 2,303 pages (2010).
Compare Specification—Apple iPhone 6 vs. Apple iphone 6 Plus—https://www.gsmarena.com/compare.php3?idPhone1=6378&idPhone2=6665, 2 pages, Jan. 31, 2022.
Dexcom G4® Platinum, Continuous Glucose Monitoring System, User's Guide, Dexcom, Inc., 161 pages (2015).
Dexcom G5 User Guide, Dexcom, Inc., 265 pages (2015).

Dexcom G5™ Mobile, Continuous Glucose Monitoring System, User Guide, Dexcom, Inc., 264 pages (2015).
Dexcom News Releases—FDA Approves Dexcom G4 Platinum Continuous Glucose Monitoring System with Share—https://www.dexcom.com/en-us/news/fda-approves-dexcom-24-platinum-continuous-glucose-monitoring-system-share, Dexcom, Inc., 2 pages, Jan. 26, 2015.
Dexcom Press Release—FDA Approves Dexcom G5® Mobile Continuous Glucose Monitoring System—https://www.dexcom.com/news/1257506247-fda-approves-dexcom-g5®-mobile-continuous-glucose-monitoring-system, Dexcom, Inc., 4 pages, Aug. 24, 2015.
Encyclopedia Britannica, Science & Tech, Bluetooth Definition, 5 pages, (Oct. 14, 2023).
Excerpts from the "German Health Report Diabetes 2023" of the German Diabetes Society, 14 pages (2022) (with an English Abstract).
Ferro, et al., "Bluetooth and Wi-fi Wireless Protocols: A Survey and a Comparison", IEEE Wireless Communications, pp. 1-24 (2004).
Ferro, et al., "Bluetooth and Wi-fi Wireless Protocols: A Survey and a Comparison", IEEE Wireless Communications, 12(1):12-26 (2005).
FreeStyle Libre Flash Glucose Monitoring System, User's Manual, Abbott Diabetes Care Ltd., 124 pages (2014).
Hamblen, "A short history of NFC: Where Near Field Communication has come from.", 2 pages, Dec. 19, 2012.
Klueh, et al., "Inflammation and Glucose Sensors: Use of Dexamethasone to Extend Glucose Sensor Function and Life Span in Vivo", Journal of Diabetes Science and Technology, 1(4):496-504 (2007).
Press Coverage of FreeStyle Libre launch, Antonia Giese, retrieved from https://www.bild.de/ratgeber/gesundheit/diabetes/hightech-zucker-sensor-diabetes-test-freestyle-libre-flash-37732134.bild.html, 8 pages Sep. 20, 2014 (with an English Translation).
Specification of the Bluetooth System, Experience More, Specification vol. 0, Covered Core Package Version: 4.0, 41 pages (2010).
Specification of the Samsung Galaxy Alpha, Samsung Newsroom Deutschland—http:/www.samsung.de/galaxyalpha, 7 pages, Aug. 13, 2014 (with an English Abstract).
Wikipedia, The Free Encyclopedia, "Continuous glucose monitor", retrieved from https://en.wikipedia.org/w/index.php?title=Continuous glucose monitor&oldid=1180606331, 10 pages (Oct. 1, 2023).
Wikipedia, The Free Encyclopedia, "Radio-frequency identification", retrieved from https://en.wikipedia.org/wiki/Radio-frequency_identification, 30 pages (Oct. 23, 2023).
Bluetooth Specification, Encryption and Authentication Overview, vol. 6, Version 4.0, 1 page (2010).
Cornelius, "Usable Security for Wireless Body-Area Networks," Dartmouth College PhD Dissertations. 42 (2013).
Cunningham et al., "In Vivo Glucose Sensing," Wiley & Sons (2010).
Dexcom G5 Mobile Continuous Glucose Monitoring System, Advisory Committee Briefing Materials, Clinical Chemistry and Clinical Toxicology Devices Panel, 283 pages (2016).
Diallo et al., "A Secure Authentication Scheme for Bluetooth Connection," 5th International Conference on Computer & Communication Engineering, DOI 10.1109/ICCCE.2014.29, 60-63 (2014).
Ellmerer et al., "Measurement of interstitial albumin in human skeletal muscle and adipose tissue by open-flow microperfusion," Am. J. Physiol. Endocrinol. Metab., 278: E352-E356 (2000).
Finkenzeller, "RFID Handbook: Fundamentals and Applications in Contactless Smart Cards, Radio Frequency Identification and Near-Field Communication", Third Edition, 4 pages (2010).
German Infringement Complaint (2021) with English Abstract.
German Infringement Complaint Service addressed to Dexcom Deutschland GmbH (2021).
Guder et al., "Samples: From the Patient to the Laboratory, The impact of preanalytical variables on the quality of laboratory results," Wiley-VCH GmbH & Co. KGaA (2003).
Higson et al., "Biosensors: a viable monitoring technology?" Med. & Biol. Eng. & Comput., 32, 601-609 (1994).
Mohanty et al., Biosensors: A tutorial review, IEEE Potentials, 35-40 (2006).
Near Field Communication (NFC) Technology and Measurements, White Paper, Rohde & Schwarz, 18 pages (2011).

(56) References Cited

OTHER PUBLICATIONS

Near Field Communication (NFC) Technology and Measurements, White Paper, Rohde & Schwarz, 1 page (2011).
Padgette et al., "Guide to Bluetooth Security, Recommendations of the National Institute of Standards and Technology," NIST, U.S. Dept. of Commerce, Special Publication 800-121 Revision 1 (2012).
Rivest et al., "A Method for Obtaining Digital Signatures and Public-Key Cryptosystems," MIT, 15 pages (1977).
Schaupp et al., "Direct access to interstitial fluid in adipose tissue in humans by use of open-flow microperfusion," E401-E408, Downloaded from journals.physiology.org/journal/ajpendo (092.040.147.197) on Oct. 4, 2021.
"Setting Your Sensor Settings" retrieved from "https://web.archive.org/web/20160803065621/http://www.medtronicdiabetes.com:80/customer-support/device-settings-and-features/sensor-settings/setting-sensor-settings" on Nov. 18, 2022, 5 pages.
Seymour et al., Bluetooth Master/Slave Communications and Sniff/Sniff Sub-rating Modes White Paper, Aug. 14, 2008.
Sola-Gazagnes et al., "Emergent technologies applied to diabetes: What do we need to integrate continuous glucose monitoring into daily practice? Where the long-term use of continuous glucose monitoring stands in 2011", Diabetes & Metabolism, vol. 37, pp. S65-S70 (2011).
Specification of the Bluetooth System, Experience More, Master Table of Contents & Compliance Requirements vol. 0, Covered Core Package Version: 4.0, 2302 pages (2010).
Specification of the Bluetooth System, Experience More, Specification vol. 0, Covered Core Package Version: 4.0, 89 pages (2010).
Specification of the Bluetooth System, Master Table of Contents & Compliance Requirements, Version 4.1 (2013).
Specification of the Bluetooth System, Master Table of Contents & Compliance Requirements, Version 4.2 (2014).
Stallings, "Cryptography and Network Security, Principles and Practice," 5th Ed., Prentice Hall (2011).
Strickland et al., "Continuous Glucose Monitoring Profile Bluetooth® Profile Specification," Interest Group, v1.0.1 (2015).
The New Shorter Oxford English Dictionary, p. 50.
Townsend et al., "Getting Started with Bluetooth Low Energy," O'Reilly (2014).
Wikipedia, "Analyte" retrieved from https://en.wikipedia.org/w/index.php?title=Analyte&oldid=527866671 (2012).
Wikipedia, "Bluetooth", 25 pages retrieved from https://en.wikipedia.org/wiki/Bluetooth (2022).
Wikipedia, Bluetooth Low Energy, 11 pages retrieved from https://en.wikipedia.org/wiki/Bluetooth Low Energy (2022).
Wikipedia, Challenge-response authentication retrieved from https://en.wikipedia.org/wiki/Challenge%E2%80%93response_authentication (2013).
Wikipedia, Digital Signature, 10 pages retrieved from https://en.wikipedia.org/wiki/Digital_signature (2021).
Wikipedia, Digital Signature, 10 pages (2012).
Wikipedia, "In vivo" retrieved from https://en.wikipedia.org/w/index.php?title=In_vivo&oldid=524960105 (2012).
Wikipedia, "Near-field communication" retrieved from https://en.wikipedia.org/w/index.php?title=Near-field_communication&oldid=525308529 (2012).
Wikipedia, RSA (cryptosystem), 17 pages retrieved from https://en.wikipedia.org/wiki/RSA_(cryptosystem) (2021).
Dexcom, Inserting Sensor, Instructions for Use, Dexcom, Inc., 2 pages (2021).
DexcomG7, Operational Manual, User Guide, Dexcom, Inc., 179 pages (2022) (with an English Abstract).
DexcomG7, Start Here, Operational Manual, Dexcom, Inc. 9 pages (2022) (with an English Abstract).
DexcomG7, Receiver: Start Here, Operational Manual, Dexcom, Inc., 8 pages (2022).
File wrapper of U.S. Appl. No. 60/587,787, filed Jul. 13, 2004, 69 pages.
Microchip, microID® 13.56 MHz RFID, System Design Guide, Microchip Technology Inc., 214 pages (2004).
International Search Report and Written Opinion mailed Jan. 16, 2023 in International Application No. PCT/US2022/045201.
U.S. Appl. No. 60/587,787, filed Jul. 13, 2004, Brister, et al.
"Within Definition & Meaning" retrieved from "https://www.dictionary.com/browse/within" on Sep. 9, 2022, 5 pages.
Chuang et al., "Pilot Studies of Transdermal Continuous Glucose Measurement in Outpatient Diabetic Patients and in Patients during and after Cardiac Surgery," Journal of Diabetes Science and Technology, 595-602 (2008).
Exhibit B-22.pdf—Opponent's Written Response in Opposition of EP 3 730 045, Sep. 27, 2023, 43 pages.
McCartney et al., "In vivo glucose sensing for diabetes management: progress towards non-invasive monitoring," BMJ, vol. 319, 4 pages (1999).
Townsend et al., "Getting Started with Bluetooth Low Energy—Tools and Techniques for Low-Power Networking," O'Reilly Media, Inc., 180 pages (2014).
Wang et al. "A Feasible IMD Communication Protocol: Security without Obscurity," School of Engineering and Computing Sciences, NYIT Research Experience for Undergraduates (REU), May 26-Jul. 30, 2015, 1 page.
Gomez et al., "Overview and Evaluation of Bluetooth Low Energy: An Emerging Low-Power Wireless Technology," Sensors 12:11734-11753 (2012).
Morak et al., "Design and Evaluation of a Telemonitoring Concept Based on NFC-Enabled Mobile Phones and Sensor Devices," IEEE Transactions on Information Technology in Biomedicine, Nov. 2011, 8 pgs.
Padgette et al., "Guide to Bluetooth Security. Recommendations of the National Institute of Standards and Technology," NIST Special Publication 800-121, Revision 1, Jun. 2012, 47 pgs.
A Dictionary of Computer Science for "authentication", Seventh Edition, Oxford University Press, 3 pages (2016).
BBC News, Technology, Bluetooth rival unveiled by Nokia, 2 pgs. (Oct. 4, 2006).
Bloodborne pathogens, Occupational Safety and Health Admin., Labor, 29 CFR Ch. XVII (Jul. 1, 2003 Edition) § 1910.1030, pp. 260-273.
Bluetooth Specification V 2.1, Jul. 26, 2007, pp. 1-541.
Bluetooth Specification V 2.1, Jul. 26, 2007, pp. 542-906.
Burr, et al., Electronic Authentication Guideline, NIST Special Publication 800-63-2, Computer Security, NIST National Institute of Standards and Technology, U.S. Department of Commerce, 123 pages (2013).
Dexcom STS 7 Plus User's Guide, 2011, 144 pgs.
Dexcom STS 7 User Guide, 2007, 74 pgs.
Diglas et al., "Reduced pain perception with Pen Mate™ an automatic needle insertion device for use with an insulin pen," Practical Diabetes Int 16(2):39-41 (1999).
Expert Statement of Professor Pantelis Georgiou, Aug. 9, 2024, 52 pgs.
Freestyle Navigator User Guide, 2008, 195 pgs.
Guardian Real Time User Guide, 2006, 181 pgs.
Hirsch, "Realistic Expectations and Practical Use of Continuous Glucose Monitoring for the Endocrinologist," J Clin Endocrinol Metab 94:2232-2238 (2009).
Hughes, "The Business of Self-Monitoring of Blood Glucose: A Market Profile," Journal of Diabetes Science and Technology, 3(5):1219-1223 (2009).
IEEE 100, The Authoritative Dictionary of IEEE Standards Terms for "authentication", Seventh Edition, Standards Information Network IEEE Press, 3 pages (2000).
Moore, "The Potential Use of Radio Frequency Identification Devices for Active Monitoring of Blood Glucose Levels," Journal of Diabetes Science and Technology 3(1):180-183 (2009).
Newton's Telecom Dictionary for "authenticate", 30th Updated, Expanded, Anniversary Edition, Harry Newton, 4 pages (2016).
Declaration of Dr. Sayfe Kiael, Ph.D., Inter Partes Review of U.S. Pat. No. 10,375,222, 100 pages (2024).
Diallo et al., "A Secure Authentication Scheme for Bluetooth Connection," 5th International Conference on Computer & Communication Engineering, 60-63 (2014).

(56) References Cited

OTHER PUBLICATIONS

File History of U.S. Pat. No. 10,375,222 issued Aug. 6, 2019, Parts 1-2 (422 pages).
NFC Forum Bluetooth Special Interest Group, Bluetooth® Secure Simple Pairing Using NFC, 39 pages (2014).
Omre, "Bluetooth Low Energy: Wireless Connectivity for Medical Monitoring," Journal of Diabetes Sci Technol, vol. 4, Issue 2, 457-463, Mar. 2010.
Padgette et al., "Guide to Bluetooth Security, Recommendations of the National Institute of Standards and Technology," NET Special Publication 800421 Revision National Institute of Standards and Technology, U.S. Department of Commerce, 48 pages (2012).
Specification of the Bluetooth System Master Table of Contents & Compliance Requirements Covered Core Package version: 1.2, Current Master TOC issued: Nov. 5, 2003, 92 pages.
Specification of the Bluetooth System Experience More Master Table of Contents & Compliance Requirements Covered Core Package version: 4.0, Current Master TOC issued: Jun. 30, 2010, 134 pages.
Strömmer et al., "Application of Near Field Communication for Health Monitoring in Daily Life," Proceedings of the 28th IEEE FrC09., EMBS Annual International Conference, 3246-3249, Aug. 30-Sep. 3, 2006.
Townsend et al., "Getting Started with Bluetooth Low Energy," O'Reilly Media, 1-164, 180 pages (2014).
Wang et al., "A Feasible IMD Communication Protocol: Security without Obscurity," NYIT School of Engineering and Computing Sciences, 1 page (2015).
Zhang et al., "Bluetooth Low Energy for Wearable Sensor-based Healthcare Systems," 2014 Health Innovations and Point-of-Care Technologies Conference, 251-254 (2014).
UPC Annex A34—Second Expert Opinion of Dr. Michael Schoemaker, Exhibits MS-5 to MS-8, Nov. 8, 2024 (43 pgs.).
UPC Exhibit MS-5 to Second Expert Opinion of Dr. Michael Schoemaker, Nov. 8, 2024 (9 pgs.).
UPC Exhibit MS-6 to Second Expert Opinion of Dr. Michael Shoemaker, Nov. 8, 2024, Part 1 (63 pgs.).
UPC Exhibit MS-6 to Second Expert Opinion of Dr. Michael Shoemaker, Nov. 8, 2024, Part 2 (63 pgs.).
UPC Exhibit MS-7 to Second Expert Opinion of Dr. Michael Shoemaker, Nov. 8, 2024 (44 pgs.).
UPC Exhibit MS-8 to Second Expert Opinion of Dr. Michael Shoemaker, Nov. 8, 2024 (25 pgs.).
Expert Statement of Andrew Varde, Aug. 9, 2024, 87 pgs.
Expert Statement of Pantelis Georgiou, Aug. 9, 2024, 52 pgs.
Feature-by-Feature comparison of claims 1 and 5 of EP921 in relation to D2 and D3, Nov. 12, 2024, 7 pgs.

\* cited by examiner

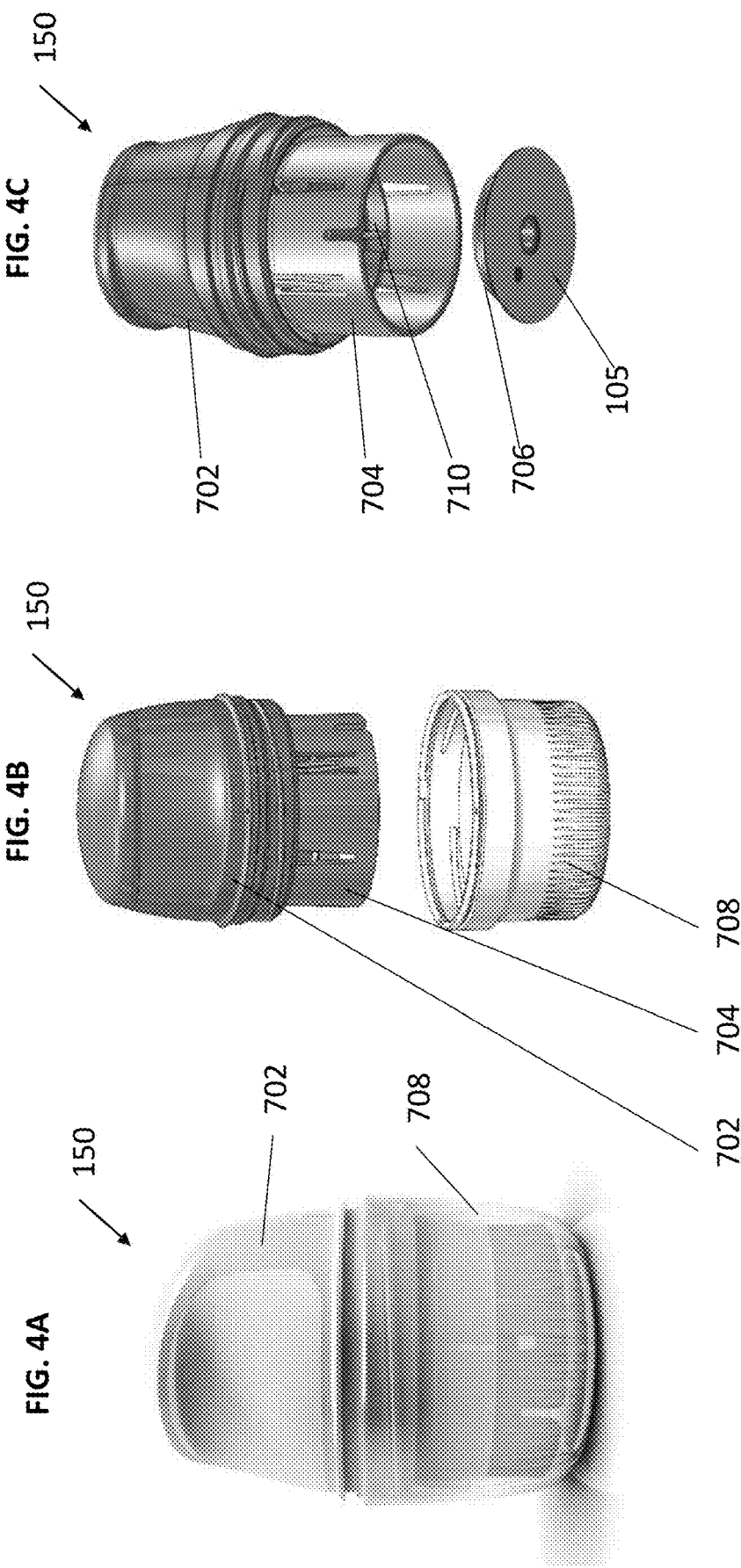

MOBILE APPLICATION UPDATES FOR ANALYTE DATA RECEIVING DEVICES

CROSS-REFERENCE TO RELATED APPLICATIONS

This application claims the benefit, under 35 U.S.C. § 119(e), of U.S. Provisional Patent Application No. 63/249,843, filed Sep. 29, 2021, which is incorporated herein by reference in its entirety and for all purposes.

FIELD

The disclosed subject matter relates to a system for programming and re-programming data receiving devices for collecting and processing data received from a sensing device. The programming and re-programming can be performed through an intermediary device, such as a smartphone or tablet, that receives application updates via an application storefront server.

BACKGROUND

Certain medical devices can wirelessly transmit data to, and receive data from, other computing devices. While some of these medical devices are equipped with powerful processors and operate using a permanent power supply, other medical devices are designed to operate efficiently, using little power. Moreover, low-power medical devices can be designed to be disposable and low cost, which can involve trade-offs made during design and manufacture with respect to the complexity and computing resources included in the device. For example, one such trade-off when design sensors, such as analyte sensors, can involve designing such devices without wide area networking to directly connect with servers associated with an analyte monitoring system. Instead, such devices exchange information, such as patient data and device status information, with one or more other devices which act as relays to transmit the information to the servers associated with the analyte monitoring system if needed. The device communicates with the other devices using physical connections. By forgoing wide area networking capabilities, devices such as low-power analyte sensors can be provided at lower cost and with improved battery longevity because of the reduced number of components within the device. However, forgoing wide area networking capabilities increases the burden associated with installing device updates, such as software or firmware updates for the medical device.

Previously, to update medical devices without wide area networking capabilities, a user or an authorized caretaker, would use another device such as a computer or specialty monitoring device to manually download the update, connect the medical device to the computer, and initiate the update. This process can be especially burdensome for users who are unfamiliar or uncomfortable with technology generally or are especially uncomfortable with modifying their medical devices. Users can therefore avoid updating devices such as a medical device, missing important bug fixes, security updates, and new features added by the provider of the medical device. Increasingly, users have grown accustomed to updating personal computing devices, such as smartphones and tablets using commercial application storefronts, often closely associated with the operating system of the computing devices. Using the networking capabilities of the computing devices, these application storefronts simplify and often automate the processes for updating applications installed on the computing device.

Accordingly, there is an opportunity for methods and systems that can be implemented by low-cost monitoring devices, including medical devices, to make use of simplified processes for updating applications on a computing device to update the software and firmware executing on a device in communication with the computing device.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the drawings.

To achieve these and other advantages and in accordance with the purpose of the disclosed subject matter, as embodied and broadly described, the disclosed subject matter includes systems and methods for bundling software and/or firmware updates for data receiving devices without wide-area networking capabilities into application updates for multi-purpose data receiving device, such as mobile electronics devices. Exemplary systems and methods can include a method for updating a data receiving device for an analyte sensor. A computing device can receive an application update package including an update for an application installed on the computing device and a software or firmware update for the data receiving device. The application installed on the computing device is configured to communicate with or process data from the analyte sensor. The data receiving device includes software or firmware configured to communicate with or process data from the analyte sensor. The computing device establishes a short-range wireless communication session with the data receiving device. The computing device transmits the software or firmware update for the data receiving device to the data receiving device through the short-range wireless communication session with the data receiving device. The computing device receives confirmation of installation of the software or firmware update by the data receiving device. In certain embodiments, the data receiving device does not include wide area networking capability. In certain embodiments, the short-range wireless communication session is a Bluetooth, Bluetooth Low Energy, or near-field communication session. In certain embodiments, prior to receiving the application update package, the computing device establishes a second short-range wireless communication session with the data receiving device. The computing device receives identifying information for the data receiving device. The computing device registers the identifying information for the data receiving device with the application installed on the computing device. In particular embodiment, the application installed on the computing device is associated with an analyte monitoring system including the data receiving device, the analyte sensor, and an application server and the computing device further registers the identifying information for the data receiving device with the application server. In certain embodiments, wherein the application installed on the computing device is associated with an analyte monitoring system including the data receiving device, the analyte sensor, and an application server and the computing device receives, from the application server, a notification that the software or firmware update for the data receiving device is available to be accessed by the computing device. In certain embodiments, subsequent to receiving the confirmation of installation of the software or firmware update, the computing device transmits to the application server a notification of installation of the software or firmware update by the data receiving device. In certain embodiments, the data receiving device and the analyte sensor are associated with a first user and the computing device is associated with a second user in a caregiving relationship with the first user. In certain embodiments, the computing device notifies a user of the computing device and the data receiving device than the software or firmware update for the data receiving device is available to be installed. In certain embodiments, notifying the user of the computing device and the data receiving device further includes the computing device providing instructions for facilitating the update. In certain embodiments, the software or firmware update is performed by the data receiving device without notifying a user of the data receiving device. In certain embodiments, the computing device causes the data receiving device to enter a safe mode of operation prior to installing the firmware or software update. In certain embodiments, the computing device encrypts the software or firmware update for the data receiving device prior to transmitting the software or firmware update to the data receiving device. In certain embodiments, while updating, the data receiving device is unable to perform one or more functions and, prior to receiving the confirmation of installation of the software or firmware update, the computing device performs the one or more functions on behalf of the data receiving device. In certain embodiments, the one or more functions include receiving data from the analyte sensor, processing data received from the analyte sensor, or generating alerts based on data received from the analyte sensor. In certain embodiments, the application update package is received by the computing device from a commercial application storefront. In certain embodiments, prior to receiving the confirmation of installation of the software or firmware update, the computing device determines that a predetermined period of time has elapsed since transmitting the software or firmware update to the data receiving device and retransmits the software or firmware update for the data receiving device to the data receiving device through the short-range wireless communication session with the data receiving device. In certain embodiments, the computing device generates one or more integrity check values for the software or firmware update for the data receiving device and transmits the one or more integrity check values to the data receiving device. The data receiving device installs the software or firmware update after validating the one or more integrity check values.

It is to be understood that both the foregoing general description and the following detailed description are exemplary and are intended to provide further explanation of the disclosed subject matter.

The accompanying drawings, which are incorporated in and constitute part of this specification, are included to illustrate and provide a further understanding of the methods and systems of the disclosed subject matter. Together with the description, the drawings explain the principles of the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts.

FIG. 4A is a side view depicting an example embodiment of an applicator device coupled with a cap.

FIG. 4B is a side perspective view depicting an example embodiment of an applicator device and cap decoupled.

FIG. 4C is a perspective view depicting an example embodiment of a distal end of an applicator device and electronics housing.

DETAILED DESCRIPTION

Figure 1A:
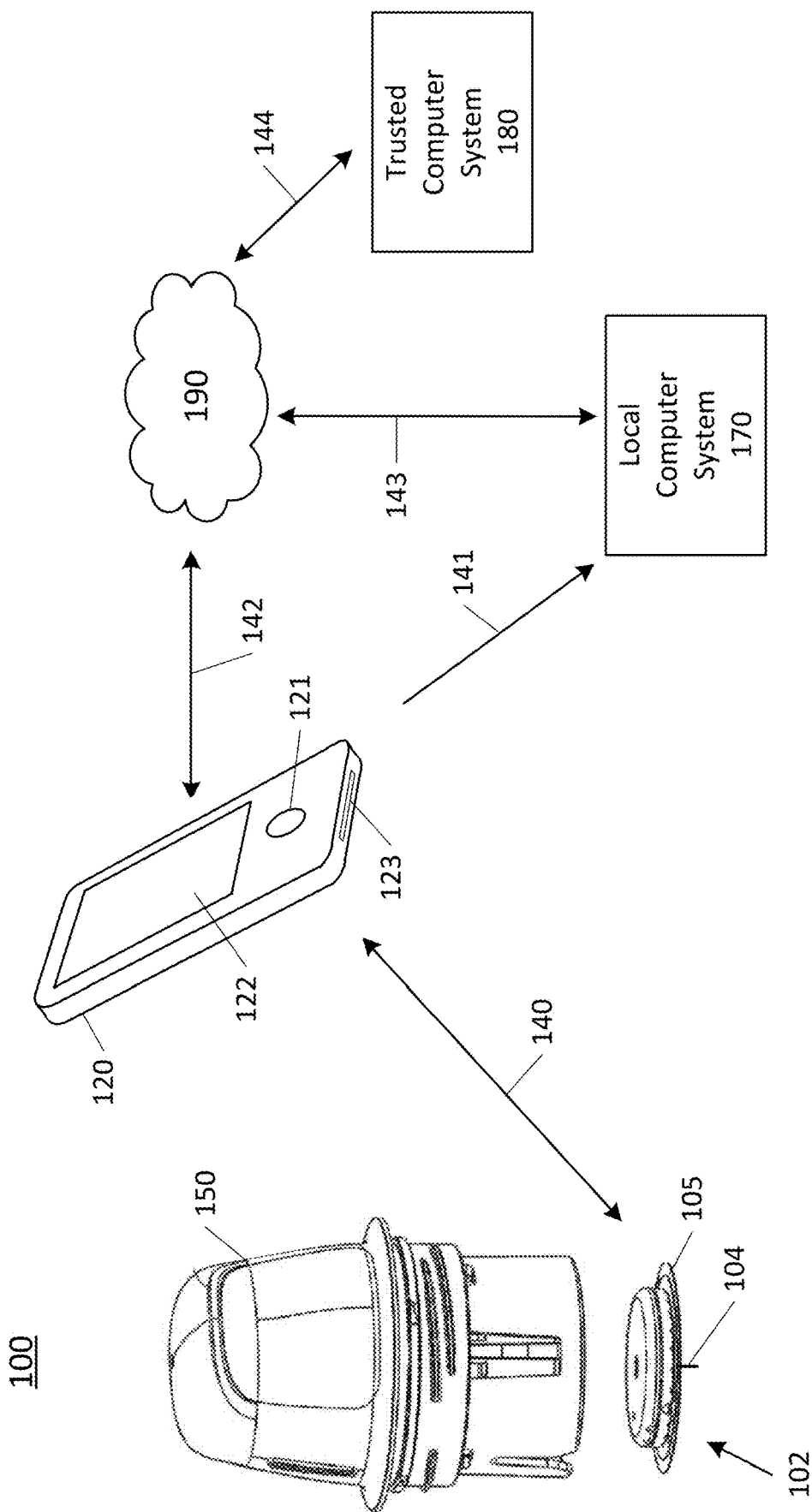
FIG. 1A is a system overview of a sensor applicator, reader device, monitoring system, network, and remote system.

Reference will now be made in detail to the various exemplary embodiments of the disclosed subject matter, exemplary embodiments of which are illustrated in the accompanying drawings.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a," "an," and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

Generally, embodiments of the present disclosure include systems, devices, and methods for the use of analyte sensor insertion applicators for use with in vivo analyte monitoring systems. An applicator can be provided to the user in a sterile package with an electronics housing of the sensor control device contained therein. According to some embodiments, a structure separate from the applicator, such as a container, can also be provided to the user as a sterile package with a sensor module and a sharp module contained therein. The user can couple the sensor module to the electronics housing, and can couple the sharp to the applicator with an assembly process that involves the insertion of the applicator into the container in a specified manner. In other embodiments, the applicator, sensor control device, sensor module, and sharp module can be provided in a single package. The applicator can be used to position the sensor control device on a human body with a sensor in contact with the wearer's bodily fluid. The embodiments provided herein are improvements to reduce the likelihood that a sensor is improperly inserted or damaged, or elicits an adverse physiological response. Other improvements and advantages are provided as well. The various configurations of these devices are described in detail by way of the embodiments which are only examples.

Furthermore, many embodiments include in vivo analyte sensors structurally configured so that at least a portion of the sensor is, or can be, positioned in the body of a user to obtain information about at least one analyte of the body. It should be noted, however, that the embodiments disclosed herein can be used with in vivo analyte monitoring systems that incorporate in vitro capability, as well as purely in vitro or ex vivo analyte monitoring systems, including systems that are entirely non-invasive.

Furthermore, for each and every embodiment of a method disclosed herein, systems and devices capable of performing each of those embodiments are covered within the scope of the present disclosure. For example, embodiments of sensor control devices are disclosed, and these devices can have one or more sensors, analyte monitoring circuits (e.g., an analog circuit), memories (e.g., for storing instructions), power sources, communication circuits, transmitters, receivers, processors and/or controllers (e.g., for executing instructions) that can perform any and all method steps or facilitate the execution of any and all method steps. These sensor control device embodiments can be used and can be capable of use to implement those steps performed by a sensor control device from any and all of the methods described herein.

Furthermore, the systems and methods presented herein can be used for operations of a sensor used in an analyte monitoring system, such as but not limited to wellness, fitness, dietary, research, information or any purposes involving analyte sensing over time. As used herein, "sensor" can refer to any device capable of receiving sensor information from a user, including for purpose of illustration but not limited to, body temperature sensors, blood pressure sensors, pulse or heart-rate sensors, glucose level sensors, analyte sensors, physical activity sensors, body movement sensors, or any other sensors for collecting physical or biological information. Analytes measured by the analyte sensors can include, by way of example and not limitation, glucose, ketones, lactate, oxygen, hemoglobin A1C, albumin, alcohol, alkaline phosphatase, alanine transaminase, aspartate aminotransferase, bilirubin, blood urea nitrogen, calcium, carbon dioxide, chloride, creatinine, hematocrit, lactate, magnesium, oxygen, pH, phosphorus, potassium, sodium, total protein, uric acid, etc.

Before describing these aspects of the embodiments in detail, however, it is first desirable to describe examples of devices that can be present within, for example, an in vivo analyte monitoring system, as well as examples of their operation, all of which can be used with the embodiments described herein.

There are various types of in vivo analyte monitoring systems. "Continuous Analyte Monitoring" systems (or "Continuous Glucose Monitoring" systems), for example, can transmit data from a sensor control device to a reader device continuously without prompting, e.g., automatically according to a schedule. "Flash Analyte Monitoring" systems (or "Flash Glucose Monitoring" systems or simply "Flash" systems), as another example, can transfer data from a sensor control device in response to a scan or request for data by a reader device, such as with a Near Field Communication (NFC) or Radio Frequency Identification (RFID) protocol. In vivo analyte monitoring systems can also operate without the need for finger stick calibration.

In vivo analyte monitoring systems can be differentiated from "in vitro" systems that contact a biological sample outside of the body (or "ex vivo") and that typically include a meter device that has a port for receiving an analyte test strip carrying bodily fluid of the user, which can be analyzed to determine the user's blood sugar level.

In vivo monitoring systems can include a sensor that, while positioned in vivo, makes contact with the bodily fluid of the user and senses the analyte levels contained therein. The sensor can be part of the sensor control device that resides on the body of the user and contains the electronics and power supply that enable and control the analyte sensing. The sensor control device, and variations thereof, can also be referred to as a "sensor control unit," an "on-body electronics" device or unit, an "on-body" device or unit, or a "sensor data communication" device or unit, to name a few.

In vivo monitoring systems can also include a device that receives sensed analyte data from the sensor control device and processes and/or displays that sensed analyte data, in any number of forms, to the user. This device, and variations thereof, can be referred to as a "handheld reader device," "reader device" (or simply a "reader"), "handheld electronics" (or simply a "handheld"), a "portable data processing" device or unit, a "data receiver," a "receiver" device or unit (or simply a "receiver"), or a "remote" device or unit, to name a few. Other devices such as personal computers have also been utilized with or incorporated into in vivo and in vitro monitoring systems.

The systems and methods presented herein can be used for secured updating of data receiving devices used in an analyte monitoring system. In particular, the systems and methods can be used for updating data receiving devices with wide-area networking capabilities by bundling updates for the data receiving devices with updates for other devices in the network. Embodiments of the disclosed subject matter include incorporating firmware and/or software updates for the data receiving devices with updates to applications that can execute on mobile electronics devices such as smartphones or tablets. The application updates can be provided through a commercial application storefront available to the mobile electronics devices.

For purpose of illustration and not limitation, the disclosed subject matter includes systems and methods for bundling software and/or firmware updates for data receiving devices without wide-area networking capabilities into application updates for multi-purpose data receiving device, such as mobile electronics devices. Exemplary systems and methods can include a method for updating a data receiving device for an analyte sensor. A computing device can receive an application update package including an update for an application installed on the computing device and a software or firmware update for the data receiving device. The application installed on the computing device is configured to communicate with or process data from the analyte sensor. The data receiving device includes software or firmware configured to communicate with or process data from the analyte sensor. The computing device establishes a short-range wireless communication session with the data receiving device. The computing device transmits the software or firmware update for the data receiving device to the data receiving device through the short-range wireless communication session with the data receiving device. The computing device receives confirmation of installation of the software or firmware update by the data receiving device. In certain embodiments, the data receiving device does not include wide area networking capability. In certain embodiments, the short-range wireless communication session is a Bluetooth, Bluetooth Low Energy, or near-field communication session. In certain embodiments, prior to receiving the application update package, the computing device establishes a second short-range wireless communication session with the data receiving device. The computing device receives identifying information for the data receiving device. The computing device registers the identifying information for the data receiving device with the application installed on the computing device. In particular embodiment, the application installed on the computing device is associated with an analyte monitoring system including the data receiving device, the analyte sensor, and an application server and the computing device further registers the identifying information for the data receiving device with the application server. In certain embodiments, wherein the application installed on the computing device is associated with an analyte monitoring system including the data receiving device, the analyte sensor, and an application server and the computing device receives, from the application server, a notification that the software or firmware update for the data receiving device is available to be accessed by the computing device. In certain embodiments, subsequent to receiving the confirmation of installation of the software or firmware update, the computing device transmits to the application server a notification of installation of the software or firmware update by the data receiving device. In certain embodiments, the data receiving device and the analyte sensor are associated with a first user and the computing device is associated with a second user in a caregiving relationship with the first user. In certain embodiments, the computing device notifies a user of the computing device and the data receiving device than the software or firmware update for the data receiving device is available to be installed. In certain embodiments, notifying the user of the computing device and the data receiving device further includes the computing device providing instructions for facilitating the update. In certain embodiments, the software or firmware update is performed by the data receiving device without notifying a user of the data receiving device. In certain embodiments, the computing device causes the data receiving device to enter a safe mode of operation prior to installing the firmware or software update. In certain embodiments, the computing device encrypts the software or firmware update for the data receiving device prior to transmitting the software or firmware update to the data receiving device. In certain embodiments, while updating, the data receiving device is unable to perform one or more functions and, prior to receiving the confirmation of installation of the software or firmware update, the computing device performs the one or more functions on behalf of the data receiving device. In certain embodiments, the one or more functions include receiving data from the analyte sensor, processing data received from the analyte sensor, or generating alerts based on data received from the analyte sensor. In certain embodiments, the application update package is received by the computing device from a commercial application storefront. In certain embodiments, prior to receiving the confirmation of installation of the software or firmware update, the computing device determines that a predetermined period of time has elapsed since transmitting the software or firmware update to the data receiving device and retransmits the software or firmware update for the data receiving device to the data receiving device through the short-range wireless communication session with the data receiving device. In certain embodiments, the computing device generates one or more integrity check values for the software or firmware update for the data receiving device and transmits the one or more integrity check values to the data receiving device. The data receiving device installs the software or firmware update after validating the one or more integrity check values.

FIG. 1A is a conceptual diagram depicting an example embodiment of an analyte monitoring system 100 that includes a sensor applicator 150, a sensor control device 102, and a data receiving device 120. Here, sensor applicator 150 can be used to deliver sensor control device 102 to a monitoring location on a user's skin where a sensor 104 is maintained in position for a period of time by an adhesive patch 105. Sensor control device 102 is further described in FIGS. 2B and 2C, and can communicate with data receiving device 120 via a communication path 140 using a wired or wireless technique. Example wireless protocols include Bluetooth, Bluetooth Low Energy (BLE, BTLE, Bluetooth SMART, etc.), Near Field Communication (NFC) and others. Users can monitor applications installed in memory on data receiving device 120 using screen 122 and input 121 and the device battery can be recharged using power port 123. More detail about data receiving device 120 is set forth with respect to FIG. 2A below. Data receiving device 120 can communicate with local computer system 170 via a communication path 141 using a wired or wireless technique. Local computer system 170 can include one or more of a laptop, desktop, tablet, phablet, smartphone, set-top box, video game console, or other computing device and wireless communication can include any of a number of applicable wireless networking protocols including Bluetooth, Bluetooth Low Energy (BTLE), Wi-Fi or others. Local computer system 170 can communicate via communications path 143 with a network 190 similar to how data receiving device 120 can communicate via a communications path 142 with network 190, by wired or wireless technique as described previously. Network 190 can be any of a number of networks, such as private networks and public networks, local area or wide area networks, and so forth. A trusted computer system 180 can include a server and can provide authentication services and secured data storage and can communicate via communications path 144 with network 190 by wired or wireless technique.

Figure 1B:
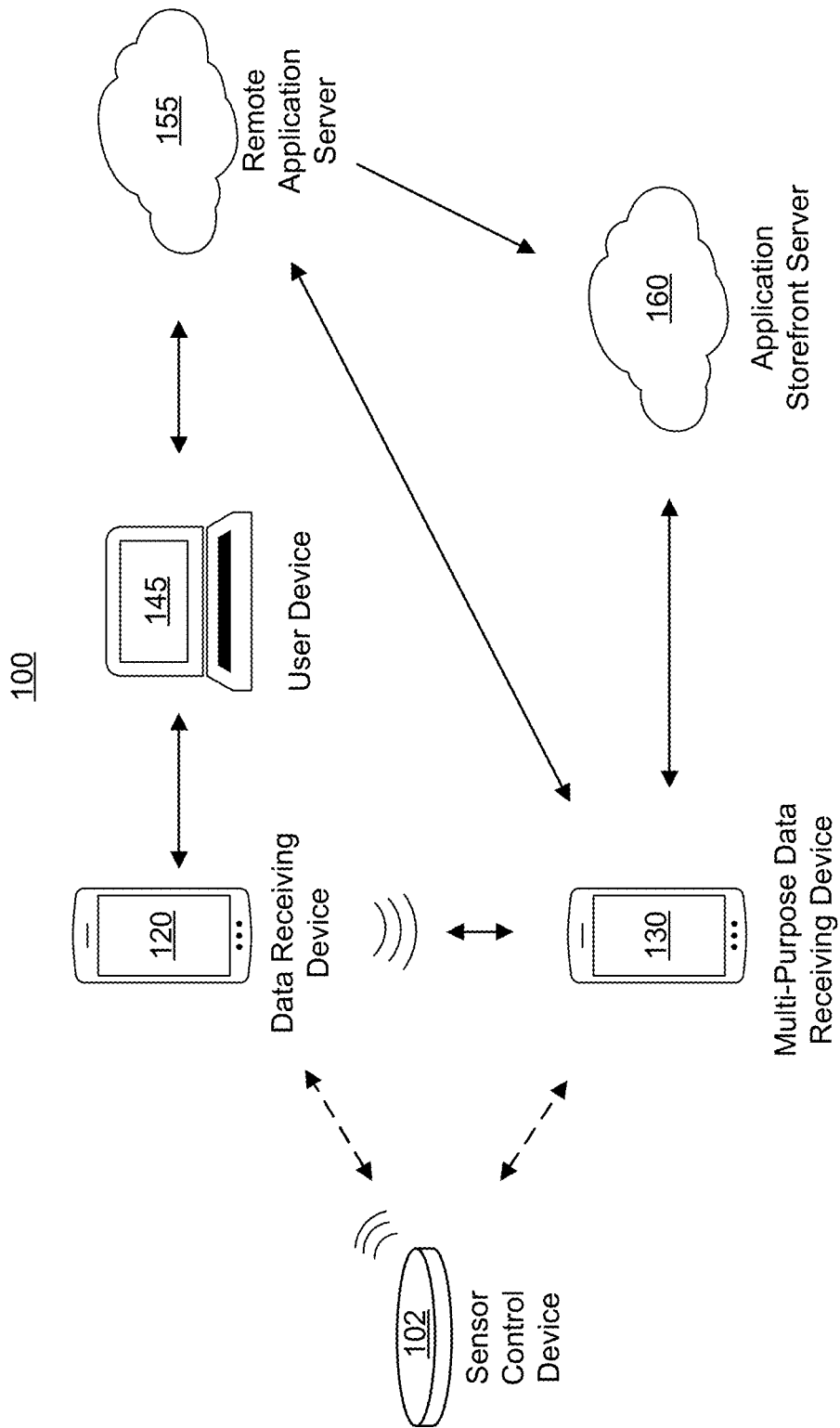
FIG. 1B is a diagram illustrating an operating environment of an example analyte monitoring system for use with the techniques described herein.

FIG. 1B illustrates another example embodiment of an operating environment of an analyte monitoring system 100 capable of embodying the techniques described herein. As illustrated, the analyte monitoring system 100 can include a system of components designed to provide monitoring of parameters, such as analyte levels, of a human or animal body or can provide for other operations based on the configurations of the various components. As embodied herein, the system can include a low-power sensor control device 102 worn by the user or attached to the body for which information is being collected. As embodied herein, the sensor control device 102 can be a sealed, disposable device with a predetermined active use lifetime (e.g., 1 day, 14 days, 30 days, etc.). Sensors 110 can be applied to the skin of the user body and remain adhered over the duration of the sensor lifetime or can be designed to be selectively removed and remain functional when reapplied. The low-power analyte monitoring system 100 can further include a data reading device 120 or multi-purpose data receiving device 130 configured as described herein to facilitate retrieval and delivery of data, including analyte data, from the sensor control device 102.

As embodied herein, the analyte monitoring system 100 can include a software or firmware library or application provided, for example via a remote application server 155 or application storefront server 160, to a third-party and incorporated into a multi-purpose hardware device 130 such as a mobile phone, tablet, personal computing device, or other similar computing device capable of communicating with the sensor control device 102 over a communication link. Multi-purpose hardware can further include embedded devices, including, but not limited to insulin pumps or insulin pens, having an embedded library configured to communicate with the sensor control device 102. Although the illustrated embodiments of the analyte monitoring system 100 include only one of each of the illustrated devices, this disclosure contemplates the analyte monitoring system 100 incorporate multiples of each component interacting throughout the system. For example and without limitation, as embodied herein, data receiving device 120 and/or multi-purpose data receiving device 130 can include multiples of each. As embodied herein, multiple data receiving devices 130 can communicate directly with sensor control device 102 as described herein. Additionally or alternatively, a data receiving device 130 can communicate with secondary data receiving devices 130 to provide analyte data, or visualization or analysis of the data, for secondary display to the user or other authorized parties.

Figure 2A:
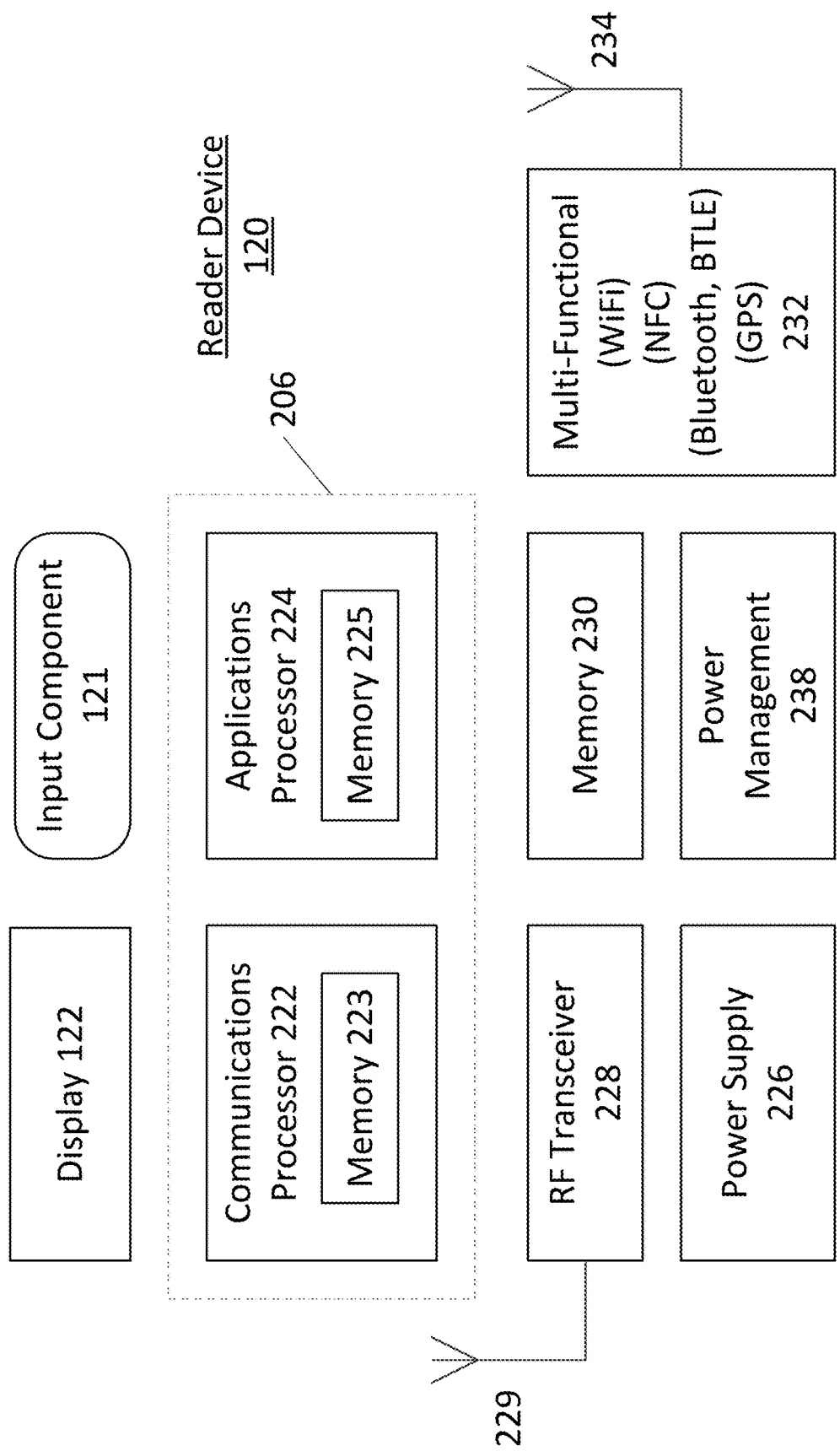
FIG. 2A is a block diagram depicting an example embodiment of a reader device.

FIG. 2A is a block diagram depicting an example embodiment of a data receiving device 120 configured as a smartphone. Here, data receiving device 120 can include a display 122, input component 121, and a processing core 206 including a communications processor 222 coupled with memory 223 and an applications processor 224 coupled with memory 225. Also included can be separate memory 230, RF transceiver 228 with antenna 229, and power supply 226 with power management module 238. Further included can be a multi-functional transceiver 232 which can communicate over Wi-Fi, NFC, Bluetooth, BTLE, and GPS with an antenna 234. As understood by one of skill in the art, these components are electrically and communicatively coupled in a manner to make a functional device.

Data receiving device 120 can be a mobile communication device such as, for example, a Wi-Fi or internet enabled smartphone, tablet, or personal digital assistant (PDA). Examples of smartphones can include, but are not limited to, those phones based on a WINDOWS operating system, ANDROID operating system, IPHONE operating system, PALM, WEBOS, BLACKBERRY operating system, or SYMBIAN operating system, with data network connectivity functionality for data communication over an internet connection and/or a local area network (LAN).

Data receiving device 120 can also be configured as a mobile smart wearable electronics assembly, such as an optical assembly that is worn over or adjacent to the user's eye (e.g., a smart glass or smart glasses, such as GOOGLE GLASSES). This optical assembly can have a transparent display that displays information about the user's analyte level (as described herein) to the user while at the same time allowing the user to see through the display such that the user's overall vision is minimally obstructed. The optical assembly can be capable of wireless communications similar to a smartphone. Other examples of wearable electronics include devices that are worn around or in the proximity of the user's wrist (e.g., a smart watch, etc.), neck (e.g., a necklace, etc.), head (e.g., a headband, hat, etc.), chest, or the like.

Figure 2B:
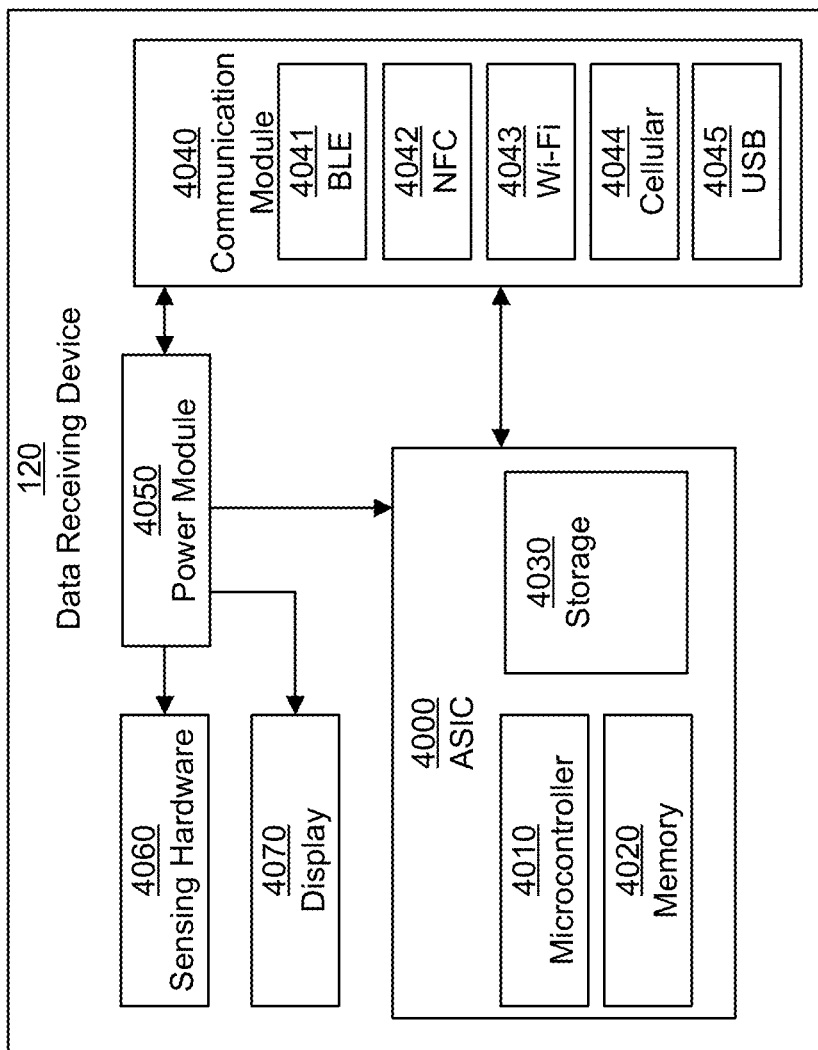
FIG. 2B is a block diagram illustrating an example data receiving device for communicating with the sensor according to exemplary embodiments of the disclosed subject matter.

For purpose of illustration and not limitation, reference is made to another exemplary embodiment of a data receiving device 120 for use with the disclosed subject matter as shown in FIG. 2B. The data receiving device 120, and the related multi-purpose data receiving device 130, includes components germane to the discussion of the sensor control device 102 and its operations and additional components can be included. In particular embodiments, the data receiving device 120 and multi-purpose data receiving device 130 can be or include components provided by a third party and are not necessarily restricted to include devices made by the same manufacturer as the sensor control device 102.

As illustrated in FIG. 2B, the data receiving device 120 includes an ASIC 4000 including a microcontroller 4010, memory 4020, and storage 4030 and communicatively coupled with a communication module 4040. Power for the components of the data receiving device 120 can be delivered by a power module 4050, which as embodied herein can include a rechargeable battery. The data receiving device 120 can further include a display 4070 for facilitating review of analyte data received from a sensor control device 102 or other device (e.g., user device 145 or remote application server 155). The data receiving device 120 can include separate user interface components (e.g., physical keys, light sensors, microphones, etc.).

The communication module 4040 can include a BLE module 4041 and an NFC module 4042. The data receiving device 120 can be configured to wirelessly couple with the sensor control device 102 and transmit commands to and receive data from the sensor control device 102. As embodied herein, the data receiving device 120 can be configured to operate, with respect to the sensor control device 102 as described herein, as an NFC scanner and a BLE end point via specific modules (e.g., BLE module 4042 or NFC module 4043) of the communication module 4040. For example, the data receiving device 120 can issue commands (e.g., activation commands for a data broadcast mode of the sensor; pairing commands to identify the data receiving device 120; OTA programming commands) to the sensor control device 102 using a first module of the communication module 4040 and receive data from and transmit data to the sensor control device 102 using a second module of the communication module 4040. The data receiving device 120 can be configured for communication with a user device 145 via a Universal Serial Bus (USB) module 4045 of the communication module 4040.

As another example, the communication module 4040 can include, for example, a cellular radio module 4044. The cellular radio module 4044 can include one or more radio transceivers for communicating using broadband cellular networks, including, but not limited to third generation (3G), fourth generation (4G), and fifth generation (5G) networks. Additionally, the communication module 4040 of the data receiving device 120 can include a Wi-Fi radio module 4043 for communication using a wireless local area network according to one or more of the IEEE 802.11 standards (e.g., 802.11a, 802.11b, 802.11g, 802.11n (aka Wi-Fi 4), 802.11ac (aka Wi-Fi 5), 802.11ax (aka Wi-Fi 6)). Using the cellular radio module 4044 or Wi-Fi radio module 4043, the data receiving device 120 can communicate with the remote application server 155 to receive analyte data or provide updates or input received from a user (e.g., through one or more user interfaces). Although not illustrated, the communication module 5040 of the analyte sensor 120 can similarly include a cellular radio module or Wi-Fi radio module.

As embodied herein, the data receiving device 120 can be configured for communication via a Universal Serial Bus (USB) module 345 of the communication module 340. The data receiving device 120 can communicate with a user device 140 for example over the USB module 345. The data receiving device 120 can, for example, receive software or firmware updates via USB, receive bulk data via USB, or upload data to the remote server 150 via the user device 140. USB connections can be authenticated on each plug event. Authentication can use, for example, a two-, three-, four-, or five-pass design with different keys. The USB system can support a variety of different sets of keys for encryption and authentication. Keys can be aligned with differential roles (clinical, manufacturer, user, etc.). Sensitive commands that can leak security information can trigger authenticated encryption using an authenticated additional keyset.

As embodied herein, the on-board storage 4030 of the data receiving device 120 can store analyte data received from the sensor control device 102. Further, the data receiving device 120, multi-purpose data receiving device 130, or a user device 145 can be configured to communicate with a remote application server 155 via a wide area network. As embodied herein, the sensor control device 102 can provide data to the data receiving device 120 or multi-purpose data receiving device 130. The data receiving device 120 can transmit the data to the user computing device 145. The user computing device 145 (or the multi-purpose data receiving device 130) can in turn transmit that data to a remote application server 155 for processing and analysis.

As embodied herein, the data receiving device 120 can further include sensing hardware 4060 similar to, or expanded from, the sensing hardware 5060 of the sensor control device 102. In particular embodiments, the data receiving device 120 can be configured to operate in coordination with the sensor control device 102 and based on analyte data received from the sensor control device 102. As an example, where the sensor control device 102 glucose sensor, the data receiving device 120 can be or include an insulin pump or insulin injection pen. In coordination, the compatible device 130 can adjust an insulin dosage for a user based on glucose values received from the analyte sensor.

Figure 2C:
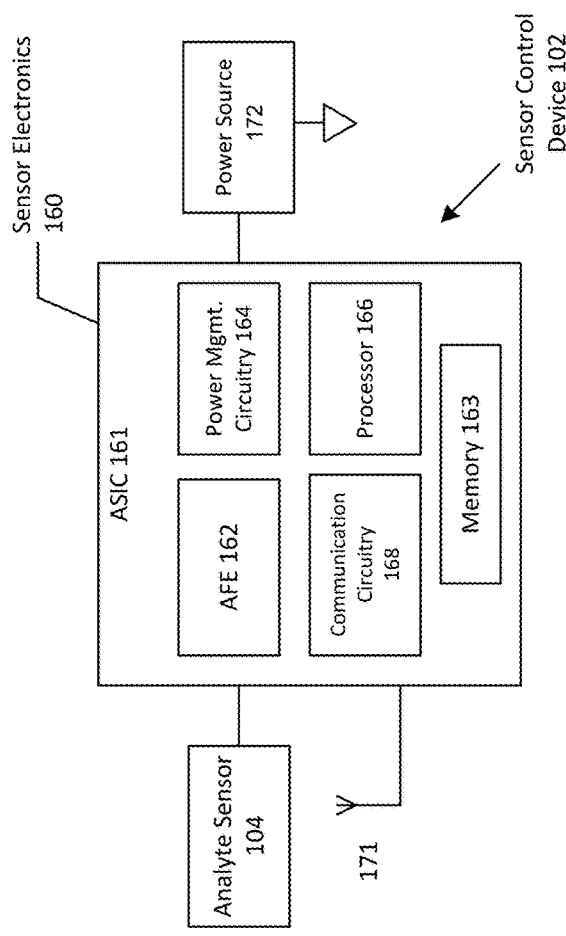
FIGS. 2C and 2D are block diagrams depicting example embodiments of sensor control devices.
Figure 2D:
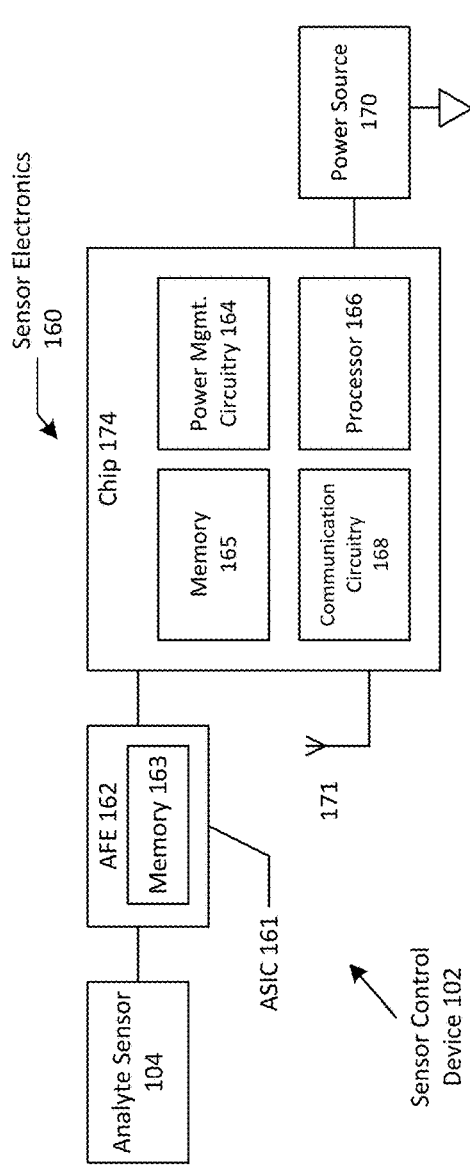

FIGS. 2C and 2D are block diagrams depicting example embodiments of sensor control device 102 having analyte sensor 104 and sensor electronics 160 (including analyte monitoring circuitry) that can have the majority of the processing capability for rendering end-result data suitable for display to the user. In FIG. 2C, a single semiconductor chip 161 is depicted that can be a custom application specific integrated circuit (ASIC). Shown within ASIC 161 are certain high-level functional units, including an analog front end (AFE) 162, power management (or control) circuitry 164, processor 166, and communication circuitry 168 (which can be implemented as a transmitter, receiver, transceiver, passive circuit, or otherwise according to the communication protocol). In this embodiment, both AFE 162 and processor 166 are used as analyte monitoring circuitry, but in other embodiments either circuit can perform the analyte monitoring function. Processor 166 can include one or more processors, microprocessors, controllers, and/or microcontrollers, each of which can be a discrete chip or distributed amongst (and a portion of) a number of different chips.

A memory 163 is also included within ASIC 161 and can be shared by the various functional units present within ASIC 161, or can be distributed amongst two or more of them. Memory 163 can also be a separate chip. Memory 163 can be volatile and/or non-volatile memory. In this embodiment, ASIC 161 is coupled with power source 172, which can be a coin cell battery, or the like. AFE 162 interfaces with in vivo analyte sensor 104 and receives measurement data therefrom and outputs the data to processor 166 in digital form, which in turn processes the data to arrive at the end-result glucose discrete and trend values, etc. This data can then be provided to communication circuitry 168 for sending, by way of antenna 171, to data receiving device 120 (not shown), for example, where minimal further processing is needed by the resident software application to display the data.

FIG. 2D is similar to FIG. 2C but instead includes two discrete semiconductor chips 162 and 174, which can be packaged together or separately. Here, AFE 162 is resident on ASIC 161. Processor 166 is integrated with power management circuitry 164 and communication circuitry 168 on chip 174. AFE 162 includes memory 163 and chip 174 includes memory 165, which can be isolated or distributed within. In one example embodiment, AFE 162 is combined with power management circuitry 164 and processor 166 on one chip, while communication circuitry 168 is on a separate chip. In another example embodiment, both AFE 162 and communication circuitry 168 are on one chip, and processor 166 and power management circuitry 164 are on another chip. It should be noted that other chip combinations are possible, including three or more chips, each bearing responsibility for the separate functions described, or sharing one or more functions for fail-safe redundancy.

Figure 2E:
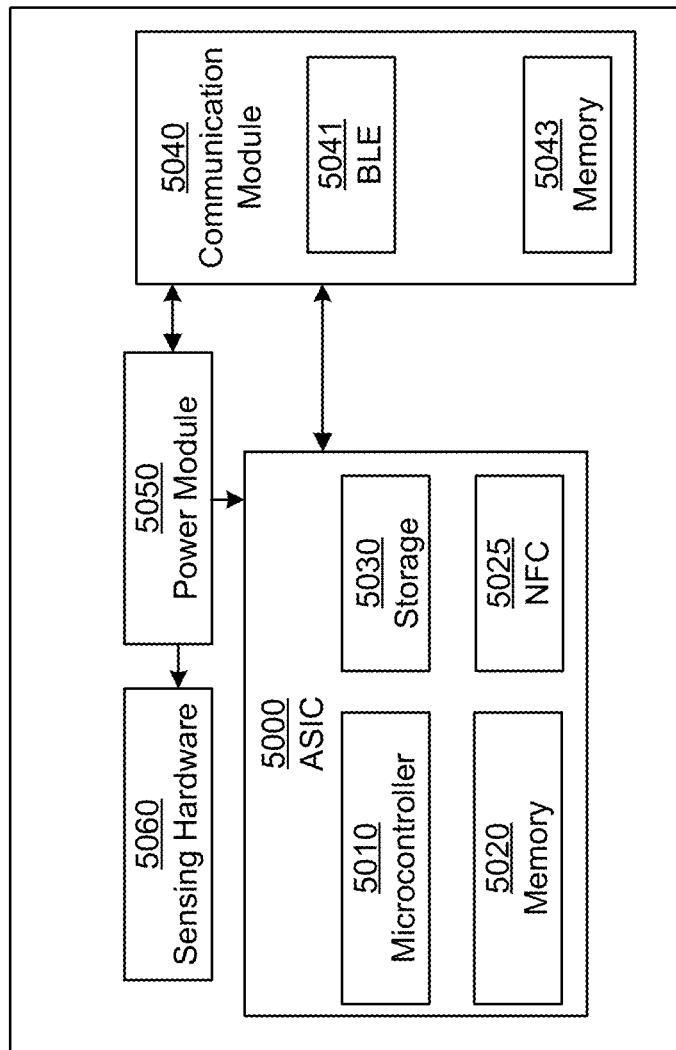
FIG. 2E is a block diagram illustrating an example analyte sensor according to exemplary embodiments of the disclosed subject matter.

For purpose of illustration and not limitation, FIG. 2E depicts another exemplary embodiment of a sensor control device 102 compatible with the security architecture and communication schemes described herein.

As embodied herein, the sensor control device 102 can include an Application-Specific Integrated Circuit ("ASIC") 5000 communicatively coupled with a communication module 5040. The ASIC 5000 can include a microcontroller core 5010, on-board memory 5020, and storage memory 5030. The storage memory 5030 can store data used in an authentication and encryption security architecture. The storage memory 5030 can store programming instructions for sensor control device 102. As embodied herein, certain communication chipsets can be embedded in the ASIC 5000 (e.g., an NFC transceiver 5025). The ASIC 5000 can receive power from a power module 5050, such as an on-board battery or from an NFC pulse. The storage memory 5030 of the ASIC 5000 can be programmed to include information such as an identifier for sensor control device 102 for identification and tracking purposes. The storage memory 5030 can also be programmed with configuration or calibration parameters for use by sensor control device 102 and its various components. The storage memory 5030 can include rewritable or one-time programming (OTP) memory. The storage memory 5030 can be updated using techniques described herein to extend the usefulness of sensor control device 102.

In particular embodiments, and as described herein, one or more of the memory 5020 of the ASIC 500 and the memory 5043 of the communication module 5040 can each be a so-called "one-time programmable" (OTP) memory, which can include supporting architectures or otherwise be configured to define the number times to which a particular address or region of the memory can be written, which can be one time or more than one time up to the defined number of times after which the memory can be marked as unusable or otherwise made unavailable for programming. Subject matter disclosed herein relate to systems and method for updating said OTP memories with new information. In particular, subject matter disclosed herein relate to systems and method for updating said OTP memories with information using OTA programming.

As embodied herein, the communication module 5040 of sensor control device 102 can be or include one or more modules to support communications with other devices of an analyte monitoring system 100. As an example only, and not by way of limitation, example communication modules 5040 can include a Bluetooth Low-Energy ("BLE") module 5041 As used throughout this disclosure, BLE refers to a short-range communication protocol optimized to make pairing of Bluetooth devices simple for end users. The communication module 5040 can transmit and receive data and commands via interaction with similarly-capable communication modules of a data receiving device 120 or user device 145. The communication module 5040 can include additional or alternative chipsets for use with similar short-range communication schemes, such as a personal area network according to IEEE 802.15 protocols, IEEE 802.11 protocols, infrared communications according to the Infrared Data Association standards (IrDA), etc.

To perform its functionalities, the sensor control device 102 can further include suitable sensing hardware 5060 appropriate to its function. As embodied herein, the sensing hardware 5060 can include an analyte sensor transcutaneously or subcutaneously positioned in contact with a bodily fluid of a subject. The analyte sensor can generate sensor data containing values corresponding to levels of one or more analytes within the bodily fluid.

The components of sensor control device 102 can be acquired by a user in multiple packages requiring final assembly by the user before delivery to an appropriate user location. FIGS. 3A-3D depict an example embodiment of an assembly process for sensor control device 102 by a user, including preparation of separate components before coupling the components in order to ready the sensor for delivery. FIGS. 3E-3F depict an example embodiment of delivery of sensor control device 102 to an appropriate user location by selecting the appropriate delivery location and applying device 102 to the location.

Figure 3A:
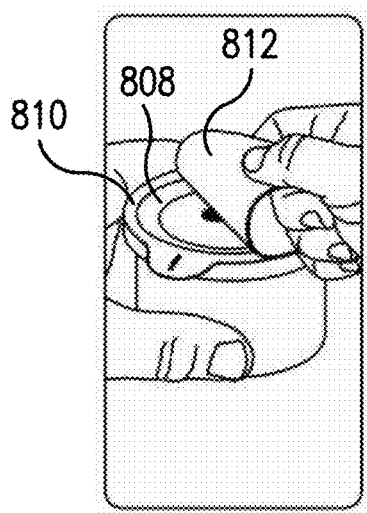
FIG. 3A is a proximal perspective view depicting an example embodiment of a user preparing a tray for an assembly.

FIG. 3A is a proximal perspective view depicting an example embodiment of a user preparing a container 810, configured here as a tray (although other packages can be used), for an assembly process. The user can accomplish this preparation by removing lid 812 from tray 810 to expose platform 808, for instance by peeling a non-adhered portion of lid 812 away from tray 810 such that adhered portions of lid 812 are removed. Removal of lid 812 can be appropriate in various embodiments so long as platform 808 is adequately exposed within tray 810. Lid 812 can then be placed aside.

Figure 3B:
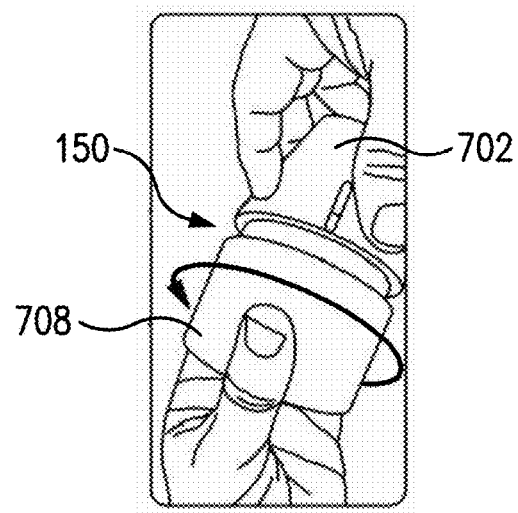
FIG. 3B is a side view depicting an example embodiment of a user preparing an applicator device for an assembly.
Figure 3C:
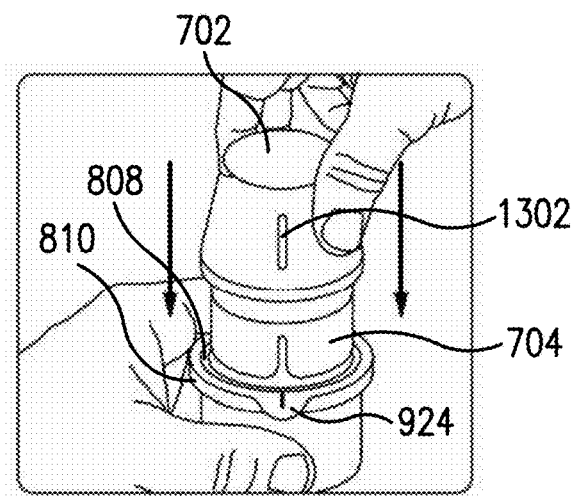
FIG. 3C is a proximal perspective view depicting an example embodiment of a user inserting an applicator device into a tray during an assembly.

FIG. 3B is a side view depicting an example embodiment of a user preparing an applicator device 150 for assembly. Applicator device 150 can be provided in a sterile package sealed by an applicator cap 708. Preparation of applicator device 150 can include uncoupling housing 702 from applicator cap 708 to expose sheath 704 (FIG. 3C). This can be accomplished by unscrewing (or otherwise uncoupling) applicator cap 708 from housing 702. Applicator cap 708 can then be placed aside.

FIG. 3C is a proximal perspective view depicting an example embodiment of a user inserting an applicator device 150 into a tray 810 during an assembly. Initially, the user can insert sheath 704 into platform 808 inside tray 810 after aligning housing orienting feature 1302 (or slot or recess)

and tray orienting feature 924 (an abutment or detent). Inserting sheath 704 into platform 808 temporarily unlocks sheath 704 relative to housing 702 and also temporarily unlocks platform 808 relative to tray 810. At this stage, removal of applicator device 150 from tray 810 will result in the same state prior to initial insertion of applicator device 150 into tray 810 (i.e., the process can be reversed or aborted at this point and then repeated without consequence).

Sheath 704 can maintain position within platform 808 with respect to housing 702 while housing 702 is distally advanced, coupling with platform 808 to distally advance platform 808 with respect to tray 810. This step unlocks and collapses platform 808 within tray 810. Sheath 704 can contact and disengage locking features (not shown) within tray 810 that unlock sheath 704 with respect to housing 702 and prevent sheath 704 from moving (relatively) while housing 702 continues to distally advance platform 808. At the end of advancement of housing 702 and platform 808, sheath 704 is permanently unlocked relative to housing 702. A sharp and sensor (not shown) within tray 810 can be coupled with an electronics housing (not shown) within housing 702 at the end of the distal advancement of housing 702. Operation and interaction of the applicator device 150 and tray 810 are further described below.

Figure 3D:
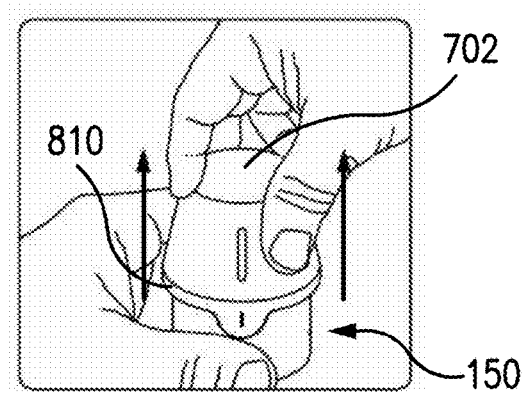
FIG. 3D is a proximal perspective view depicting an example embodiment of a user removing an applicator device from a tray during an assembly.
Figure 3E:
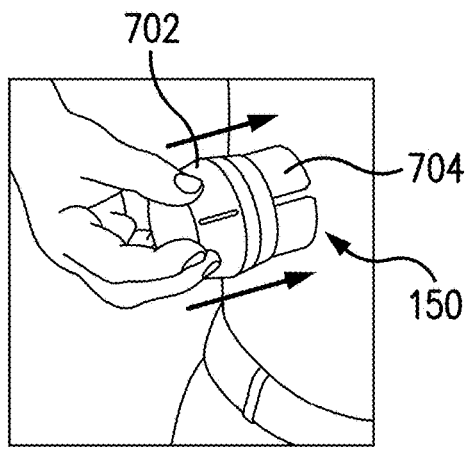
FIG. 3E is a proximal perspective view depicting an example embodiment of a patient applying a sensor using an applicator device.
Figure 3F:
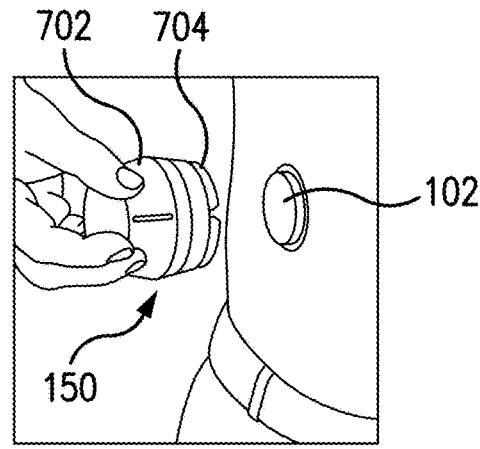
FIG. 3F is a proximal perspective view depicting an example embodiment of a patient with an applied sensor and a used applicator device.

FIG. 3D is a proximal perspective view depicting an example embodiment of a user removing an applicator device 150 from a tray 810 during an assembly. A user can remove applicator 150 from tray 810 by proximally advancing housing 702 with respect to tray 810 or other motions having the same end effect of uncoupling applicator 150 and tray 810. The applicator device 150 is removed with sensor control device 102 (not shown) fully assembled (sharp, sensor, electronics) therein and positioned for delivery.

FIG. 3E is a proximal perspective view depicting an example embodiment of a patient applying sensor control device 102 using applicator device 150 to a target area of skin, for instance, on an abdomen or other appropriate location. Advancing housing 702 distally collapses sheath 704 within housing 702 and applies the sensor to the target location such that an adhesive layer on the bottom side of sensor control device 102 adheres to the skin. The sharp is automatically retracted when housing 702 is fully advanced, while the sensor (not shown) is left in position to measure analyte levels.

FIG. 3F is a proximal perspective view depicting an example embodiment of a patient with sensor control device 102 in an applied position. The user can then remove applicator 150 from the application site.

System 100, described with respect to FIGS. 3A-3F and elsewhere herein, can provide a reduced or eliminated chance of accidental breakage, permanent deformation, or incorrect assembly of applicator components compared to prior art systems. Since applicator housing 702 directly engages platform 808 while sheath 704 unlocks, rather than indirect engagement via sheath 704, relative angularity between sheath 704 and housing 702 will not result in breakage or permanent deformation of the arms or other components. The potential for relatively high forces (such as in conventional devices) during assembly will be reduced, which in turn reduces the chance of unsuccessful user assembly.

FIG. 4A is a side view depicting an example embodiment of an applicator device 150 coupled with a screw applicator cap 708. This is an example of how applicator 150 is shipped to and received by a user, prior to assembly by the user with a sensor. FIG. 4B is a side perspective view depicting applicator 150 and applicator cap 708 after being decoupled.

FIG. 4C is a perspective view depicting an example embodiment of a distal end of an applicator device 150 with electronics housing 706 and adhesive patch 105 removed from the position they would have retained within sensor carrier 710 of sheath 704, when applicator cap 708 is in place.

Figure 4E:
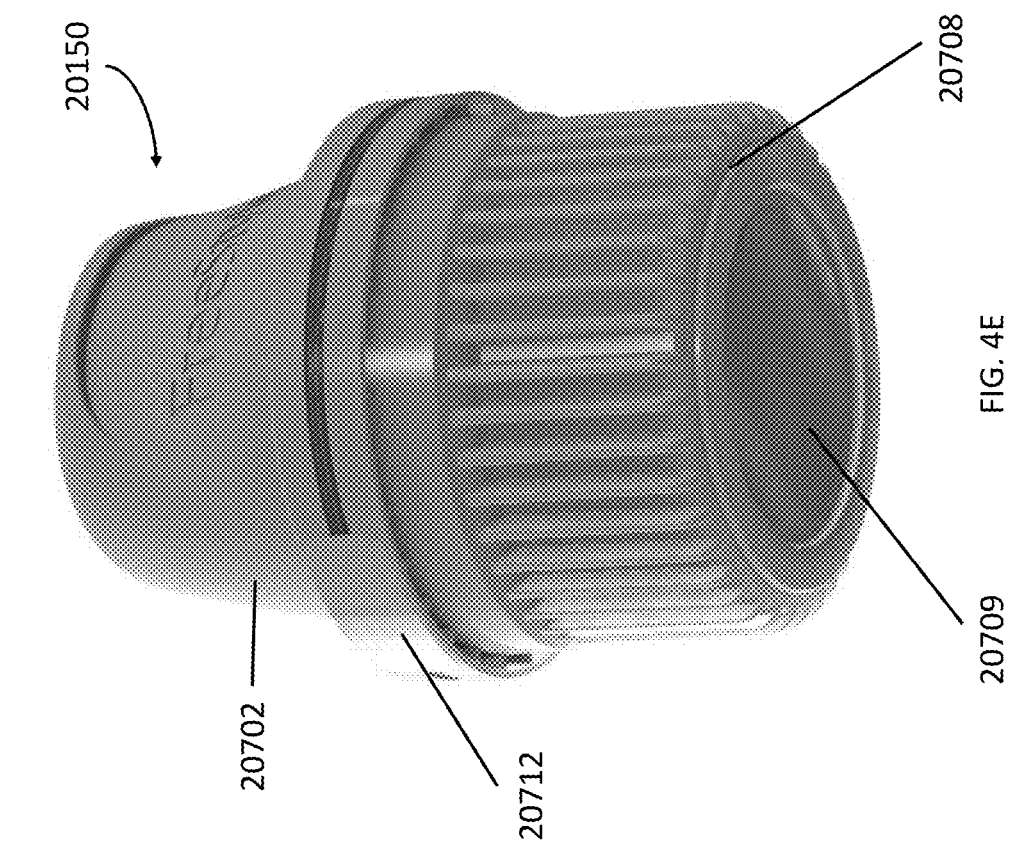
FIG. 4E is a bottom perspective view of the applicator device of FIG. 4D.
Figure 4D:
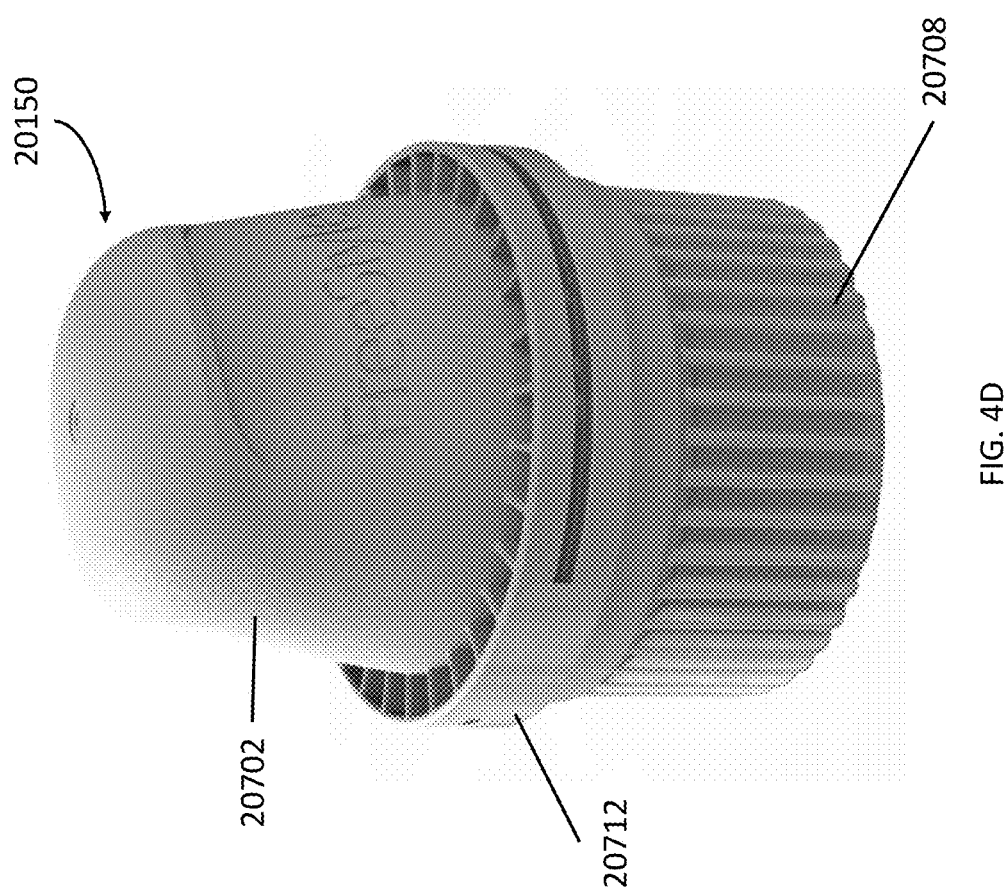
FIG. 4D is a top perspective view of an exemplary applicator device in accordance with the disclosed subject matter.
Figure 4F:
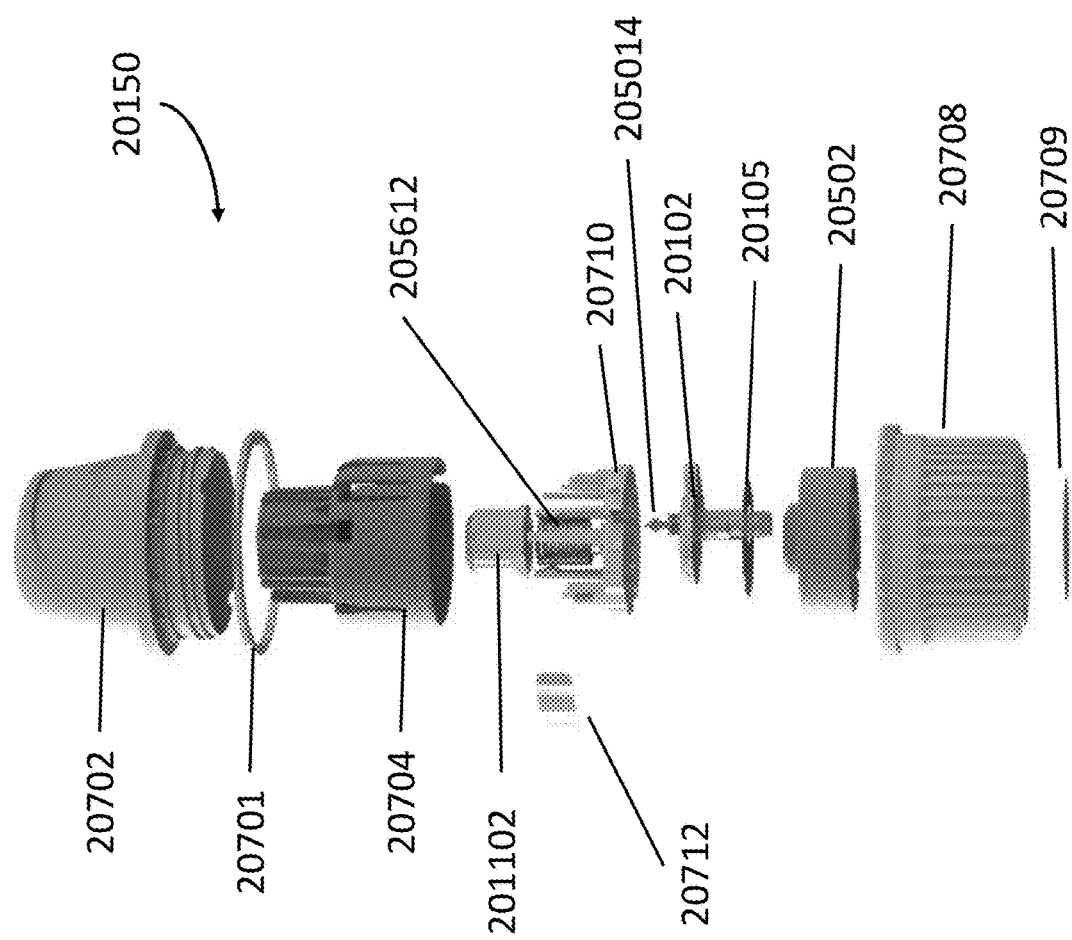
FIG. 4F is an exploded view of the applicator device of FIG. 4D.
Figure 4G:
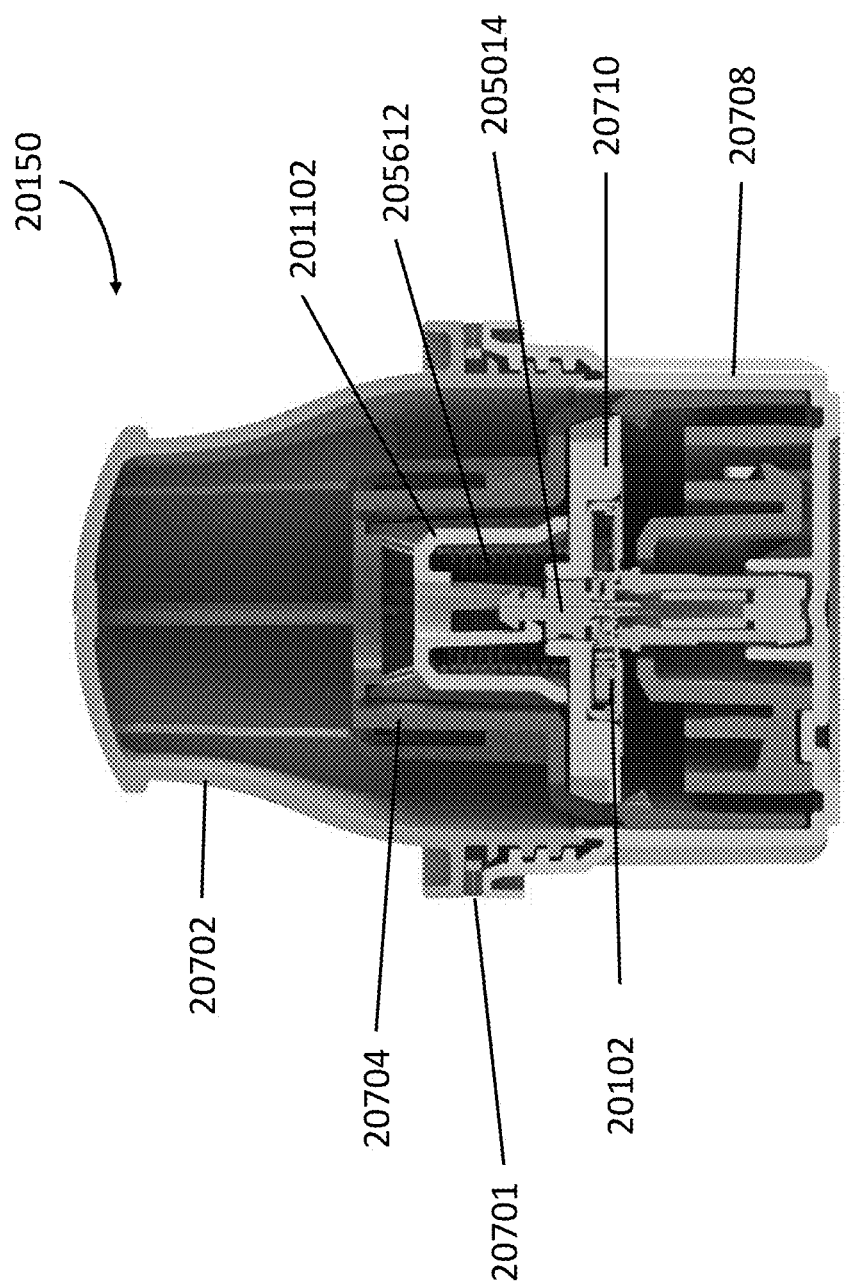
FIG. 4G is a side cutaway view of the applicator device of FIG. 4D.

Referring to FIGS. 4D-G for purpose of illustration and not limitation, another example embodiment of an applicator device 20150 can be provided to a user as a single integrated assembly. FIGS. 4D and 4E provide perspective top and bottom views, respectively, of the applicator device 20150, FIG. 4F provides an exploded view of the applicator device 20150 and FIG. 4G provides a side cut-away view. The perspective views illustrate how applicator 20150 is shipped to and received by a user. The exploded and cut-away views illustrate the components of the applicator device 20150. The applicator device 20150 can include a housing 20702, gasket 20701, sheath 20704, sharp carrier 201102, spring 205612, sensor carrier 20710 (also referred to as a "puck carrier"), sharp hub 205014, sensor control device (also referred to as a "puck") 20102, adhesive patch 20105, desiccant 20502, applicator cap 20708, serial label 20709, and tamper evidence feature 20712. In some embodiments, as received by a user, only the housing 20702, applicator cap 20708, tamper evidence feature 20712, and label 20709 are visible. The tamper evidence feature 20712 can be, for example, a sticker coupled to each of the housing 20702 and the applicator cap 20708, and tamper evidence feature 20712 can be damaged, for example, irreparably, by uncoupling housing 20702 and applicator cap 20708, thereby indicating to a user that the housing 20702 and applicator cap 20708 have been previously uncoupled. These features are described in greater detail below.

Figure 5:
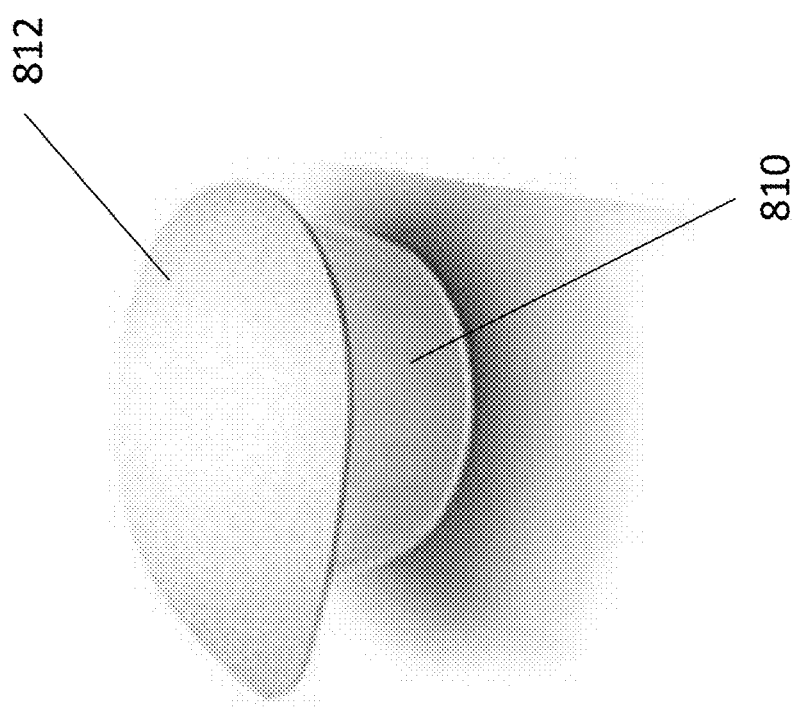
FIG. 5 is a proximal perspective view depicting an example embodiment of a tray with sterilization lid coupled.

FIG. 5 is a proximal perspective view depicting an example embodiment of a tray 810 with sterilization lid 812 removably coupled thereto, which can be representative of how the package is shipped to and received by a user prior to assembly.

Figure 6A:
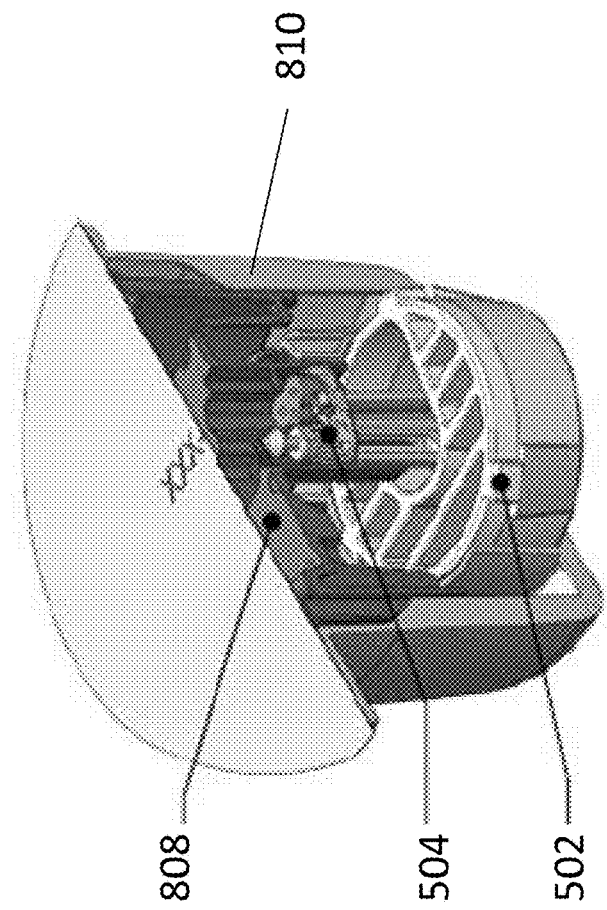
FIG. 6A is a proximal perspective cutaway view depicting an example embodiment of a tray with sensor delivery components.

FIG. 6A is a proximal perspective cutaway view depicting sensor delivery components within tray 810. Platform 808 is slidably coupled within tray 810. Desiccant 502 is stationary with respect to tray 810. Sensor module 504 is mounted within tray 810.

Figure 6B:
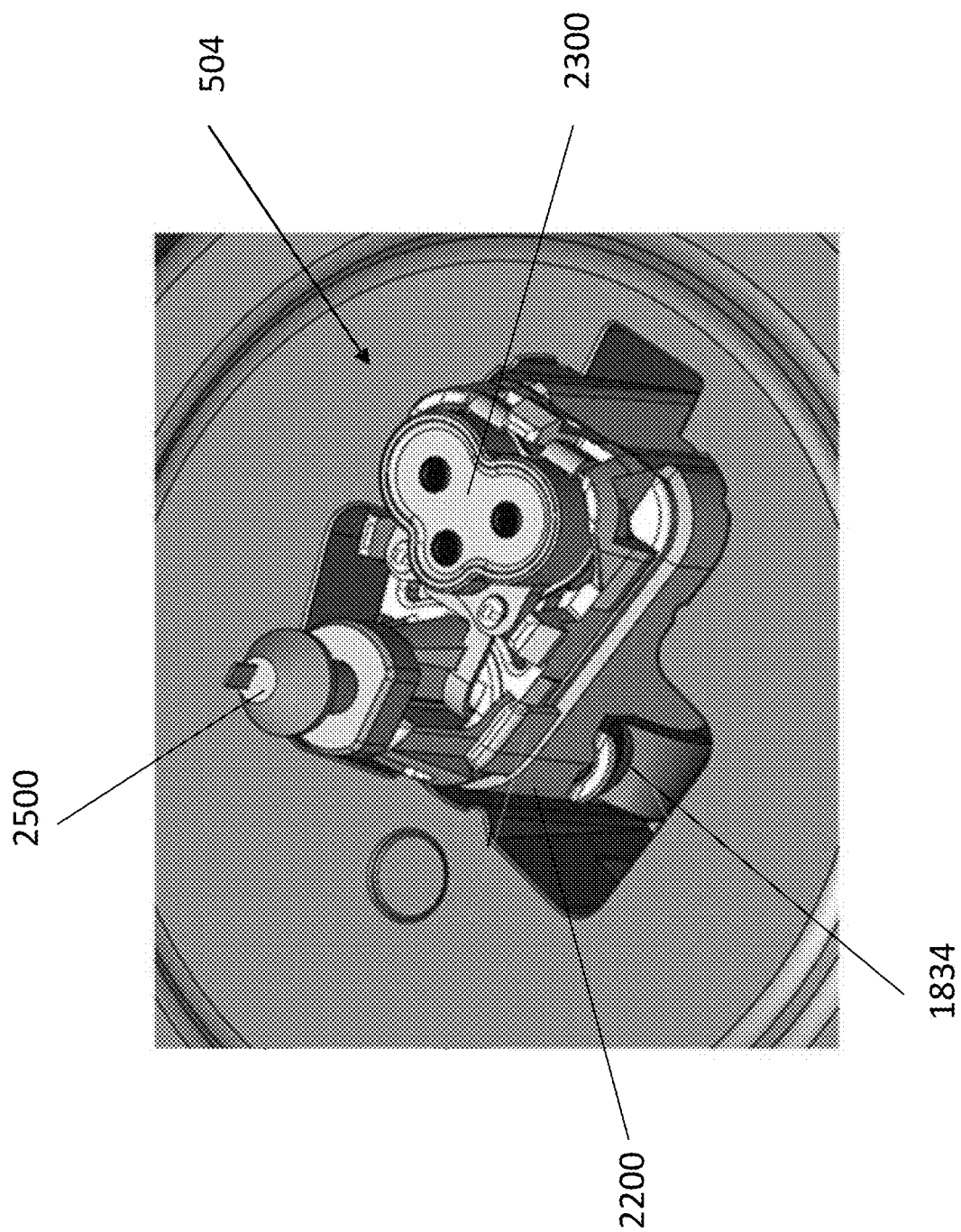
FIG. 6B is a proximal perspective view depicting sensor delivery components.

FIG. 6B is a proximal perspective view depicting sensor module 504 in greater detail. Here, retention arm extensions 1834 of platform 808 releasably secure sensor module 504 in position. Module 2200 is coupled with connector 2300, sharp module 2500 and sensor (not shown) such that during assembly they can be removed together as sensor module 504.

Referring briefly again to FIGS. 1A and 3A-3G, for the two-piece architecture system, the sensor tray 810 and the sensor applicator 150 are provided to the user as separate packages, thus requiring the user to open each package and finally assemble the system. In some applications, the discrete, sealed packages allow the sensor tray 810 and the sensor applicator 150 to be sterilized in separate sterilization processes unique to the contents of each package and otherwise incompatible with the contents of the other. More specifically, the sensor tray 810, which includes the plug assembly 207, including the sensor 104 and the sharp 220, can be sterilized using radiation sterilization, such as electron beam (or "e-beam") irradiation. Suitable radiation sterilization processes include, but are not limited to, e-beam irradiation, gamma ray irradiation, X-ray irradiation, or any combination thereof. Radiation sterilization, however, can damage the electrical components arranged within the electronics housing of the sensor control device 102. Consequently, if the sensor applicator 150, which contains the electronics housing of the sensor control device 102, needs to be sterilized, it can be sterilized via another method, such as gaseous chemical sterilization using, for example, ethylene oxide. Gaseous chemical sterilization, however, can damage the enzymes or other chemistry and biologies included on the sensor 104. Because of this sterilization incompatibility, the sensor tray 810 and the sensor applicator 150 are commonly sterilized in separate sterilization processes and subsequently packaged separately, which requires the user to finally assemble the components for use.

Figure 7A:
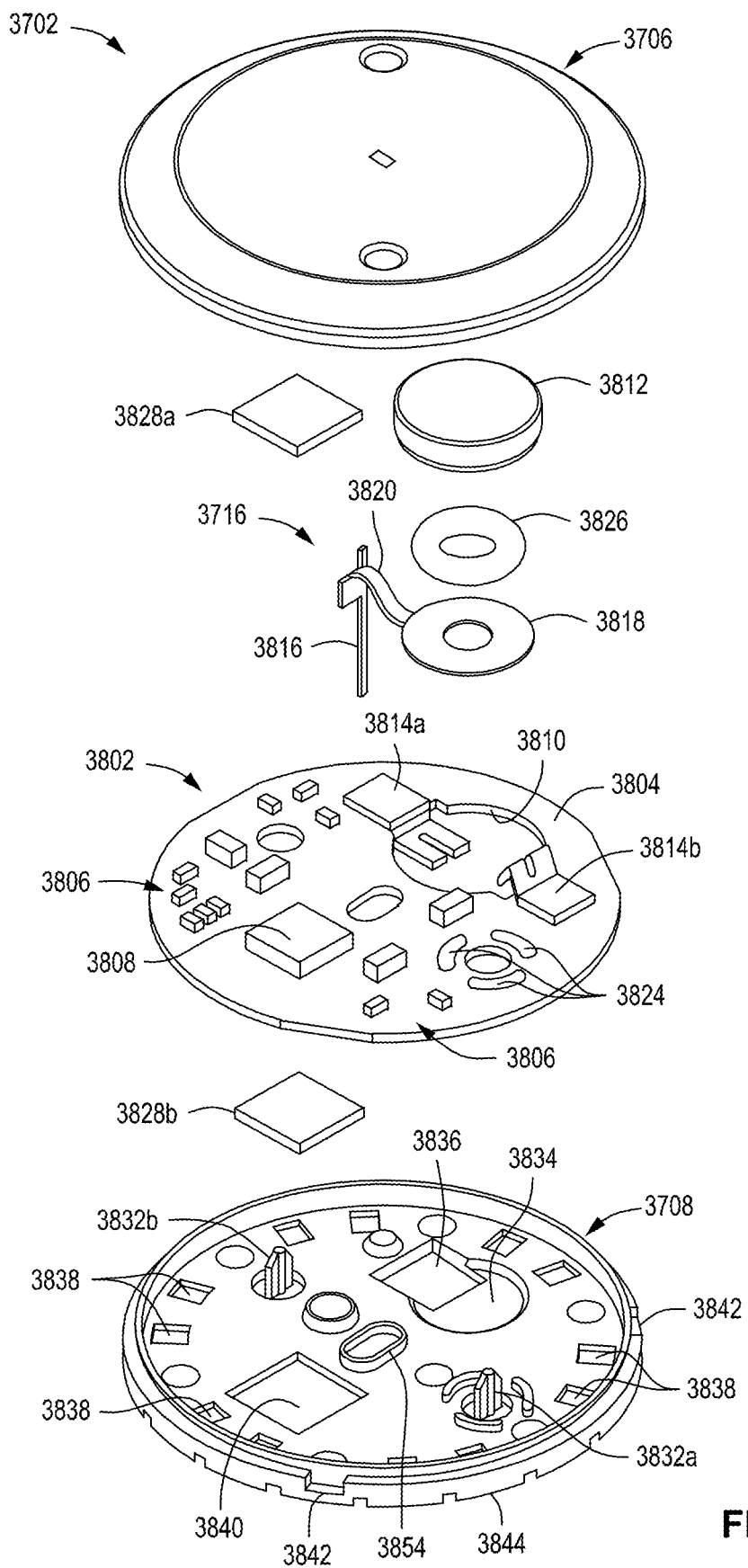
FIGS. 7A and 7B are isometric exploded top and bottom views, respectively, of an exemplary sensor control device.
Figure 7B:
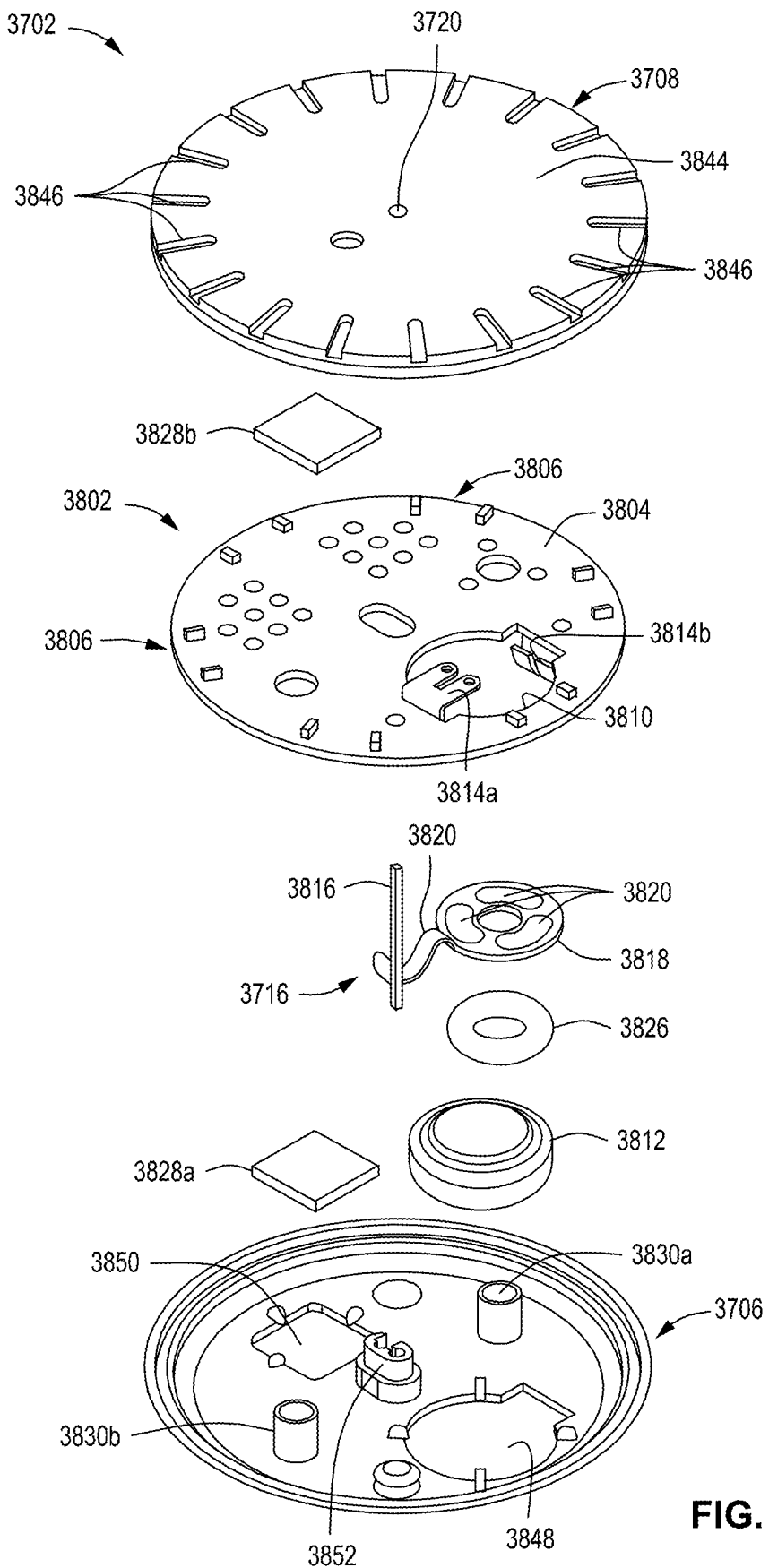

FIGS. 7A and 7B are exploded top and bottom views, respectively, of the sensor control device 3702, according to one or more embodiments. The shell 3706 and the mount 3708 operate as opposing clamshell halves that enclose or otherwise substantially encapsulate the various electronic components of the sensor control device 3702. As illustrated, the sensor control device 3702 can include a printed circuit board assembly (PCBA) 3802 that includes a printed circuit board (PCB) 3804 having a plurality of electronic modules 3806 coupled thereto. Example electronic modules 3806 include, but are not limited to, resistors, transistors, capacitors, inductors, diodes, and switches. Prior sensor control devices commonly stack PCB components on only one side of the PCB. In contrast, the PCB components 3806 in the sensor control device 3702 can be dispersed about the surface area of both sides (i.e., top and bottom surfaces) of the PCB 3804.

Besides the electronic modules 3806, the PCBA 3802 can also include a data processing unit 3808 mounted to the PCB 3804. The data processing unit 3808 can comprise, for example, an application specific integrated circuit (ASIC) configured to implement one or more functions or routines associated with operation of the sensor control device 3702. More specifically, the data processing unit 3808 can be configured to perform data processing functions, where such functions can include but are not limited to, filtering and encoding of data signals, each of which corresponds to a sampled analyte level of the user. The data processing unit 3808 can also include or otherwise communicate with an antenna for communicating with the reader device 106.

A battery aperture 3810 can be defined in the PCB 3804 and sized to receive and seat a battery 3812 configured to power the sensor control device 3702. An axial battery contact 3814a and a radial battery contact 3814b can be coupled to the PCB 3804 and extend into the battery aperture 3810 to facilitate transmission of electrical power from the battery 3812 to the PCB 3804. As their names suggest, the axial battery contact 3814a can be configured to provide an axial contact for the battery 3812, while the radial battery contact 3814b can provide a radial contact for the battery 3812. Locating the battery 3812 within the battery aperture 3810 with the battery contacts 3814a,b helps reduce the height H of the sensor control device 3702, which allows the PCB 3804 to be located centrally and its components to be dispersed on both sides (i.e., top and bottom surfaces). This also helps facilitate the chamfer 3718 provided on the electronics housing 3704.

The sensor 3716 can be centrally located relative to the PCB 3804 and include a tail 3816, a flag 3818, and a neck 3820 that interconnects the tail 3816 and the flag 3818. The tail 3816 can be configured to extend through the central aperture 3720 of the mount 3708 to be transcutaneously received beneath a user's skin. Moreover, the tail 3816 can have an enzyme or other chemistry included thereon to help facilitate analyte monitoring.

The flag 3818 can include a generally planar surface having one or more sensor contacts 3822 (three shown in FIG. 7B) arranged thereon. The sensor contact(s) 3822 can be configured to align with and engage a corresponding one or more circuitry contacts 3824 (three shown in FIG. 7A) provided on the PCB 3804. In some embodiments, the sensor contact(s) 3822 can comprise a carbon impregnated polymer printed or otherwise digitally applied to the flag 3818. Prior sensor control devices typically include a connector made of silicone rubber that encapsulates one or more compliant carbon impregnated polymer modules that serve as electrical conductive contacts between the sensor and the PCB. In contrast, the presently disclosed sensor contacts(s) 3822 provide a direct connection between the sensor 3716 and the PCB 3804 connection, which eliminates the need for the prior art connector and advantageously reduces the height H. Moreover, eliminating the compliant carbon impregnated polymer modules eliminates a significant circuit resistance and therefor improves circuit conductivity.

The sensor control device 3702 can further include a compliant member 3826, which can be arranged to interpose the flag 3818 and the inner surface of the shell 3706. More specifically, when the shell 3706 and the mount 3708 are assembled to one another, the compliant member 3826 can be configured to provide a passive biasing load against the flag 3818 that forces the sensor contact(s) 3822 into continuous engagement with the corresponding circuitry contact(s) 3824. In the illustrated embodiment, the compliant member 3826 is an elastomeric O-ring, but could alternatively comprise any other type of biasing device or mechanism, such as a compression spring or the like, without departing from the scope of the disclosure.

The sensor control device 3702 can further include one or more electromagnetic shields, shown as a first shield 3828a and a second shield The shell 3706 can provide or otherwise define a first clocking receptacle 3830a (FIG. 7B) and a second clocking receptacle 3830b (FIG. 7B), and the mount 3708 can provide or otherwise define a first clocking post 3832a (FIG. 7A) and a second clocking post 3832b (FIG. 7A). Mating the first and second clocking receptacles 3830a,b with the first and second clocking posts 3832a,b, respectively, will properly align the shell 3706 to the mount 3708.

Referring specifically to FIG. 7A, the inner surface of the mount 3708 can provide or otherwise define a plurality of pockets or depressions configured to accommodate various component parts of the sensor control device 3702 when the shell 3706 is mated to the mount 3708. For example, the inner surface of the mount 3708 can define a battery locator 3834 configured to accommodate a portion of the battery 3812 when the sensor control device 3702 is assembled. An adjacent contact pocket 3836 can be configured to accommodate a portion of the axial contact 3814a.

Moreover, a plurality of module pockets 3838 can be defined in the inner surface of the mount 3708 to accommodate the various electronic modules 3806 arranged on the bottom of the PCB 3804. Furthermore, a shield locator 3840 can be defined in the inner surface of the mount 3708 to accommodate at least a portion of the second shield 3828b when the sensor control device 3702 is assembled. The battery locator 3834, the contact pocket 3836, the module pockets 3838, and the shield locator 3840 all extend a short distance into the inner surface of the mount 3708 and, as a result, the overall height H of the sensor control device 3702 can be reduced as compared to prior sensor control devices. The module pockets 3838 can also help minimize the diameter of the PCB 3804 by allowing PCB components to be arranged on both sides (i.e., top and bottom surfaces).

Still referring to FIG. 7A, the mount 3708 can further include a plurality of carrier grip features 3842 (two shown) defined about the outer periphery of the mount 3708. The carrier grip features 3842 are axially offset from the bottom 3844 of the mount 3708, where a transfer adhesive (not shown) can be applied during assembly. In contrast to prior sensor control devices, which commonly include conical carrier grip features that intersect with the bottom of the mount, the presently disclosed carrier grip features 3842 are offset from the plane (i.e., the bottom 3844) where the transfer adhesive is applied. This can prove advantageous in helping ensure that the delivery system does not inadvertently stick to the transfer adhesive during assembly. Moreover, the presently disclosed carrier grip features 3842 eliminate the need for a scalloped transfer adhesive, which simplifies the manufacture of the transfer adhesive and eliminates the need to accurately clock the transfer adhesive relative to the mount 3708. This also increases the bond area and, therefore, the bond strength.

Referring to FIG. 7B, the bottom 3844 of the mount 3708 can provide or otherwise define a plurality of grooves 3846, which can be defined at or near the outer periphery of the mount 3708 and equidistantly spaced from each other. A transfer adhesive (not shown) can be coupled to the bottom 3844 and the grooves 3846 can be configured to help convey (transfer) moisture away from the sensor control device 3702 and toward the periphery of the mount 3708 during use. In some embodiments, the spacing of the grooves 3846 can interpose the module pockets 3838 (FIG. 7A) defined on the opposing side (inner surface) of the mount 3708. As will be appreciated, alternating the position of the grooves 3846 and the module pockets 3838 ensures that the opposing features on either side of the mount 3708 do not extend into each other. This can help maximize usage of the material for the mount 3708 and thereby help maintain a minimal height H of the sensor control device 3702. The module pockets 3838 can also significantly reduce mold sink, and improve the flatness of the bottom 3844 that the transfer adhesive bonds to.

Still referring to FIG. 7B, the inner surface of the shell 3706 can also provide or otherwise define a plurality of pockets or depressions configured to accommodate various component parts of the sensor control device 3702 when the shell 3706 is mated to the mount 3708. For example, the inner surface of the shell 3706 can define an opposing battery locator 3848 arrangeable opposite the battery locator 3834 (FIG. 7A) of the mount 3708 and configured to accommodate a portion of the battery 3812 when the sensor control device 3702 is assembled. The opposing battery locator 3848 extends a short distance into the inner surface of the shell 3706, which helps reduce the overall height H of the sensor control device 3702.

A sharp and sensor locator 3852 can also be provided by or otherwise defined on the inner surface of the shell 3706. The sharp and sensor locator 3852 can be configured to receive both the sharp (not shown) and a portion of the sensor 3716. Moreover, the sharp and sensor locator 3852 can be configured to align and/or mate with a corresponding sharp and sensor locator 2054 (FIG. 7A) provided on the inner surface of the mount 3708.

Figure 8A:
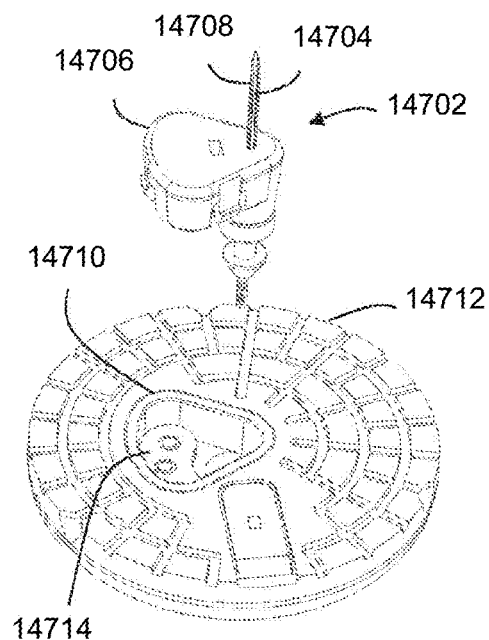
FIG. 8A-8C are assembly and cross-sectional views of an on-body device including an integrated connector for the sensor assembly.
Figure 8B:
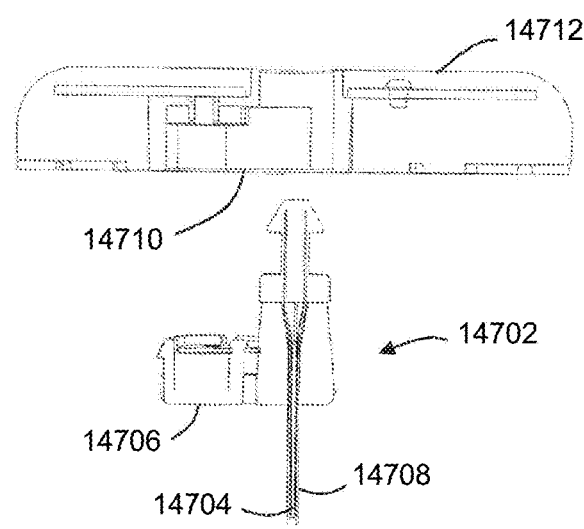
Figure 8C:
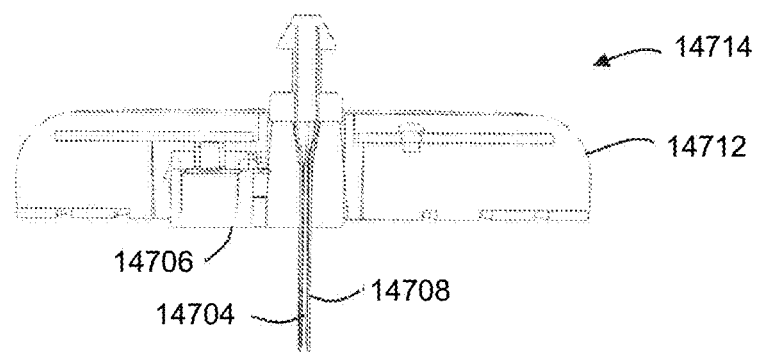

According to embodiments of the present disclosure, an alternative sensor assembly/electronics assembly connection approach is illustrated in FIGS. 8A to 8C. As shown, the sensor assembly 14702 includes sensor 14704, connector support 14706, and sharp 14708. Notably, a recess or receptacle 14710 can be defined in the bottom of the mount of the electronics assembly 14712 and provide a location where the sensor assembly 14702 can be received and coupled to the electronics assembly 14712, and thereby fully assemble the sensor control device. The profile of the sensor assembly 14702 can match or be shaped in complementary fashion to the receptacle 14710, which includes an elastomeric sealing member 14714 (including conductive material coupled to the circuit board and aligned with the electrical contacts of the sensor 14704). Thus, when the sensor assembly 14702 is snap fit or otherwise adhered to the electronics assembly 14712 by driving the sensor assembly 14702 into the integrally formed recess 14710 in the electronics assembly 14712, the on-body device 14714 depicted in FIG. 8C is formed. This embodiment provides an integrated connector for the sensor assembly 14702 within the electronics assembly 14712.

Additional information regarding sensor assemblies is provided in U.S. Publication No. 2013/0150691 and U.S. Publication No. 2021/0204841, each of which is incorporated by reference herein in its entirety.

According to embodiments of the present disclosure, the sensor control device 102 can be modified to provide a one-piece architecture that can be subjected to sterilization techniques specifically designed for a one-piece architecture sensor control device. A one-piece architecture allows the sensor applicator 150 and the sensor control device 102 to be shipped to the user in a single, sealed package that does not require any final user assembly steps. Rather, the user need only open one package and subsequently deliver the sensor control device 102 to the target monitoring location. The one-piece system architecture described herein can prove advantageous in eliminating component parts, various fabrication process steps, and user assembly steps. As a result, packaging and waste are reduced, and the potential for user error or contamination to the system is mitigated.

Figure 9B:
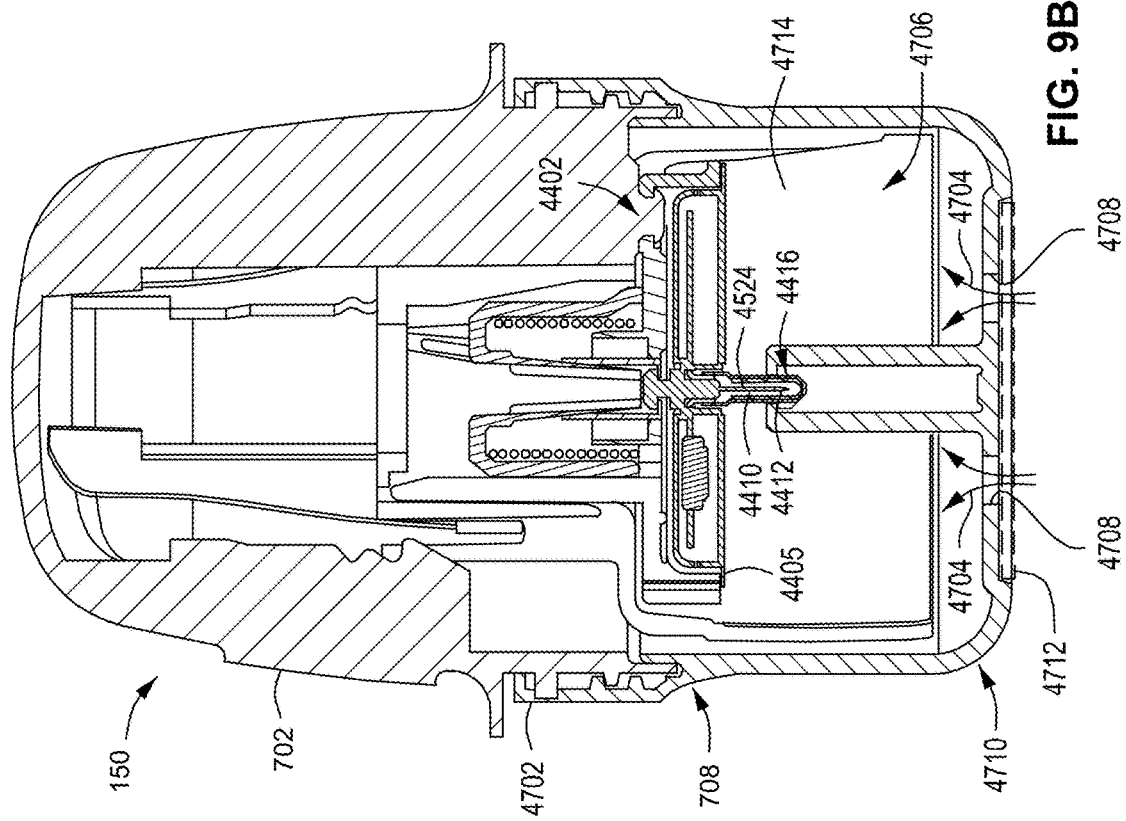
FIGS. 9A and 9B are side and cross-sectional side views, respectively, of an example embodiment of the sensor applicator of FIG. 1A with the cap of FIG. 2C coupled thereto.
Figure 9A:
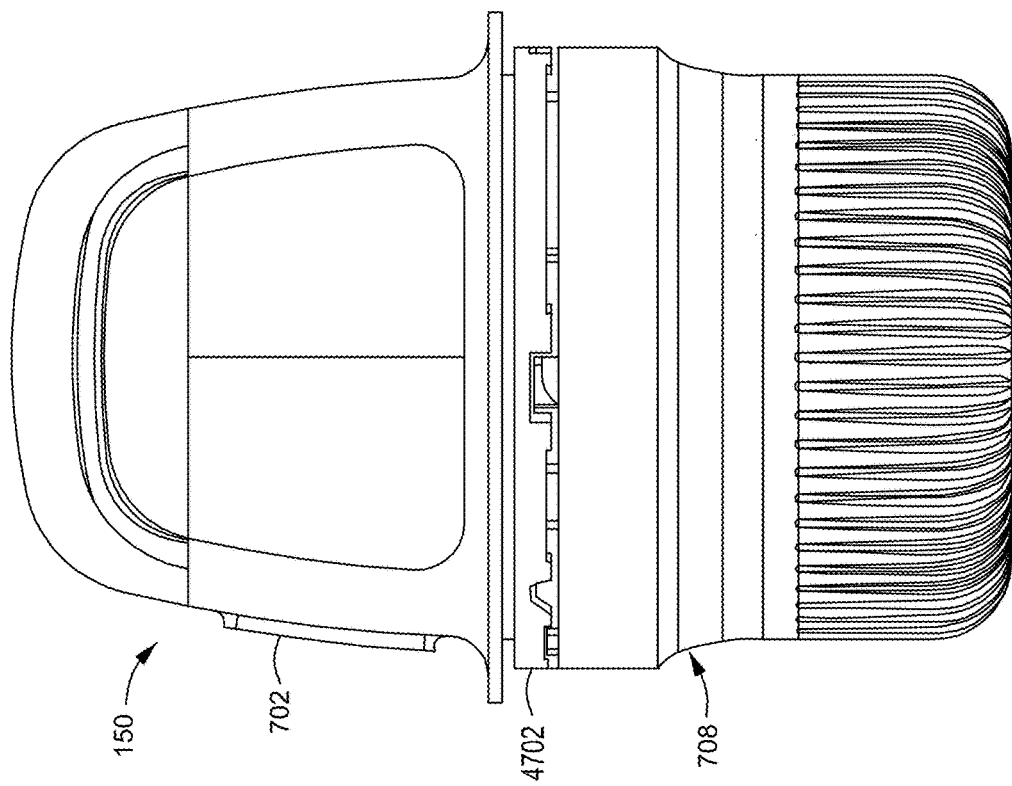

FIGS. 9A and 9B are side and cross-sectional side views, respectively, of an example embodiment of the sensor applicator 150 with the applicator cap 708 coupled thereto. More specifically, FIG. 9A depicts how the sensor applicator 150 might be shipped to and received by a user, and FIG. 9B depicts the sensor control device 4402 arranged within the sensor applicator 150. Accordingly, the fully assembled sensor control device 4402 can already be assembled and installed within the sensor applicator 150 prior to being delivered to the user, thus removing any additional assembly steps that a user would otherwise have to perform.

The fully assembled sensor control device 4402 can be loaded into the sensor applicator 150, and the applicator cap 708 can subsequently be coupled to the sensor applicator 150. In some embodiments, the applicator cap 708 can be threaded to the housing 702 and include a tamper ring 4702. Upon rotating (e.g., unscrewing) the applicator cap 708 relative to the housing 702, the tamper ring 4702 can shear and thereby free the applicator cap 708 from the sensor applicator 150.

According to the present disclosure, while loaded in the sensor applicator 150, the sensor control device 4402 can be subjected to gaseous chemical sterilization 4704 configured to sterilize the electronics housing 4404 and any other exposed portions of the sensor control device 4402. To accomplish this, a chemical can be injected into a sterilization chamber 4706 cooperatively defined by the sensor applicator 150 and the interconnected cap 210. In some applications, the chemical can be injected into the sterilization chamber 4706 via one or more vents 4708 defined in the applicator cap 708 at its proximal end 610. Example chemicals that can be used for the gaseous chemical sterilization 4704 include, but are not limited to, ethylene oxide, vaporized hydrogen peroxide, nitrogen oxide (e.g., nitrous oxide, nitrogen dioxide, etc.), and steam.

Since the distal portions of the sensor 4410 and the sharp 4412 are sealed within the sensor cap 4416, the chemicals used during the gaseous chemical sterilization process do not interact with the enzymes, chemistry, and biologics provided on the tail 4524 and other sensor components, such as membrane coatings that regulate analyte influx.

Once a desired sterility assurance level has been achieved within the sterilization chamber 4706, the gaseous solution can be removed and the sterilization chamber 4706 can be aerated. Aeration can be achieved by a series of vacuums and subsequently circulating a gas (e.g., nitrogen) or filtered air through the sterilization chamber 4706. Once the sterilization chamber 4706 is properly aerated, the vents 4708 can be occluded with a seal 4712 (shown in dashed lines).

In some embodiments, the seal 4712 can comprise two or more layers of different materials. The first layer can be made of a synthetic material (e.g., a flash-spun high-density polyethylene fiber), such as Tyvek® available from DuPont®. Tyvek® is highly durable and puncture resistant and allows the permeation of vapors. The Tyvek® layer can be applied before the gaseous chemical sterilization process, and following the gaseous chemical sterilization process, a foil or other vapor and moisture resistant material layer can be sealed (e.g., heat sealed) over the Tyvek® layer to prevent the ingress of contaminants and moisture into the sterilization chamber 4706. In other embodiments, the seal 4712 can comprise only a single protective layer applied to the applicator cap 708. In such embodiments, the single layer can be gas permeable for the sterilization process, but can also be capable of protection against moisture and other harmful elements once the sterilization process is complete.

With the seal 4712 in place, the applicator cap 708 provides a barrier against outside contamination, and thereby maintains a sterile environment for the assembled sensor control device 4402 until the user removes (unthreads) the applicator cap 708. The applicator cap 708 can also create a dust-free environment during shipping and storage that prevents the adhesive patch 4714 from becoming dirty.

Figure 10A:
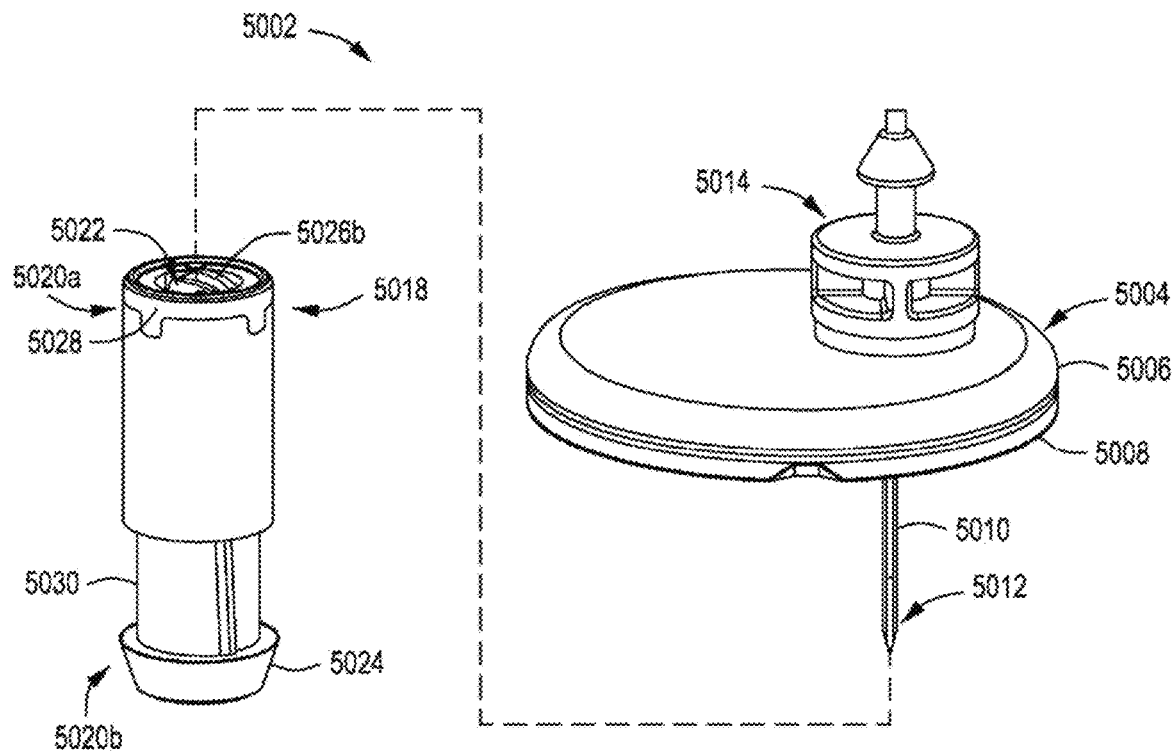
FIGS. 10A and 10B are isometric and side views, respectively, of another example sensor control device.
Figure 10B:
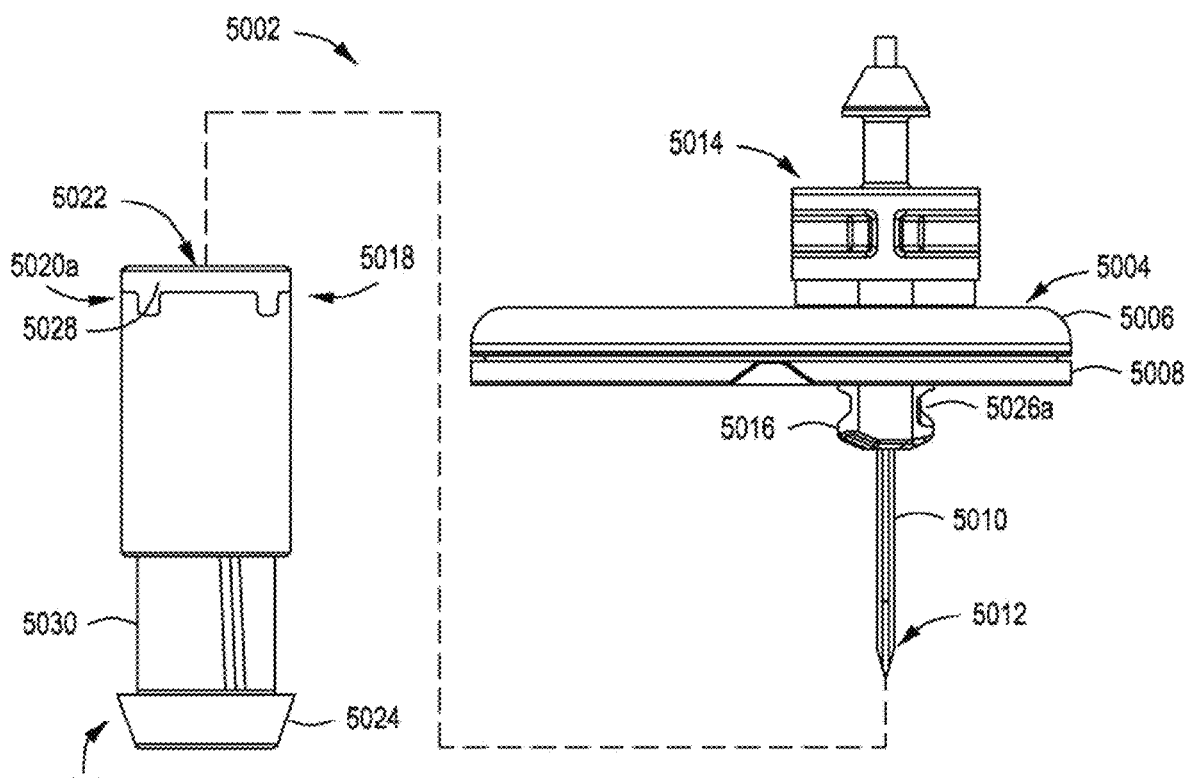

FIGS. 10A and 10B are isometric and side views, respectively, of another example sensor control device 5002, according to one or more embodiments of the present disclosure. The sensor control device 5002 can be similar in some respects to the sensor control device 102 of FIG. 1A and therefore can be best understood with reference thereto. Moreover, the sensor control device 5002 can replace the sensor control device 102 of FIG. 1A and, therefore, can be used in conjunction with the sensor applicator 150 of FIG. 1A, which can deliver the sensor control device 5002 to a target monitoring location on a user's skin.

Unlike the sensor control device 102 of FIG. 1A, however, the sensor control device 5002 can comprise a one-piece system architecture not requiring a user to open multiple packages and finally assemble the sensor control device 5002 prior to application. Rather, upon receipt by the user, the sensor control device 5002 can already be fully assembled and properly positioned within the sensor applicator 150 (FIG. 1A). To use the sensor control device 5002, the user need only open one barrier (e.g., the applicator cap 708 of FIG. 3B) before promptly delivering the sensor control device 5002 to the target monitoring location for use.

As illustrated, the sensor control device 5002 includes an electronics housing 5004 that is generally disc-shaped and can have a circular cross-section. In other embodiments, however, the electronics housing 5004 can exhibit other cross-sectional shapes, such as ovoid or polygonal, without departing from the scope of the disclosure. The electronics housing 5004 can be configured to house or otherwise contain various electrical components used to operate the sensor control device 5002. In at least one embodiment, an adhesive patch (not shown) can be arranged at the bottom of the electronics housing 5004. The adhesive patch can be similar to the adhesive patch 105 of FIG. 1A, and can thus help adhere the sensor control device 5002 to the user's skin for use.

As illustrated, the sensor control device 5002 includes an electronics housing 5004 that includes a shell 5006 and a mount 5008 that is mateable with the shell 5006. The shell 5006 can be secured to the mount 5008 via a variety of ways, such as a snap fit engagement, an interference fit, sonic welding, one or more mechanical fasteners (e.g., screws), a gasket, an adhesive, or any combination thereof. In some cases, the shell 5006 can be secured to the mount 5008 such that a sealed interface is generated therebetween.

The sensor control device 5002 can further include a sensor 5010 (partially visible) and a sharp 5012 (partially visible), used to help deliver the sensor 5010 transcutaneously under a user's skin during application of the sensor control device 5002. As illustrated, corresponding portions of the sensor 5010 and the sharp 5012 extend distally from the bottom of the electronics housing 5004 (e.g., the mount 5008). The sharp 5012 can include a sharp hub 5014 configured to secure and carry the sharp 5012. As best seen in FIG. 10B, the sharp hub 5014 can include or otherwise define a mating member 5016. To couple the sharp 5012 to the sensor control device 5002, the sharp 5012 can be advanced axially through the electronics housing 5004 until the sharp hub 5014 engages an upper surface of the shell 5006 and the mating member 5016 extends distally from the bottom of the mount 5008. As the sharp 5012 penetrates the electronics housing 5004, the exposed portion of the sensor 5010 can be received within a hollow or recessed (arcuate) portion of the sharp 5012. The remaining portion of the sensor 5010 is arranged within the interior of the electronics housing 5004.

The sensor control device 5002 can further include a sensor cap 5018, shown exploded or detached from the electronics housing 5004 in FIGS. 10A-10B. The sensor cap 5018 can be removably coupled to the sensor control device 5002 (e.g., the electronics housing 5004) at or near the bottom of the mount 5008. The sensor cap 5018 can help provide a sealed barrier that surrounds and protects the exposed portions of the sensor 5010 and the sharp 5012 from gaseous chemical sterilization. As illustrated, the sensor cap 5018 can comprise a generally cylindrical body having a first end 5020a and a second end 5020b opposite the first end 5020a. The first end 5020a can be open to provide access into an inner chamber 5022 defined within the body. In contrast, the second end 5020b can be closed and can provide or otherwise define an engagement feature 5024. As described herein, the engagement feature 5024 can help mate the sensor cap 5018 to the cap (e.g., the applicator cap 708 of FIG. 3B) of a sensor applicator (e.g., the sensor applicator 150 of FIGS. 1 and 3A-3G), and can help remove the sensor cap 5018 from the sensor control device 5002 upon removing the cap from the sensor applicator 150.

The sensor cap 5018 can be removably coupled to the electronics housing 5004 at or near the bottom of the mount 5008. More specifically, the sensor cap 5018 can be removably coupled to the mating member 5016, which extends distally from the bottom of the mount 5008. In at least one embodiment, for example, the mating member 5016 can define a set of external threads 5026a (FIG. 10B) mateable with a set of internal threads 5026b (FIG. 10A) defined by the sensor cap 5018. In some embodiments, the external and internal threads 5026a, b can comprise a flat thread design (e.g., lack of helical curvature), which can prove advantageous in molding the parts. Alternatively, the external and internal threads 5026a,b can comprise a helical threaded engagement. Accordingly, the sensor cap 5018 can be threadably coupled to the sensor control device 5002 at the mating member 5016 of the sharp hub 5014. In other embodiments, the sensor cap 5018 can be removably coupled to the mating member 5016 via other types of engagements including, but not limited to, an interference or friction fit, or a frangible member or substance that can be broken with minimal separation force (e.g., axial or rotational force).

In some embodiments, the sensor cap 5018 can comprise a monolithic (singular) structure extending between the first and second ends 5020a, b. In other embodiments, however, the sensor cap 5018 can comprise two or more component parts. In the illustrated embodiment, for example, the sensor cap 5018 can include a seal ring 5028 positioned at the first end 5020a and a desiccant cap 5030 arranged at the second end 5020b. The seal ring 5028 can be configured to help seal the inner chamber 5022, as described in more detail below. In at least one embodiment, the seal ring 5028 can comprise an elastomeric O-ring. The desiccant cap 5030 can house or comprise a desiccant to help maintain preferred humidity levels within the inner chamber 5022. The desiccant cap 5030 can also define or otherwise provide the engagement feature 5024 of the sensor cap 5018.

Figure 11B:
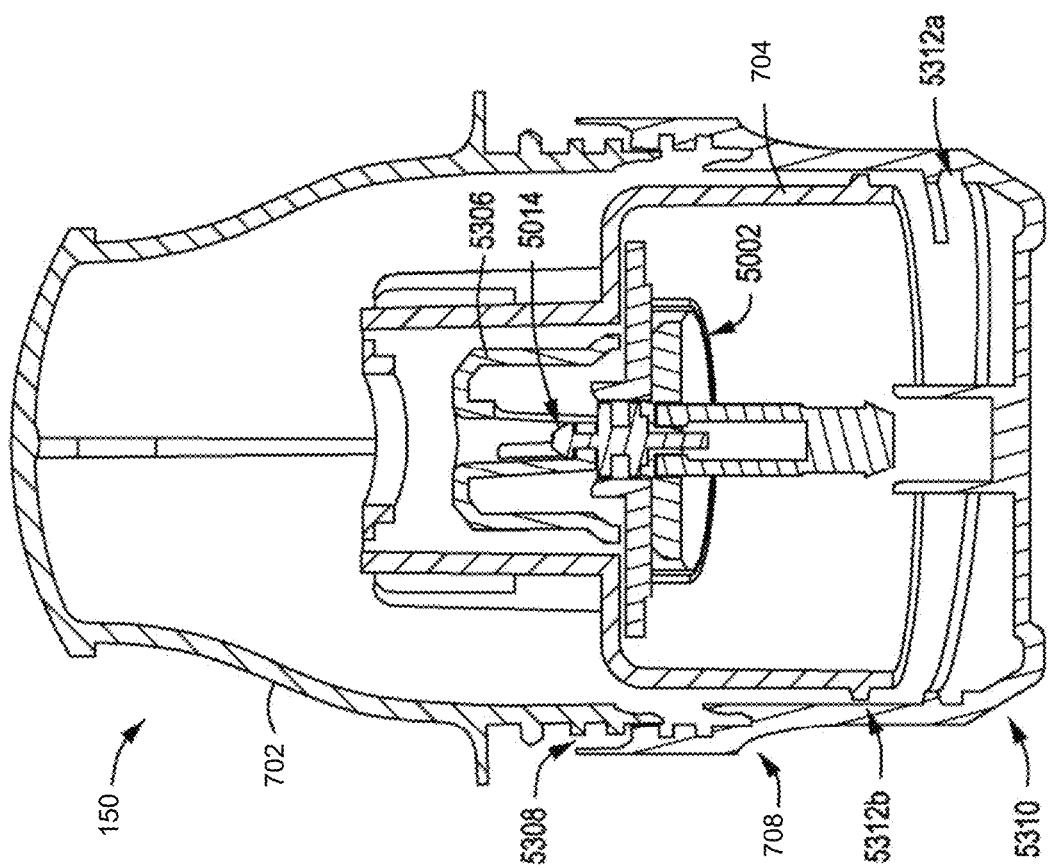
FIGS. 11A-11C are progressive cross-sectional side views showing assembly of the sensor applicator with the sensor control device of FIGS. 10A-10B.
Figure 11A:
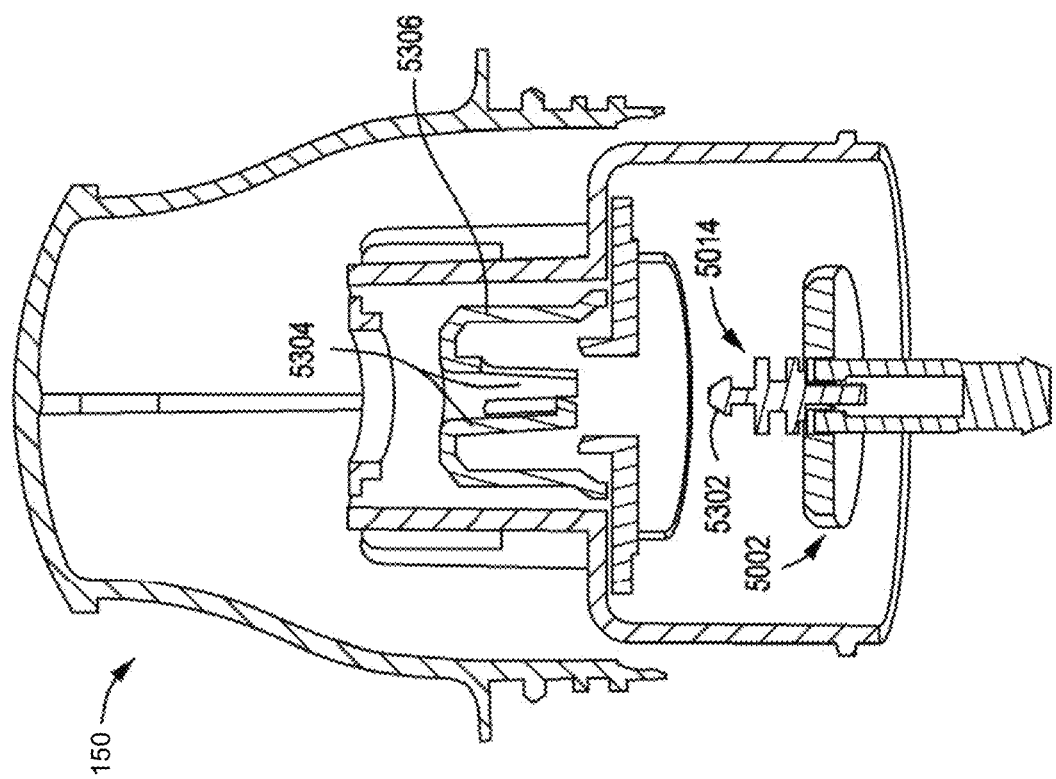
Figure 11C:
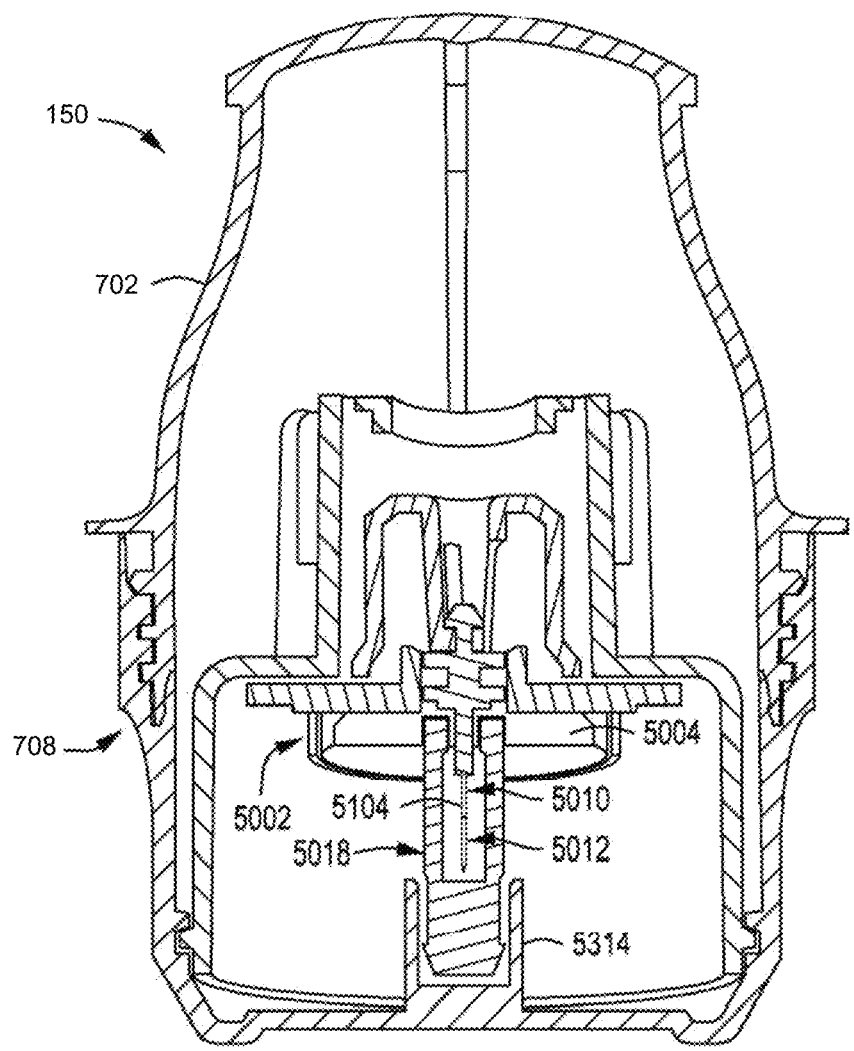

FIGS. 11A-11C are progressive cross-sectional side views showing assembly of the sensor applicator 150 with the sensor control device 5002, according to one or more embodiments. Once the sensor control device 5002 is fully assembled, it can then be loaded into the sensor applicator 150. With reference to FIG. 11A, the sharp hub 5014 can include or otherwise define a hub snap pawl 5302 configured to help couple the sensor control device 5002 to the sensor applicator 150. More specifically, the sensor control device 5002 can be advanced into the interior of the sensor applicator 150 and the hub snap pawl 5302 can be received by corresponding arms 5304 of a sharp carrier 5306 positioned within the sensor applicator 150.

In FIG. 11B, the sensor control device 5002 is shown received by the sharp carrier 5306 and, therefore, secured within the sensor applicator 150. Once the sensor control device 5002 is loaded into the sensor applicator 150, the applicator cap 708 can be coupled to the sensor applicator 150. In some embodiments, the applicator cap 708 and the housing 702 can have opposing, mateable sets of threads 5308 that enable the applicator cap 708 to be screwed onto the housing 702 in a clockwise (or counter-clockwise) direction and thereby secure the applicator cap 708 to the sensor applicator 150.

As illustrated, the sheath 704 is also positioned within the sensor applicator 150, and the sensor applicator 150 can include a sheath locking mechanism 5310 configured to ensure that the sheath 704 does not prematurely collapse during a shock event. In the illustrated embodiment, the sheath locking mechanism 5310 can comprise a threaded engagement between the applicator cap 708 and the sheath 704. More specifically, one or more internal threads 5312a can be defined or otherwise provided on the inner surface of the applicator cap 708, and one or more external threads 5312b can be defined or otherwise provided on the sheath 704. The internal and external threads 5312a,b can be configured to threadably mate as the applicator cap 708 is threaded to the sensor applicator 150 at the threads 5308. The internal and external threads 5312a,b can have the same thread pitch as the threads 5308 that enable the applicator cap 708 to be screwed onto the housing 702.

In FIG. 11C, the applicator cap 708 is shown fully threaded (coupled) to the housing 702. As illustrated, the applicator cap 708 can further provide and otherwise define a cap post 5314 centrally located within the interior of the applicator cap 708 and extending proximally from the bottom thereof. The cap post 5314 can be configured to receive at least a portion of the sensor cap 5018 as the applicator cap 708 is screwed onto the housing 702.

With the sensor control device 5002 loaded within the sensor applicator 150 and the applicator cap 708 properly secured, the sensor control device 5002 can then be subjected to a gaseous chemical sterilization configured to sterilize the electronics housing 5004 and any other exposed portions of the sensor control device 5002. Since the distal portions of the sensor 5010 and the sharp 5012 are sealed within the sensor cap 5018, the chemicals used during the gaseous chemical sterilization process are unable to interact with the enzymes, chemistry, and biologies provided on the tail 5104, and other sensor components, such as membrane coatings that regulate analyte influx.

Figure 12B:
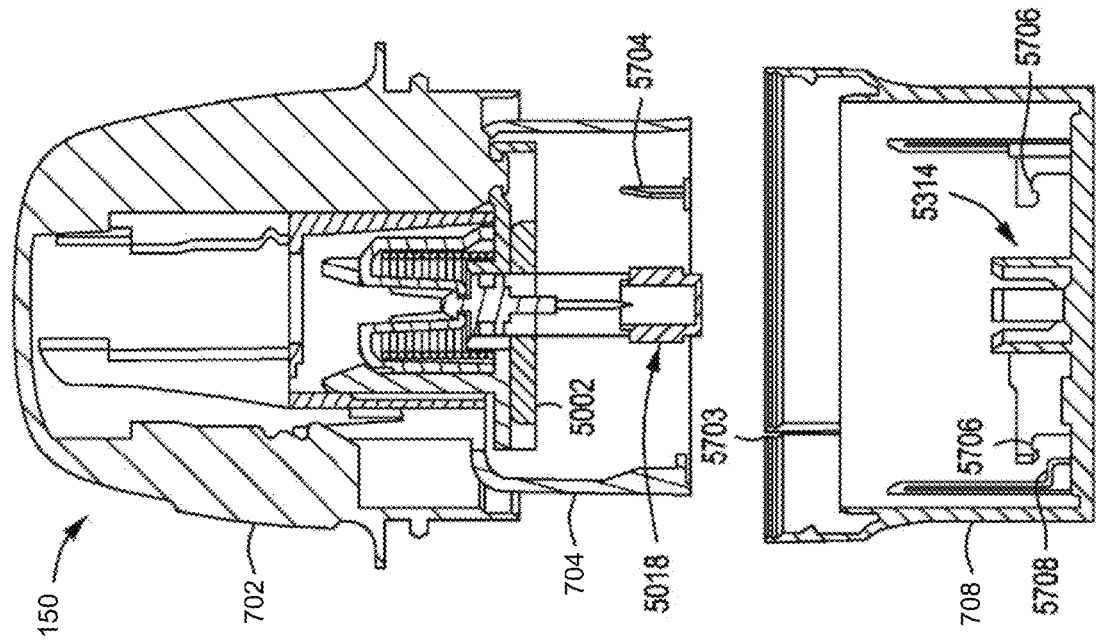
FIGS. 12A-12C are progressive cross-sectional side views showing assembly and disassembly of an example embodiment of the sensor applicator with the sensor control device of FIGS. 10A-10B.
Figure 12A:
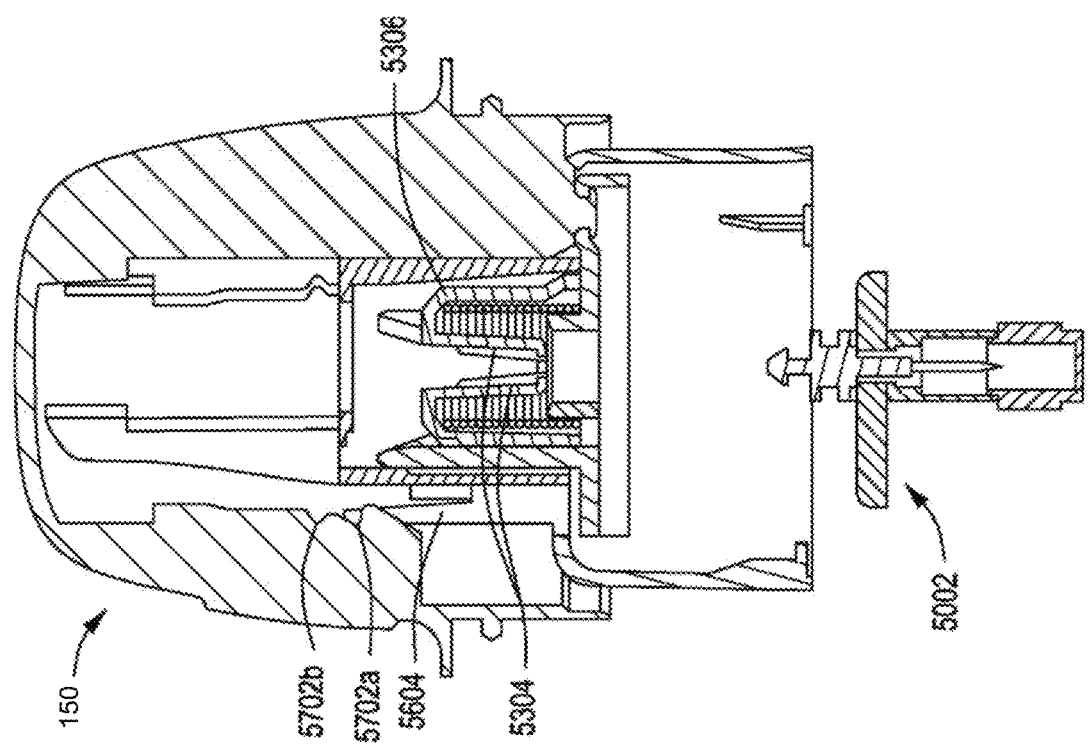
Figure 12C:
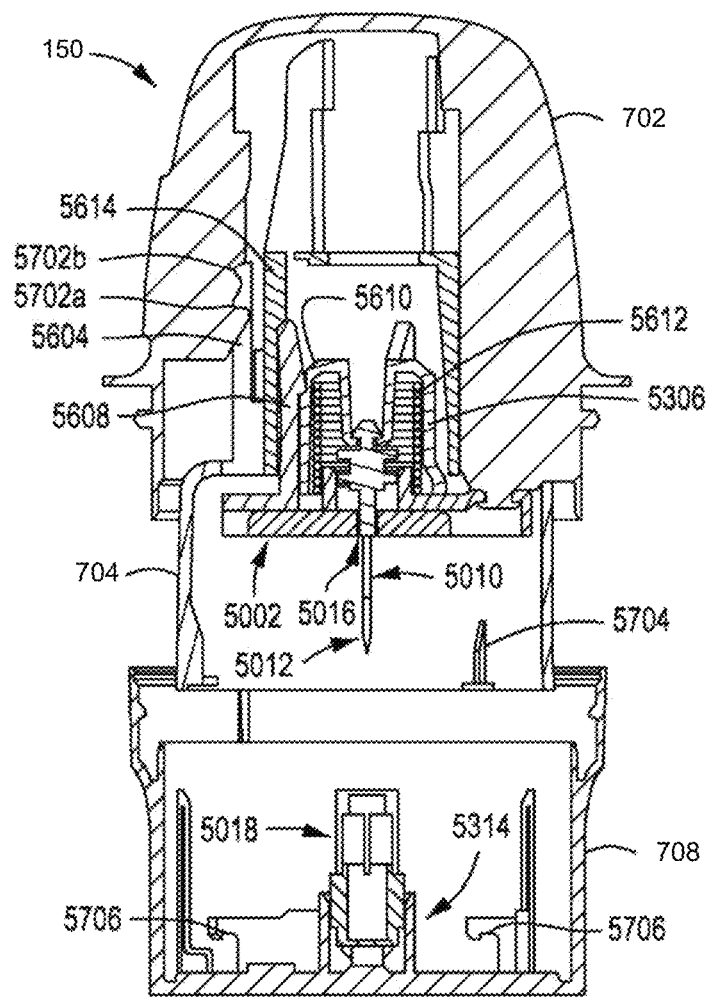

FIGS. 12A-12C are progressive cross-sectional side views showing assembly and disassembly of an alternative embodiment of the sensor applicator 150 with the sensor control device 5002, according to one or more additional embodiments. A fully assembled sensor control device 5002 can be loaded into the sensor applicator 150 by coupling the hub snap pawl 5302 into the arms 5304 of the sharp carrier 5306 positioned within the sensor applicator 150, as generally described above.

In the illustrated embodiment, the sheath arms 5604 of the sheath 704 can be configured to interact with a first detent 5702a and a second detent 5702b defined within the interior of the housing 702. The first detent 5702a can alternately be referred to a "locking" detent, and the second detent 5702b can alternately be referred to as a "firing" detent. When the sensor control device 5002 is initially installed in the sensor applicator 150, the sheath arms 5604 can be received within the first detent 5702a. As discussed below, the sheath 704 can be actuated to move the sheath arms 5604 to the second detent 5702b, which places the sensor applicator 150 in firing position.

In FIG. 12B, the applicator cap 708 is aligned with the housing 702 and advanced toward the housing 702 so that the sheath 704 is received within the applicator cap 708. Instead of rotating the applicator cap 708 relative to the housing 702, the threads of the applicator cap 708 can be snapped onto the corresponding threads of the housing 702 to couple the applicator cap 708 to the housing 702. Axial cuts or slots 5703 (one shown) defined in the applicator cap 708 can allow portions of the applicator cap 708 near its threading to flex outward to be snapped into engagement with the threading of the housing 702. As the applicator cap 708 is snapped to the housing 702, the sensor cap 5018 can correspondingly be snapped into the cap post 5314.

Similar to the embodiment of FIGS. 11A-11C, the sensor applicator 150 can include a sheath locking mechanism configured to ensure that the sheath 704 does not prematurely collapse during a shock event. In the illustrated embodiment, the sheath locking mechanism includes one or more ribs 5704 (one shown) defined near the base of the sheath 704 and configured to interact with one or more ribs 5706 (two shown) and a shoulder 5708 defined near the base of the applicator cap 708. The ribs 5704 can be configured to inter-lock between the ribs 5706 and the shoulder 5708 while attaching the applicator cap 708 to the housing 702. More specifically, once the applicator cap 708 is snapped onto the housing 702, the applicator cap 708 can be rotated (e.g., clockwise), which locates the ribs 5704 of the sheath 704 between the ribs 5706 and the shoulder 5708 of the applicator cap 708 and thereby "locks" the applicator cap 708 in place until the user reverse rotates the applicator cap 708 to remove the applicator cap 708 for use. Engagement of the ribs 5704 between the ribs 5706 and the shoulder 5708 of the applicator cap 708 can also prevent the sheath 704 from collapsing prematurely.

In FIG. 12C, the applicator cap 708 is removed from the housing 702. As with the embodiment of FIGS. 12A-12C, the applicator cap 708 can be removed by reverse rotating the applicator cap 708, which correspondingly rotates the cap post 5314 in the same direction and causes sensor cap 5018 to unthread from the mating member 5016, as generally described above. Moreover, detaching the sensor cap 5018 from the sensor control device 5002 exposes the distal portions of the sensor 5010 and the sharp 5012.

As the applicator cap 708 is unscrewed from the housing 702, the ribs 5704 defined on the sheath 704 can slidingly engage the tops of the ribs 5706 defined on the applicator cap 708. The tops of the ribs 5706 can provide corresponding ramped surfaces that result in an upward displacement of the sheath 704 as the applicator cap 708 is rotated, and moving the sheath 704 upward causes the sheath arms 5604 to flex out of engagement with the first detent 5702a to be received within the second detent 5702b. As the sheath 704 moves to the second detent 5702b, the radial shoulder 5614 moves out of radial engagement with the carrier arm(s) 5608, which allows the passive spring force of the spring 5612 to push upward on the sharp carrier 5306 and force the carrier arm(s) 5608 out of engagement with the groove(s) 5610. As the sharp carrier 5306 moves upward within the housing 702, the mating member 5016 can correspondingly retract until it becomes flush, substantially flush, or sub-flush with the bottom of the sensor control device 5002. At this point, the sensor applicator 150 in firing position. Accordingly, in this embodiment, removing the applicator cap 708 correspondingly causes the mating member 5016 to retract.

FIGS. 13A-13F illustrate example details of embodiments of the internal device mechanics of "firing" the applicator 150 to apply sensor control device 102 to a user and including retracting sharp 1030 safely back into used applicator 150. All together, these drawings represent an example sequence of driving sharp 1030 (supporting a sensor coupled to sensor control device 102) into the skin of a user, withdrawing the sharp while leaving the sensor behind in operative contact with interstitial fluid of the user, and adhering the sensor control device to the skin of the user with an adhesive. Modification of such activity for use with the alternative applicator assembly embodiments and components can be appreciated in reference to the same by those with skill in the art. Moreover, applicator 150 can be a sensor applicator having one-piece architecture or a two-piece architecture as disclosed herein.

Figure 13A:
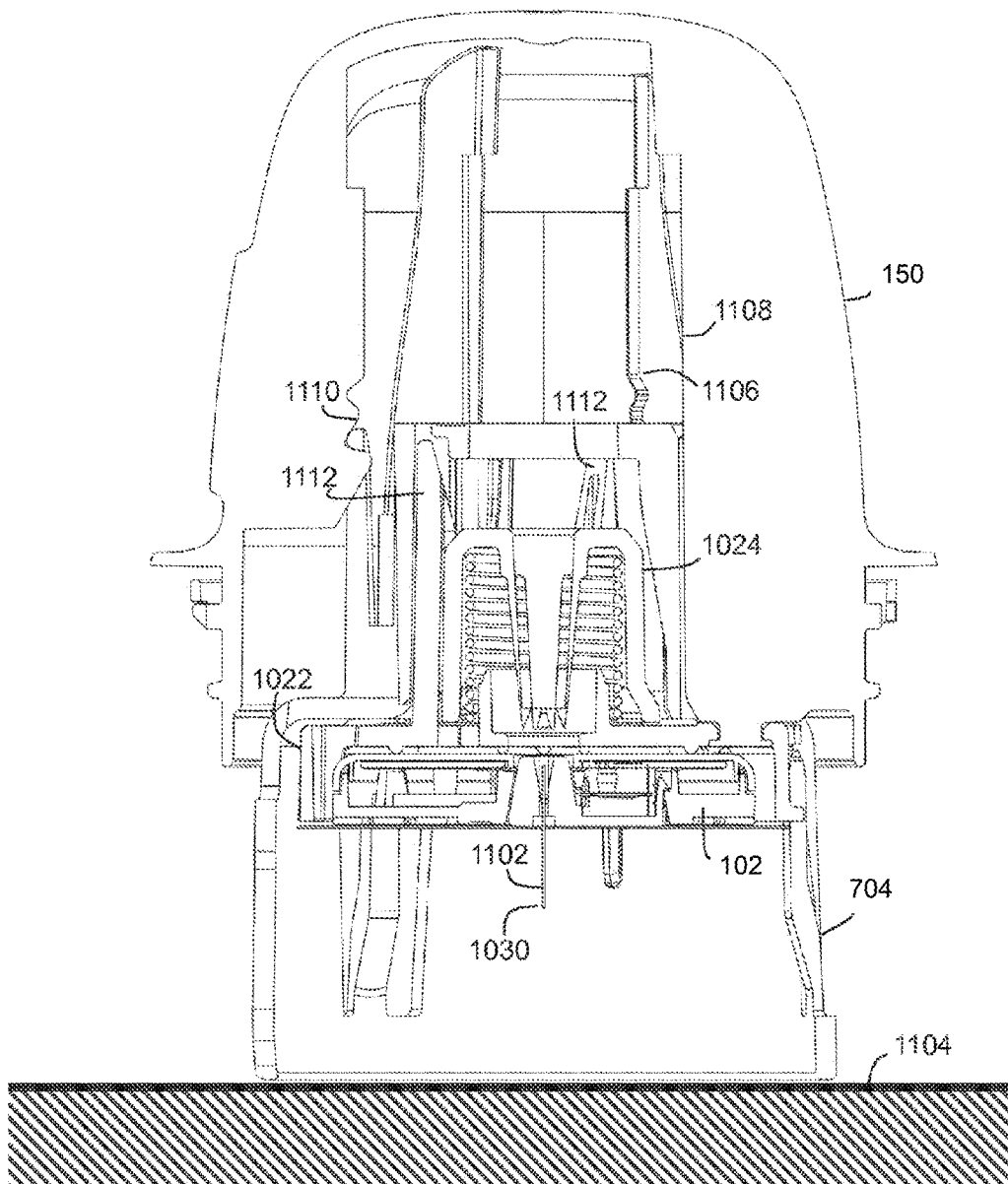
FIGS. 13A-13F illustrate cross-sectional views depicting an example embodiment of an applicator during a stage of deployment.

Turning now to FIG. 13A, a sensor 1102 is supported within sharp 1030, just above the skin 1104 of the user. Rails 1106 (optionally three of them) of an upper guide section 1108 can be provided to control applicator 150 motion relative to sheath 704. The sheath 704 is held by detent features 1110 within the applicator 150 such that appropriate downward force along the longitudinal axis of the applicator 150 will cause the resistance provided by the detent features 1110 to be overcome so that sharp 1030 and sensor control device 102 can translate along the longitudinal axis into (and onto) skin 1104 of the user. In addition, catch arms 1112 of sensor carrier 1022 engage the sharp retraction assembly 1024 to maintain the sharp 1030 in a position relative to the sensor control device 102.

Figure 13B:
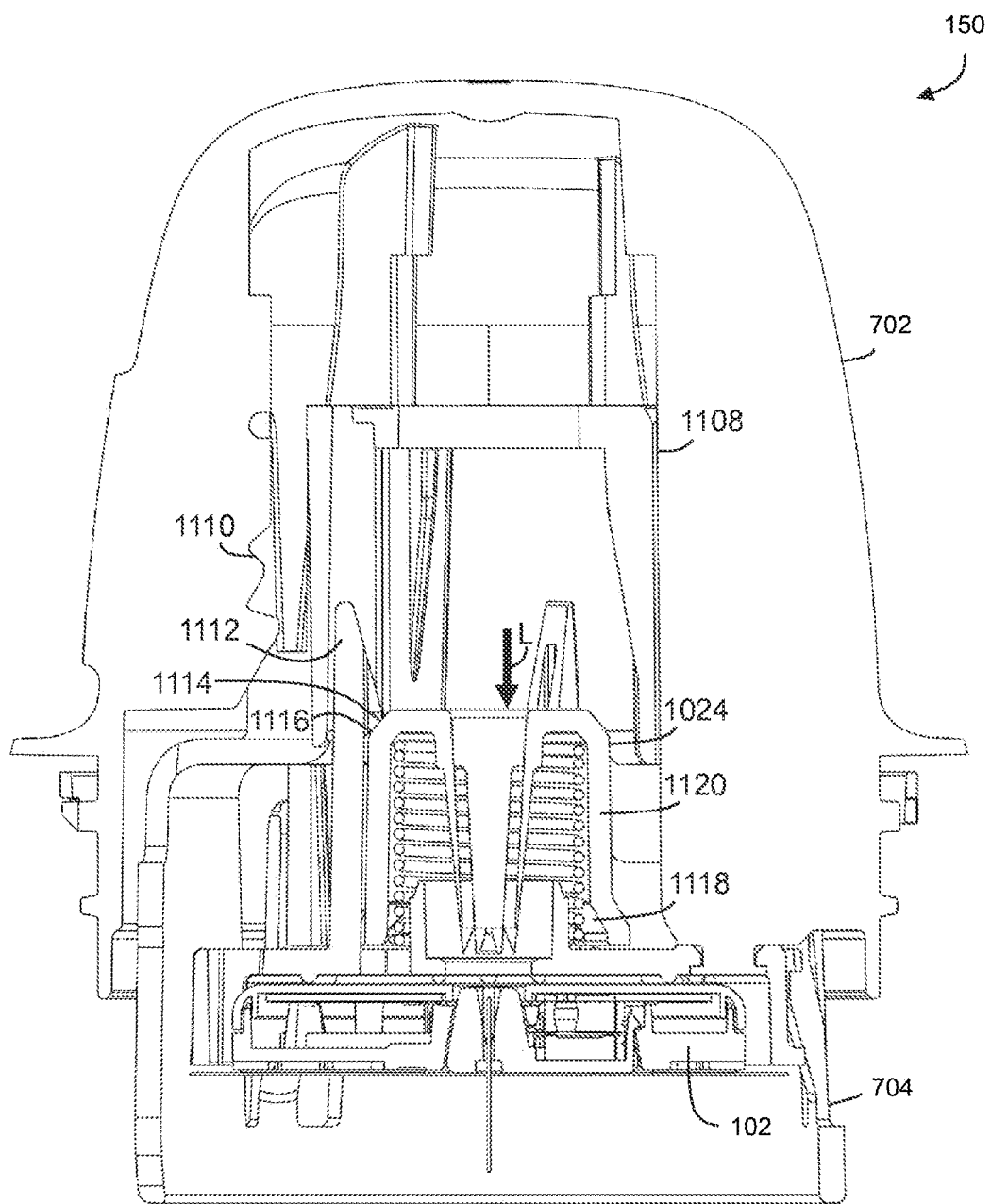

In FIG. 13B, user force is applied to overcome or override detent features 1110 and sheath 704 collapses into housing 702 driving the sensor control device 102 (with associated parts) to translate down as indicated by the arrow L along the longitudinal axis. An inner diameter of the upper guide section 1108 of the sheath 704 constrains the position of carrier arms 1112 through the full stroke of the sensor/sharp insertion process. The retention of the stop surfaces 1114 of carrier arms 1112 against the complimentary faces 1116 of the sharp retraction assembly 1024 maintains the position of the members with return spring 1118 fully energized. According to embodiments, rather than employing user force to drive the sensor control device 102 to translate down as indicated by the arrow L along the longitudinal axis, housing 702 can include a button (for example, not limitation, a push button) which activates a drive spring (for example, not limitation, a coil spring) to drive the sensor control device 102.

Figure 13C:
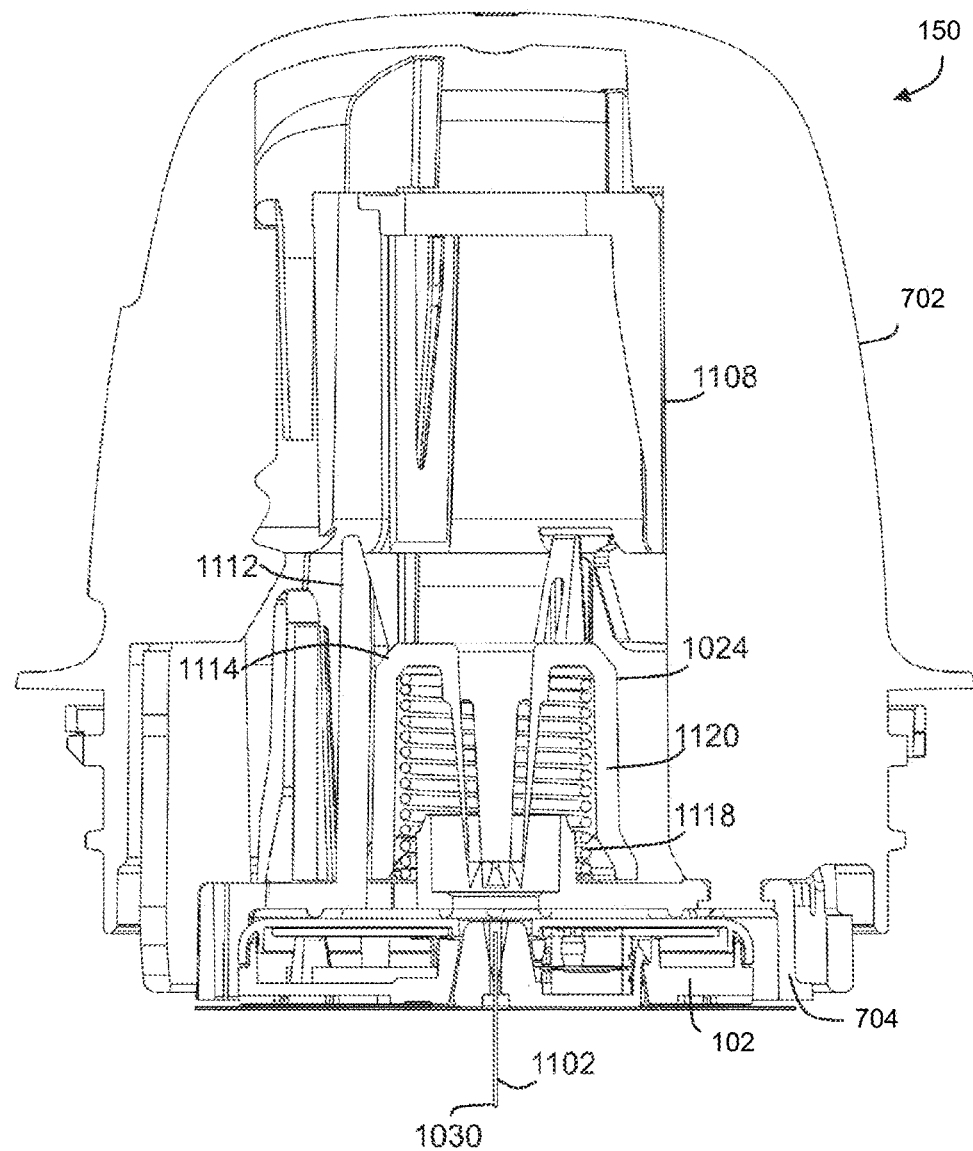
Figure 13D:
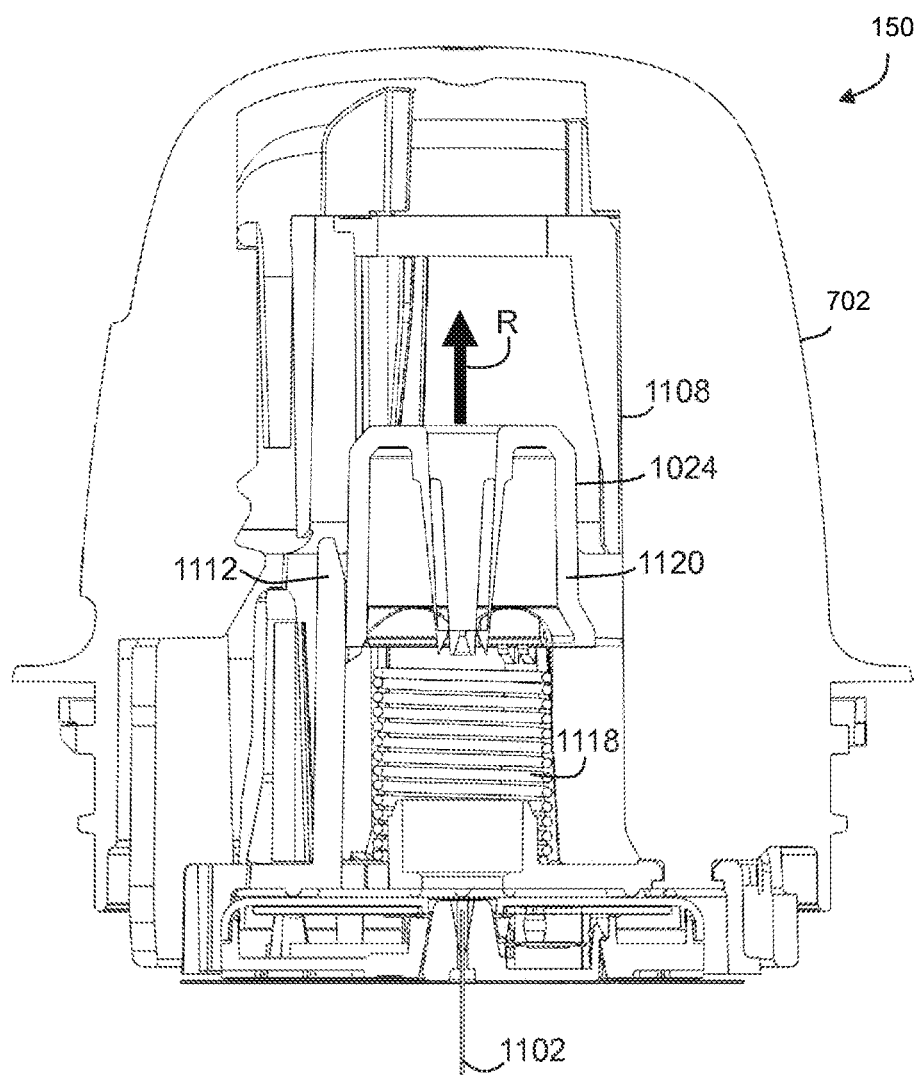

In FIG. 13C, sensor 1102 and sharp 1030 have reached full insertion depth. In so doing, the carrier arms 1112 clear the upper guide section 1108 inner diameter. Then, the compressed force of the coil return spring 1118 drives angled stop surfaces 1114 radially outward, releasing force to drive the sharp carrier 1102 of the sharp retraction assembly 1024 to pull the (slotted or otherwise configured) sharp 1030 out of the user and off of the sensor 1102 as indicated by the arrow R in FIG. 13D.

Figure 13E:
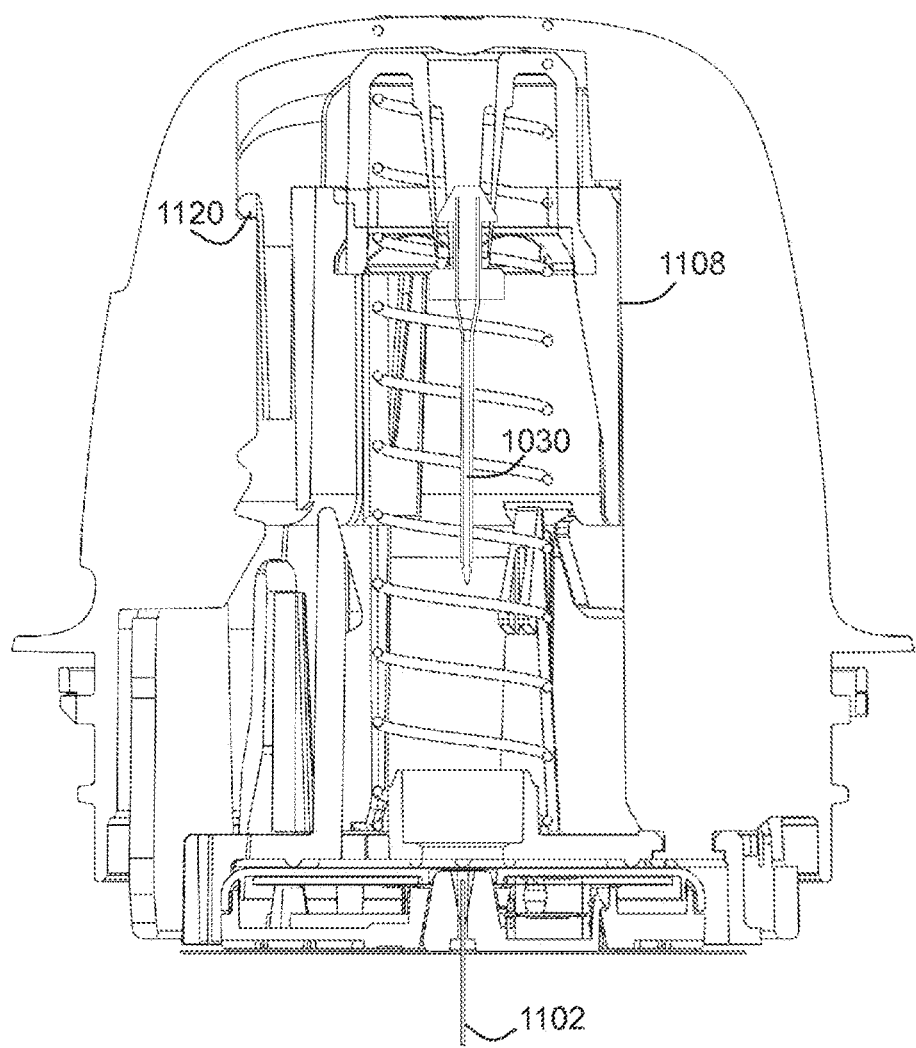
Figure 13F:
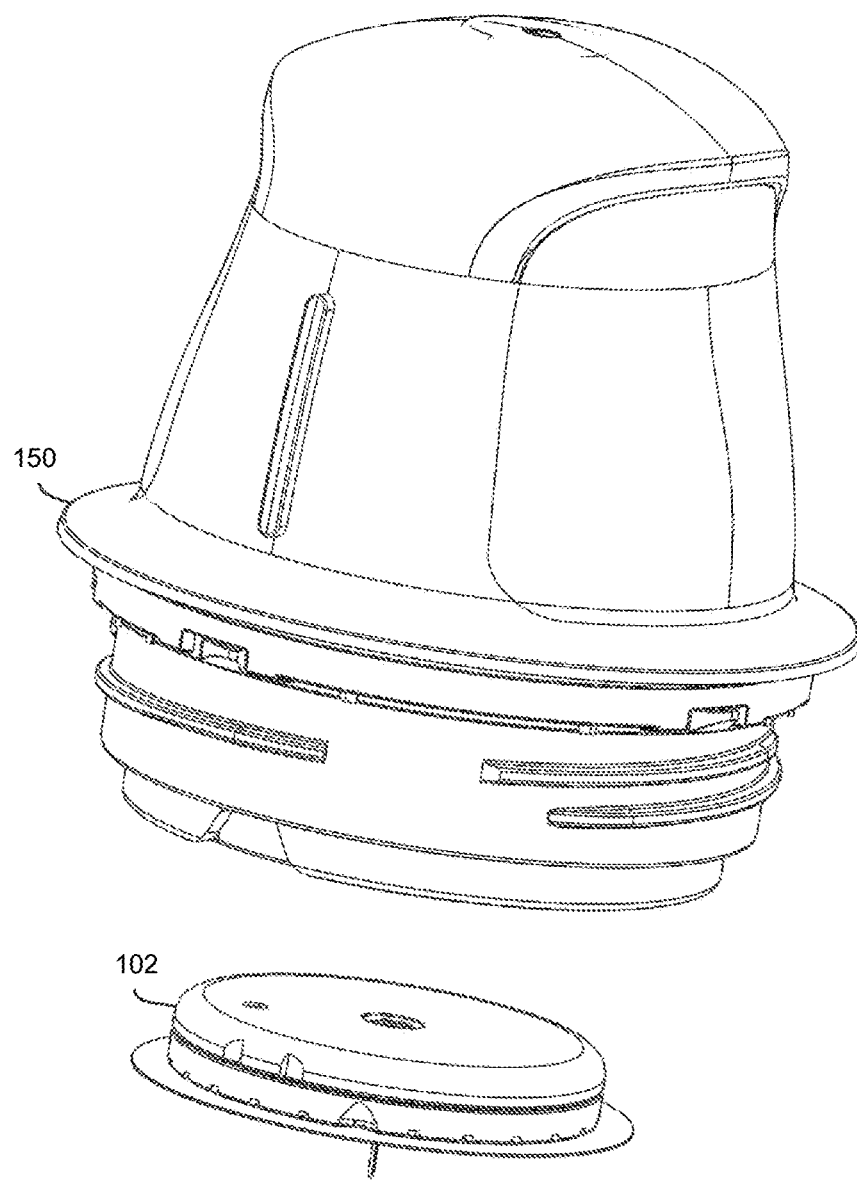

With the sharp 1030 fully retracted as shown in FIG. 13E, the upper guide section 1108 of the sheath 704 is set with a final locking feature 1120. As shown in FIG. 13F, the spent applicator assembly 150 is removed from the insertion site, leaving behind the sensor control device 102, and with the sharp 1030 secured safely inside the applicator assembly 150. The spent applicator assembly 150 is now ready for disposal.

Operation of the applicator 150 when applying the sensor control device 102 is designed to provide the user with a sensation that both the insertion and retraction of the sharp 1030 is performed automatically by the internal mechanisms of the applicator 150. In other words, the present invention avoids the user experiencing the sensation that he is manually driving the sharp 1030 into his skin. Thus, once the user applies sufficient force to overcome the resistance from the detent features of the applicator 150, the resulting actions of the applicator 150 are perceived to be an automated response to the applicator being "triggered." The user does not perceive that he is supplying additional force to drive the sharp 1030 to pierce his skin despite that all the driving force is provided by the user and no additional biasing/driving means are used to insert the sharp 1030. As detailed above in FIG. 13C, the retraction of the sharp 1030 is automated by the coil return spring 1118 of the applicator 150.

With respect to any of the applicator embodiments described herein, as well as any of the components thereof, including but not limited to the sharp, sharp module and sensor module embodiments, those of skill in the art will understand that said embodiments can be dimensioned and configured for use with sensors configured to sense an analyte level in a bodily fluid in the epidermis, dermis, or subcutaneous tissue of a subject. In some embodiments, for example, sharps and distal portions of analyte sensors disclosed herein can both be dimensioned and configured to be positioned at a particular end-depth (i.e., the furthest point of penetration in a tissue or layer of the subject's body, e.g., in the epidermis, dermis, or subcutaneous tissue). With respect to some applicator embodiments, those of skill in the art will appreciate that certain embodiments of sharps can be dimensioned and configured to be positioned at a different end-depth in the subject's body relative to the final end-depth of the analyte sensor. In some embodiments, for example, a sharp can be positioned at a first end-depth in the subject's epidermis prior to retraction, while a distal portion of an analyte sensor can be positioned at a second end-depth in the subject's dermis. In other embodiments, a sharp can be positioned at a first end-depth in the subject's dermis prior to retraction, while a distal portion of an analyte sensor can be positioned at a second end-depth in the subject's subcutaneous tissue. In still other embodiments, a sharp can be positioned at a first end-depth prior to retraction and the analyte sensor can be positioned at a second end-depth, wherein the first end-depth and second end-depths are both in the same layer or tissue of the subject's body.

Additionally, with respect to any of the applicator embodiments described herein, those of skill in the art will understand that an analyte sensor, as well as one or more structural components coupled thereto, including but not limited to one or more spring-mechanisms, can be disposed within the applicator in an off-center position relative to one or more axes of the applicator. In some applicator embodiments, for example, an analyte sensor and a spring mechanism can be disposed in a first off-center position relative to an axis of the applicator on a first side of the applicator, and the sensor electronics can be disposed in a second off-center position relative to the axis of the applicator on a second side of the applicator. In other applicator embodiments, the analyte sensor, spring mechanism, and sensor electronics can be disposed in an off-center position relative to an axis of the applicator on the same side. Those of skill in the art will appreciate that other permutations and configurations in which any or all of the analyte sensor, spring mechanism, sensor electronics, and other components of the applicator are disposed in a centered or off-centered position relative to one or more axes of the applicator are possible and fully within the scope of the present disclosure.

Additional details of suitable devices, systems, methods, components and the operation thereof along with related features are set forth in International Publication No. WO2018/136898 to Rao et. al., International Publication No. WO2019/236850 to Thomas et. al., International Publication No. WO2019/236859 to Thomas et. al., International Publication No. WO2019/236876 to Thomas et. al., and U.S. Patent Publication No. 2020/0196919, filed Jun. 6, 2019, each of which is incorporated by reference in its entirety herein. Further details regarding embodiments of applicators, their components, and variants thereof, are described in U.S. Patent Publication Nos. 2013/0150691, 2016/0331283, and 2018/0235520, all of which are incorporated by reference herein in their entireties and for all purposes. Further details regarding embodiments of sharp modules, sharps, their components, and variants thereof, are described in U.S. Patent Publication No. 2014/0171771, which is incorporated by reference herein in its entirety and for all purposes.

Biochemical sensors can be described by one or more sensing characteristics. A common sensing characteristic is referred to as the biochemical sensor's sensitivity, which is a measure of the sensor's responsiveness to the concentration of the chemical or composition it is designed to detect. For electrochemical sensors, this response can be in the form of an electrical current (amperometric) or electrical charge (coulometric). For other types of sensors, the response can be in a different form, such as a photonic intensity (e.g., optical light). The sensitivity of a biochemical analyte sensor can vary depending on a number of factors, including whether the sensor is in an in vitro state or an in vivo state.

Figure 14:
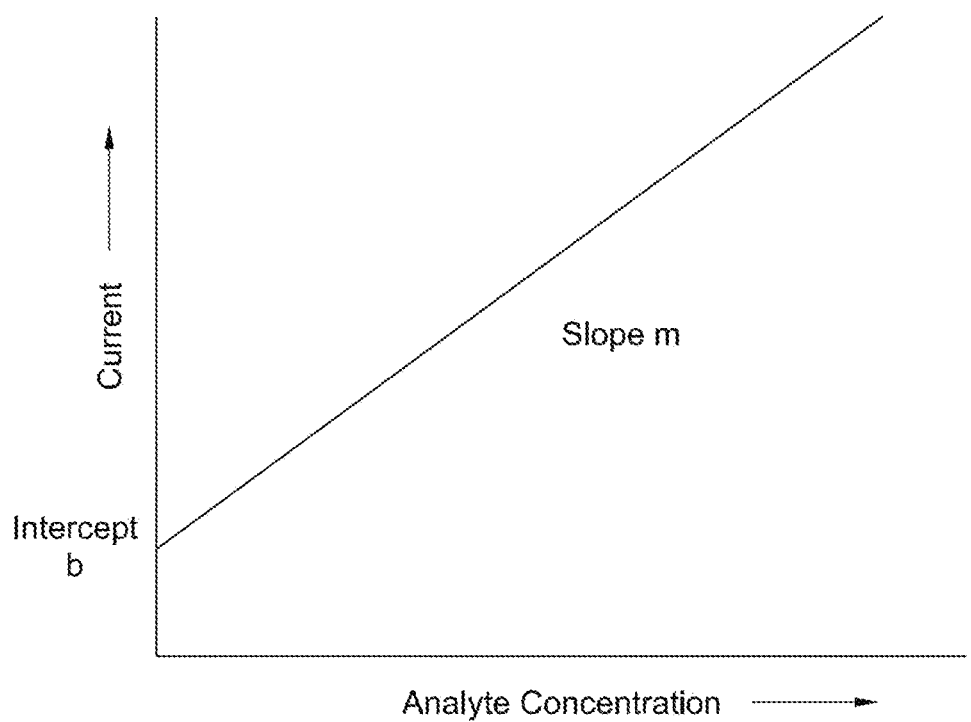
FIG. 14 is a graph depicting an example of an in vitro sensitivity of an analyte sensor.

FIG. 14 is a graph depicting the in vitro sensitivity of an amperometric analyte sensor. The in vitro sensitivity can be obtained by in vitro testing the sensor at various analyte concentrations and then performing a regression (e.g., linear or non-linear) or other curve fitting on the resulting data. In this example, the analyte sensor's sensitivity is linear, or substantially linear, and can be modeled according to the equation $y=mx+b$, where y is the sensor's electrical output current, x is the analyte level (or concentration), m is the slope of the sensitivity and b is the intercept of the sensitivity, where the intercept generally corresponds to a background signal (e.g., noise). For sensors with a linear or substantially linear response, the analyte level that corresponds to a given current can be determined from the slope and intercept of the sensitivity. Sensors with a non-linear sensitivity require additional information to determine the analyte level resulting from the sensor's output current, and those of ordinary skill in the art are familiar with manners by which to model non-linear sensitivities. In certain embodiments of in vivo sensors, the in vitro sensitivity can be the same as the in vivo sensitivity, but in other embodiments a transfer (or conversion) function is used to translate the in vitro sensitivity into the in vivo sensitivity that is applicable to the sensor's intended in vivo use.

Calibration is a technique for improving or maintaining accuracy by adjusting a sensor's measured output to reduce the differences with the sensor's expected output. One or more parameters that describe the sensor's sensing characteristics, like its sensitivity, are established for use in the calibration adjustment.

Certain in vivo analyte monitoring systems require calibration to occur after implantation of the sensor into the user or patient, either by user interaction or by the system itself in an automated fashion. For example, when user interaction is required, the user performs an in vitro measurement (e.g., a blood glucose (BG) measurement using a finger stick and an in vitro test strip) and enters this into the system, while the analyte sensor is implanted. The system then compares the in vitro measurement with the in vivo signal and, using the differential, determines an estimate of the sensor's in vivo sensitivity. The in vivo sensitivity can then be used in an algorithmic process to transform the data collected with the sensor to a value that indicates the user's analyte level. This and other processes that require user action to perform calibration are referred to as "user calibration." Systems can require user calibration due to instability of the sensor's sensitivity, such that the sensitivity drifts or changes over time. Thus, multiple user calibrations (e.g., according to a periodic (e.g., daily) schedule, variable schedule, or on an as-needed basis) can be required to maintain accuracy. While the embodiments described herein can incorporate a degree of user calibration for a particular implementation, generally this is not preferred as it requires the user to perform a painful or otherwise burdensome BG measurement, and can introduce user error.

Some in vivo analyte monitoring systems can regularly adjust the calibration parameters through the use of automated measurements of characteristics of the sensor made by the system itself (e.g., processing circuitry executing software). The repeated adjustment of the sensor's sensitivity based on a variable measured by the system (and not the user) is referred to generally as "system" (or automated) calibration, and can be performed with user calibration, such as an early BG measurement, or without user calibration. Like the case with repeated user calibrations, repeated system calibrations are typically necessitated by drift in the sensor's sensitivity over time. Thus, while the embodiments described herein can be used with a degree of automated system calibration, preferably the sensor's sensitivity is relatively stable over time such that post-implantation calibration is not required.

Some in vivo analyte monitoring systems operate with a sensor that is factory calibrated. Factory calibration refers to the determination or estimation of the one or more calibration parameters prior to distribution to the user or healthcare professional (HCP). The calibration parameter can be determined by the sensor manufacturer (or the manufacturer of the other components of the sensor control device if the two entities are different). Many in vivo sensor manufacturing processes fabricate the sensors in groups or batches referred to as production lots, manufacturing stage lots, or simply lots. A single lot can include thousands of sensors.

Sensors can include a calibration code or parameter which can be derived or determined during one or more sensor manufacturing processes and coded or programmed, as part of the manufacturing process, in the data processing device of the analyte monitoring system or provided on the sensor itself, for example, as a bar code, a laser tag, an RFID tag, or other machine-readable information provided on the sensor. User calibration during in vivo use of the sensor can be obviated, or the frequency of in vivo calibrations during sensor wear can be reduced if the code is provided to a receiver (or other data processing device). In embodiments where the calibration code or parameter is provided on the sensor itself, prior to or at the start of the sensor use, the calibration code or parameter can be automatically transmitted or provided to the data processing device in the analyte monitoring system.

Some in vivo analyte monitoring system operate with a sensor that can be one or more of factory calibrated, system calibrated, and/or user calibrated. For example, the sensor can be provided with a calibration code or parameter which can allow for factory calibration. If the information is provided to a receiver (for example, entered by a user), the sensor can operate as a factory calibrated sensor. If the information is not provided to a receiver, the sensor can operate as a user calibrated sensor and/or a system calibrated sensor.

In a further aspect, programming or executable instructions can be provided or stored in the data processing device of the analyte monitoring system, and/or the receiver/controller unit, to provide a time varying adjustment algorithm to the in vivo sensor during use. For example, based on a retrospective statistical analysis of analyte sensors used in vivo and the corresponding glucose level feedback, a predetermined or analytical curve or a database can be generated which is time based, and configured to provide additional adjustment to the one or more in vivo sensor parameters to compensate for potential sensor drift in stability profile, or other factors.

In accordance with the disclosed subject matter, the analyte monitoring system can be configured to compensate or adjust for the sensor sensitivity based on a sensor drift profile. A time varying parameter $\beta(t)$ can be defined or determined based on analysis of sensor behavior during in vivo use, and a time varying drift profile can be determined. In certain aspects, the compensation or adjustment to the sensor sensitivity can be programmed in the receiver unit, the controller or data processor of the analyte monitoring system such that the compensation or the adjustment or both can be performed automatically and/or iteratively when sensor data is received from the analyte sensor. In accordance with the disclosed subject matter, the adjustment or compensation algorithm can be initiated or executed by the user (rather than self-initiating or executing) such that the adjustment or the compensation to the analyte sensor sensitivity profile is performed or executed upon user initiation or activation of the corresponding function or routine, or upon the user entering the sensor calibration code.

In accordance with the disclosed subject matter, each sensor in the sensor lot (in some instances not including sample sensors used for in vitro testing) can be examined non-destructively to determine or measure its characteristics such as membrane thickness at one or more points of the sensor, and other characteristics including physical characteristics such as the surface area/volume of the active area can be measured or determined. Such measurement or determination can be performed in an automated manner using, for example, optical scanners or other suitable measurement devices or systems, and the determined sensor characteristics for each sensor in the sensor lot is compared to the corresponding mean values based on the sample sensors for possible correction of the calibration parameter or code assigned to each sensor. For example, for a calibration parameter defined as the sensor sensitivity, the sensitivity is approximately inversely proportional to the membrane thickness, such that, for example, a sensor having a measured membrane thickness of approximately 4% greater than the mean membrane thickness for the sampled sensors from the same sensor lot as the sensor, the sensitivity assigned to that sensor in one embodiment is the mean sensitivity determined from the sampled sensors divided by 1.04. Likewise, since the sensitivity is approximately proportional to active area of the sensor, a sensor having measured active area of approximately 3% lower than the mean active area for the sampled sensors from the same sensor lot, the sensitivity assigned to that sensor is the mean sensitivity multiplied by 0.97. The assigned sensitivity can be determined from the mean sensitivity from the sampled sensors, by multiple successive adjustments for each examination or measurement of the sensor. In certain embodiments, examination or measurement of each sensor can additionally include measurement of membrane consistency or texture in addition to the membrane thickness and/or surface are or volume of the active sensing area.

Additional information regarding sensor calibration is provided in U.S. Publication No. 2010/0230285 and U.S. Publication No. 2019/0274598, each of which is incorporated by reference herein in its entirety.

The storage memory 5030 of the sensor control device 102 can include the software blocks related to communication protocols of the communication module. For example, the storage memory 5030 can include a BLE services software block with functions to provide interfaces to make the BLE module 5041 available to the computing hardware of the sensor control device 102. These software functions can include a BLE logical interface and interface parser. BLE services offered by the communication module 5040 can include the generic access profile service, the generic attribute service, generic access service, device information service, data transmission services, and security services. The data transmission service can be a primary service used for transmitting data such as sensor control data, sensor status data, analyte measurement data (historical and current), and event log data. The sensor status data can include error data, current time active, and software state. The analyte measurement data can include information such as current and historical raw measurement values, current and historical values after processing using an appropriate algorithm or model, projections and trends of measurement levels, comparisons of other values to patient-specific averages, calls to action as determined by the algorithms or models and other similar types of data.

According to aspects of the disclosed subject matter, and as embodied herein, a sensor control device 102 can be configured to communicate with multiple devices concurrently by adapting the features of a communication protocol or medium supported by the hardware and radios of the sensor control device 102. As an example, the BLE module 5041 of the communication module 5040 can be provided with software or firmware to enable multiple concurrent connections between the sensor control device 102 as a central device and the other devices as peripheral devices, or as a peripheral device where another device is a central device.

Connections, and ensuing communication sessions, between two devices using a communication protocol such as BLE can be characterized by a similar physical channel operated between the two devices (e.g., a sensor control device 102 and data receiving device 120). The physical channel can include a single channel or a series of channels, including for example and without limitation using an agreed upon series of channels determined by a common clock and channel- or frequency-hopping sequence. Communication sessions can use a similar amount of the available communication spectrum, and multiple such communication sessions can exist in proximity. In certain embodiment, each collection of devices in a communication session uses a different physical channel or series of channels, to manage interference of devices in the same proximity.

For purpose of illustration and not limitation, reference is made to an exemplary embodiment of a procedure for a sensor-receiver connection for use with the disclosed subject matter. First, the sensor control device 102 repeatedly advertises its connection information to its environment in a search for a data receiving device 120. The sensor control device 102 can repeat advertising on a regular basis until a connection established. The data receiving device 120 detects the advertising packet and scans and filters for the sensor control device 102 to connect to through the data provided in the advertising packet. Next, data receiving device 120 sends a scan request command and the sensor control device 102 responds with a scan response packet providing additional details. Then, the data receiving device 120 sends a connection request using the Bluetooth device address associated with the data receiving device 120. The data receiving device 120 can also continuously request to establish a connection to a sensor control device 102 with a specific Bluetooth device address. Then, the devices establish an initial connection allowing them to begin to exchange data. The devices begin a process to initialize data exchange services and perform a mutual authentication procedure.

During a first connection between the sensor control device 102 and data receiving device 120, the data receiving device 120 can initialize a service, characteristic, and attribute discovery procedure. The data receiving device 120 can evaluate these features of the sensor control device 102 and store them for use during subsequent connections. Next, the devices enable a notification for a customized security service used for mutual authentication of the sensor control device 102 and data receiving device 120. The mutual authentication procedure can be automated and require no user interaction. Following the successful completion of the mutual authentication procedure, the sensor control device 102 sends a connection parameter update to request the data receiving device 120 to use connection parameter settings preferred by the sensor control device 102 and configured to maximum longevity.

The data receiving device 120 then performs sensor control procedures to backfill historical data, current data, event log, and factory data. As an example, for each type of data, the data receiving device 120 sends a request to initiate a backfill process. The request can specify a range of records defined based on, for example, the measurement value, timestamp, or similar, as appropriate. The sensor control device 102 responds with requested data until all previously unsent data in the memory of the sensor control device 102 is delivered to the data receiving device 120. The sensor control device 102 can respond to a backfill request from the data receiving device 120 that all data has already been sent. Once backfill is completed, the data receiving device 120 can notify sensor control device 102 that it is ready to receive regular measurement readings. The sensor control device 102 can send readings across multiple notifications result on a repeating basis. As embodied herein, the multiple notifications can be redundant notifications to ensure that data is transmitted correctly. Alternatively, multiple notifications can make up a single payload.

For purpose of illustration and not limitation, reference is made to an exemplary embodiment of a procedure to send a shutdown command to the sensor control device 102. The shutdown operation is executed if the sensor control device 102 is in, for example, an error state, insertion failed state, or sensor expired state. If the sensor control device 102 is not in those states, the sensor control device 102 can log the command and execute the shutdown when sensor control device 102 transitions into the error state or sensor expired state. The data receiving device 120 sends a properly formatted shutdown command to the sensor control device 102. If the sensor control device 102 is actively processing another command, the sensor control device 102 will respond with a standard error response indicating that the sensor control device 102 is busy. Otherwise, the sensor control device 102 sends a response as the command is received. Additionally, the sensor control device 102 sends a success notification through the sensor control characteristic to acknowledge the sensor control device 102 has received the command. The sensor control device 102 registers the shutdown command. At the next appropriate opportunity (e.g., depending on the current sensor state, as described herein), the sensor control device 102 will shut down.

Figure 15:
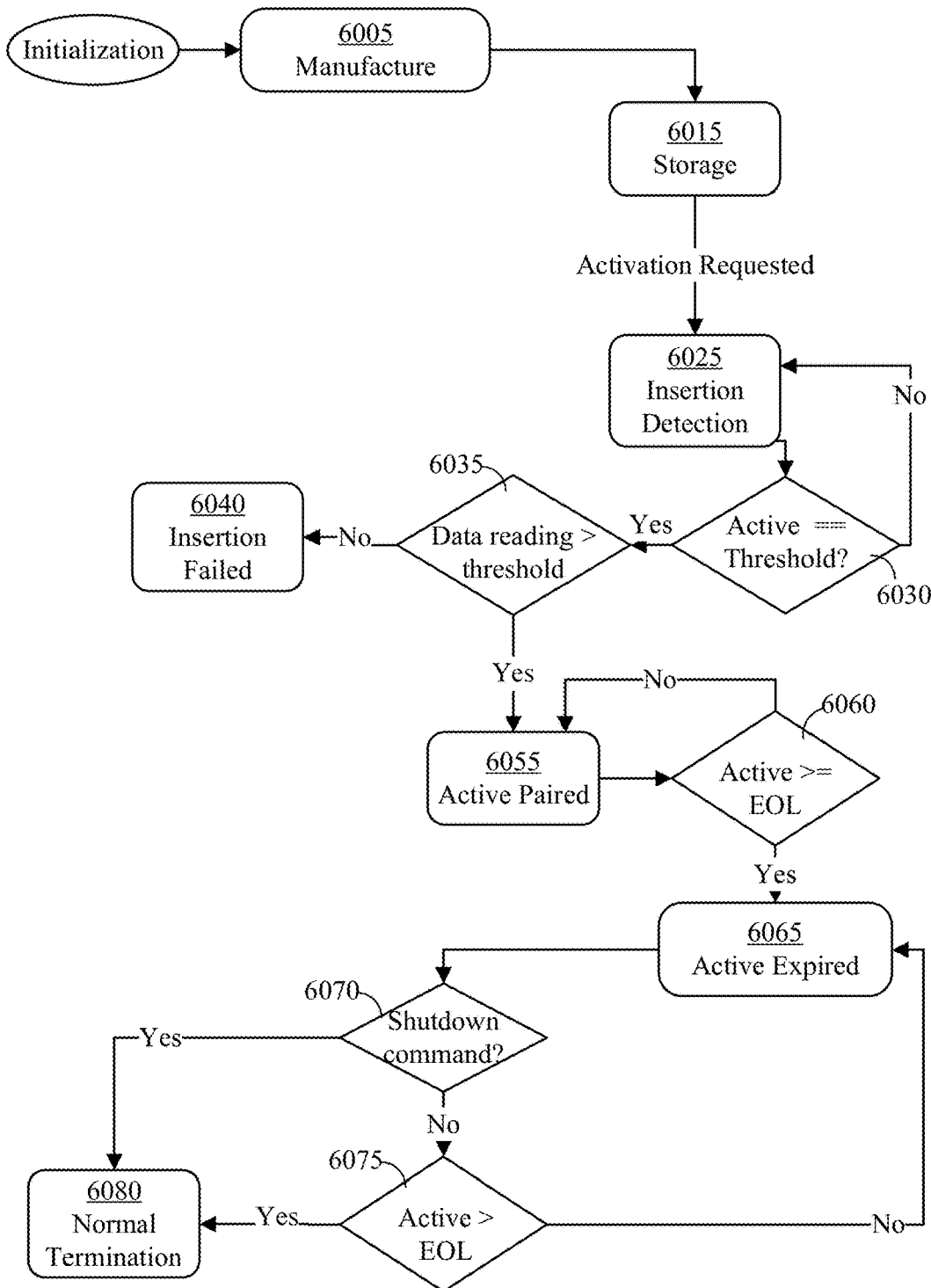
FIG. 15 is a diagram illustrating example operational states of the sensor according to exemplary embodiments of the disclosed subject matter.

For purpose of illustration and not limitation, reference is made to the exemplary embodiment of a high-level depiction of a state machine representation 6000 of the actions that can be taken by the sensor control device 102 as shown in FIG. 15. After initialization, the sensor enters state 6005, which relates to the manufacture of the sensor control device 102. In the manufacture state 6005 the sensor control device 102 can be configured for operation, for example, the storage memory 5030 can be written. At various times while in state 6005, the sensor control device 102 checks for a received command to go to the storage state 6015. Upon entry to the storage state 6015, the sensor performs a software integrity check. While in the storage state 6015, the sensor can also receive an activation request command before advancing to the insertion detection state 6025.

Upon entry to state 6025, the sensor control device 102 can store information relating to devices authenticated to communicate with the sensor as set during activation or initialize algorithms related to conducting and interpreting measurements from the sensing hardware 5060. The sensor control device 102 can also initialize a lifecycle timer, responsible for maintaining an active count of the time of operation of the sensor control device 102 and begin communication with authenticated devices to transmit recorded data. While in the insertion detection state 6025, the sensor can enter state 6030, where the sensor control device 102 checks whether the time of operation is equal to a predetermined threshold. This time of operation threshold can correspond to a timeout function for determining whether an insertion has been successful. If the time of operation has reached the threshold, the sensor control device 102 advances to state 6035, in which the sensor control device 102 checks whether the average data reading is greater than a threshold amount corresponding to an expected data reading volume for triggering detection of a successful insertion. If the data reading volume is lower than the threshold while in state 6035, the sensor advances to state 6040, corresponding to a failed insertion. If the data reading volume satisfies the threshold, the sensor advances to the active paired state 6055.

The active paired state 6055 of the sensor control device 102 reflects the state while the sensor control device 102 is operating as normal by recording measurements, processing the measurements, and reporting them as appropriate. While in the active paired state 6055, the sensor control device 102 sends measurement results or attempts to establish a connection with a receiving device 120. The sensor control device 102 also increments the time of operation. Once the sensor control device 102 reaches a predetermined threshold time of operation (e.g., once the time of operation reaches a predetermined threshold), the sensor control device 102 transitions to the active expired state 6065. The active expired state 6065 of the sensor control device 102 reflects the state while the sensor control device 102 has operated for its maximum predetermined amount of time.

While in the active expired state 6065, the sensor control device 102 can generally perform operations relating to winding down operation and ensuring that the collected measurements have been securely transmitted to receiving devices as needed. For example, while in the active expired state 6065, the sensor control device 102 can transmit collected data and, if no connection is available, can increase efforts to discover authenticated devices nearby and establish and connection therewith. While in the active expired state 6065, the sensor control device 102 can receive a shutdown command at state 6070. If no shutdown command is received, the sensor control device 102 can also, at state 6075, check if the time of operation has exceeded a final operation threshold. The final operation threshold can be based on the battery life of the sensor control device 102. The normal termination state 6080 corresponds to the final operations of the sensor control device 102 and ultimately shutting down the sensor control device 102.

Before a sensor is activated, the ASIC 5000 resides in a low power storage mode state. The activation process can begin, for example, when an incoming RF field (e.g., NFC field) drives the voltage of the power supply to the ASIC 5000 above a reset threshold, which causes the sensor control device 102 to enter a wake-up state. While in the wake-up state, the ASIC 5000 enters an activation sequence state. The ASIC 5000 then wakes the communication module 5040. The communication module 5040 is initialized, triggering a power on self-test. The power on self-test can include the ASIC 5000 communicating with the communication module 5040 using a prescribed sequence of reading and writing data to verify the memory and one-time programmable memory are not corrupted.

When the ASIC 5000 enters the measurement mode for the first time, an insertion detection sequence is performed to verify that the sensor control device 102 has been properly installed onto the patient's body before a proper measurement can take place. First, the sensor control device 102 interprets a command to activate the measurement configuration process, causing the ASIC 5000 to enter measurement command mode. The sensor control device 102 then temporarily enters the measurement lifecycle state to run a number of consecutive measurements to test whether the insertion has been successful. The communication module 5040 or ASIC 5000 evaluates the measurement results to determine insertion success. When insertion is deemed successful, the sensor control device 102 enters a measurement state, in which the sensor control device 102 begins taking regular measurements using sensing hardware 5060. If the sensor control device 102 determines that the insertion was not successful, sensor control device 102 is triggered into an insertion failure mode, in which the ASIC 5000 is commanded back to storage mode while the communication module 5040 disables itself.

FIG. 1B further illustrates an example operating environment for providing over-the-air ("OTA") updates for use with the techniques described herein. An operator of the analyte monitoring system 100 can bundle updates for the data receiving device 120 or sensor control device 102 into updates for an application executing on the multi-purpose data receiving device 130. Using available communication channels between the data receiving device 120, the multi-purpose data receiving device 130, and the sensor control device 102, the multi-purpose data receiving device 130 can receive regular updates for the data receiving device 120 or sensor control device 102 and initiate installation of the updates on the data receiving device 120 or sensor control device 102. The multi-purpose data receiving device 130 acts as an installation or update platform for the data receiving device 120 or sensor control device 102 because the application that enables the multi-purpose data receiving device 130 to communicate with a sensor control device 102, data receiving device 120 and/or remote application server 155 can update software or firmware on a data receiving device 120 or sensor control device 102 without wide-area networking capabilities.

As embodied herein, a remote application server 155 operated by the manufacturer of the sensor control device 102 and/or the operator of the analyte monitoring system 100 can provide software and firmware updates to the devices of the analyte monitoring system 100. In particular embodiments, the remote application server 155 can provides the updated software and firmware to a user device 145 or directly to a multi-purpose data receiving device. As embodied herein, the remote application server 155 can also provide application software updates to an application storefront server 160 using interfaces provided by the application storefront. The multi-purpose data receiving device 130 can contact the application storefront server 160 periodically to download and install the updates.

After the multi-purpose data receiving device 130 downloads an application update including a firmware or software update for a data receiving device 120 or sensor control device 102, the data receiving device 120 or sensor control device 102 and multi-purpose data receiving device 130 establish a connection. The multi-purpose data receiving device 130 determines that a firmware or software update is available for the data receiving device 120 or sensor control device 102. The multi-purpose data receiving device 130 can prepare the software or firmware update for delivery to the data receiving device 120 or sensor control device 102. As an example, the multi-purpose data receiving device 130 can compress or segment the data associated with the software or firmware update, can encrypt or decrypt the firmware or software update, or can perform an integrity check of the firmware or software update. The multi-purpose data receiving device 130 sends the data for the firmware or software update to the data receiving device 120 or sensor control device 102. The multi-purpose data receiving device 130 can also send a command to the data receiving device 120 or sensor control device 102 to initiate the update. Additionally or alternatively, the multi-purpose data receiving device 130 can provide a notification to the user of the multi-purpose data receiving device 130 and include instructions for facilitating the update, such as instructions to keep the data receiving device 120 and the multi-purpose data receiving device 130 connected to a power source and in close proximity until the update is complete.

The data receiving device 120 or sensor control device 102 receives the data for the update and the command to initiate the update from the multi-purpose data receiving device 130. The data receiving device 120 can then install the firmware or software update. To install the update, the data receiving device 120 or sensor control device 102 can place or restart itself in a so-called "safe" mode with limited operational capabilities. Once the update is completed, the data receiving device 120 or sensor control device 102 re-enters or resets into a standard operational mode. The data receiving device 120 or sensor control device 102 can perform one or more self-tests to determine that the firmware or software update was installed successfully. The multi-purpose data receiving device 130 can receive the notification of the successful update. The multi-purpose data receiving device 130 can then report a confirmation of the successful update to the remote application server 155.

In particular embodiments, the storage memory 5030 of the sensor control device 102 includes one-time programmable (OTP) memory. The term OTP memory can refer to memory that includes access restrictions and security to facilitate writing to particular addresses or segments in the memory a predetermined number of times. The memory 5030 can be prearranged into multiple pre-allocated memory blocks or containers. The containers are pre-allocated into a fixed size. If storage memory 5030 is one-time programming memory, the containers can be considered to be in a non-programmable state. Additional containers which have not yet been written to can be placed into a programmable or writable state. Containerizing the storage memory 5030 in this fashion can improve the transportability of code and data to be written to the storage memory 5030. Updating the software of a device (e.g., the sensor device described herein) stored in an OTP memory can be performed by superseding only the code in a particular previously written container or containers with updated code written to a new container or containers, rather than replacing the entire code in the memory. In a second embodiment, the memory is not prearranged. Instead, the space allocated for data is dynamically allocated or determined as needed. Incremental updates can be issued, as containers of varying sizes can be defined where updates are anticipated.

Figure 16:
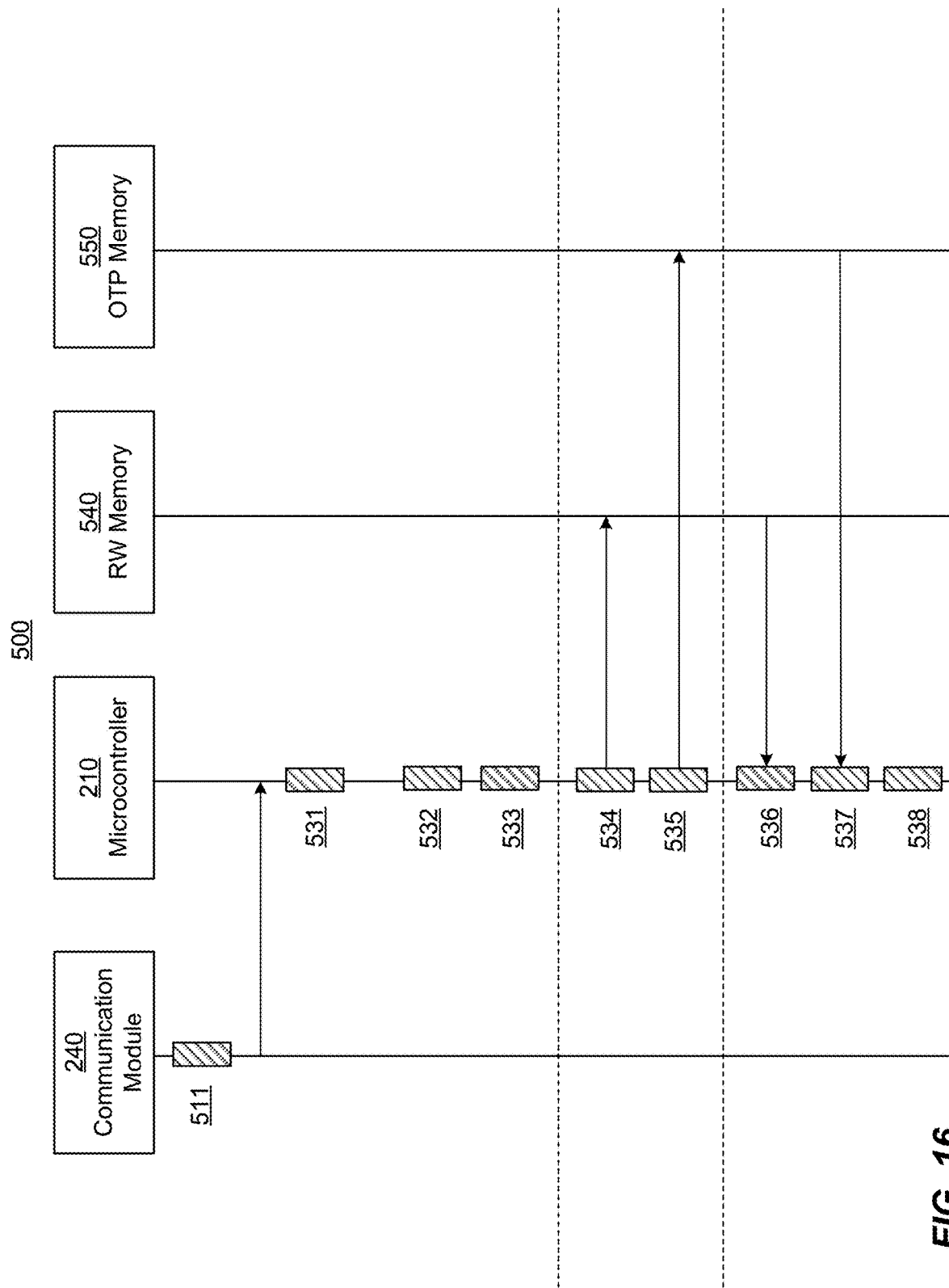
FIG. 16 is a diagram illustrating an example operational and data flow for over-the-air programming of a sensor according to the disclosed subject matter.

FIG. 16 is a diagram illustrating an example operational and data flow for over-the-air (OTA) programming of a storage memory 5030 in a sensor control device 102 as well as use of the memory after the OTA programming in execution of processes by the sensor device 110 according to the disclosed subject matter. In the example OTA programming 500 illustrated in FIG. 5, a request is sent from an external device (e.g., the data receiving device 130) to initiate OTA programming (or re-programming). At 511, a communication module 5040 of a sensor device 110 receives an OTA programming command. The communication module 5040 sends the OTA programming command to the microcontroller 5010 of the sensor device 110.

At 531, after receiving the OTA programming command, the microcontroller 5010 validates the OTA programming command. The microcontroller 5010 can determine, for example, whether the OTA programming command is signed with an appropriate digital signature token. Upon determining that the OTA programming command is valid, the microcontroller 5010 can set the sensor device into an OTA programming mode. At 532, the microcontroller 5010 can validate the OTA programming data. At 533, The microcontroller 5010 can reset the sensor device 110 to re-initialize the sensor device 110 in a programming state. Once the sensor device 110 has transitioned into the OTA programming state, the microcontroller 5010 can begin to write data to the rewriteable memory 540 (e.g., memory 5020) of the sensor device at 534 and write data to the OTP memory 550 of the sensor device at 535 (e.g., storage memory 5030). The data written by the microcontroller 5010 can be based on the validated OTA programming data. The microcontroller 5010 can write data to cause one or more programming blocks or regions of the OTP memory 550 to be marked invalid or inaccessible. The data written to the free or unused portion of the OTP memory can be used to replace invalidated or inaccessible programming blocks of the OTP memory 550. After the microcontroller 5010 writes the data to the respective memories at 534 and 535, the microcontroller 5010 can perform one or more software integrity checks to ensure that errors were not introduced into the programming blocks during the writing process. Once the microcontroller 5010 is able to determine that the data has been written without errors, the microcontroller 5010 can resume standard operations of the sensor device.

In execution mode, at 536, the microcontroller 5010 can retrieve a programming manifest or profile from the rewriteable memory 540. The programming manifest or profile can include a listing of the valid software programming blocks and can include a guide to program execution for the sensor control device 102. By following the programming manifest or profile, the microcontroller 5010 can determine which memory blocks of the OTP memory 550 are appropriate to execute and avoid execution of out-of-date or invalidated programming blocks or reference to out-of-date data. At 537, the microcontroller 5010 can selectively retrieve memory blocks from the OTP memory 550. At 538, the microcontroller 5010 can use the retrieved memory blocks, by executing programming code stored or using variable stored in the memory.

As embodied herein a first layer of security for communications between the sensor control device 102 and other devices can be established based on security protocols specified by and integrated in the communication protocols used for the communication. Another layer of security can be based on communication protocols that necessitate close proximity of communicating devices. Furthermore certain packets and/or certain data included within packets can be encrypted while other packets and/or data within packets is otherwise encrypted or not encrypted. Additionally or alternatively, application layer encryption can be used with one or more block ciphers or stream ciphers to establish mutual authentication and communication encryption with other devices in the analyte monitoring system 100.

The ASIC 5000 of the sensor control device 102 can be configured to dynamically generate authentication and encryption keys using data retained within the storage memory 5030. The storage memory 5030 can also be pre-programmed with a set of valid authentication and encryption keys to use with particular classes of devices. The ASIC 5000 can be further configured to perform authentication procedures with other devices using received data and apply the generated key to sensitive data prior to transmitting the sensitive data. The generated key can be unique to the sensor control device 102, unique to a pair of devices, unique to a communication session between a sensor control device 102 and other device, unique to a message sent during a communication session, or unique to a block of data contained within a message.

As embodied herein, the sensor control device 102 can use application layer encryption using one or more block ciphers to establish mutual authentication and encryption of other devices in the analyte monitoring system 100. The use of a non-standard encryption design implemented in the application layer has several benefits. One benefit of this approach is that in certain embodiments the user can complete the pairing of a sensor control device 102 and another device with minimal interaction, e.g., using only an NFC scan and without requiring additional input, such as entering a security pin or confirming pairing Both the sensor control device 102 and a data receiving device 120 can ensure the authorization of the other party in a communication session to, for example, issue a command or receive data. In particular embodiments, identity authentication can be performed through two features. First, the party asserting its identity provides a validated certificate signed by the manufacturer of the device or the operator of the analyte monitoring system 100. Second, authentication can be enforced through the use of public keys and private keys, and shared secrets derived therefrom, established by the devices of the analyte monitoring system 100 or established by the operator of the analyte monitoring system 100. To confirm the identity of the other party, the party can provide proof that the party has control of its private key.

The manufacturer of the sensor control device 102, data receiving device 120, or provider of the application for multi-purpose data receiving device 130 can provide information and programming necessary for the devices to securely communicate through secured programming and updates. For example, the manufacturer can provide information that can be used to generate encryption keys for each device, including secured root keys for the sensor control device 102 and optionally for the data receiving device 120 that can be used in combination with device-specific information and operational data (e.g., entropy-based random values) to generate encryption values unique to the device, session, or data transmission as need.

Analyte data associated with a user is sensitive data at least in part because this information can be used for a variety of purposes, including for health monitoring and medication dosing decisions. In addition to user data, the analyte monitoring system 100 can enforce security hardening against efforts by outside parties to reverse-engineering. Communication connections can be encrypted using a device-unique or session-unique encryption key. Encrypted communications or unencrypted communications between any two devices can be verified with transmission integrity checks built into the communications. Sensor control device 102 operations can be protected from tampering by restricting access to read and write functions to the memory 5020 via a communication interface. The sensor can be configured to grant access only to known or "trusted" devices, provided in a "whitelist" or only to devices that can provide a predetermined code associated with the manufacturer or an otherwise authenticated user. A whitelist can represent an exclusive range, meaning that no connection identifiers besides those included in the whitelist will be used, or a preferred range, in which the whitelist is searched first, but other devices can still be used. The sensor control device 102 can further deny and shut down connection requests if the requestor cannot complete a login procedure over a communication interface within a predetermined period of time (e.g., within four seconds). These characteristics safeguard against specific denial of service attacks, and in particular against denial-of-service attacks on a BLE interface.

Figure 17:
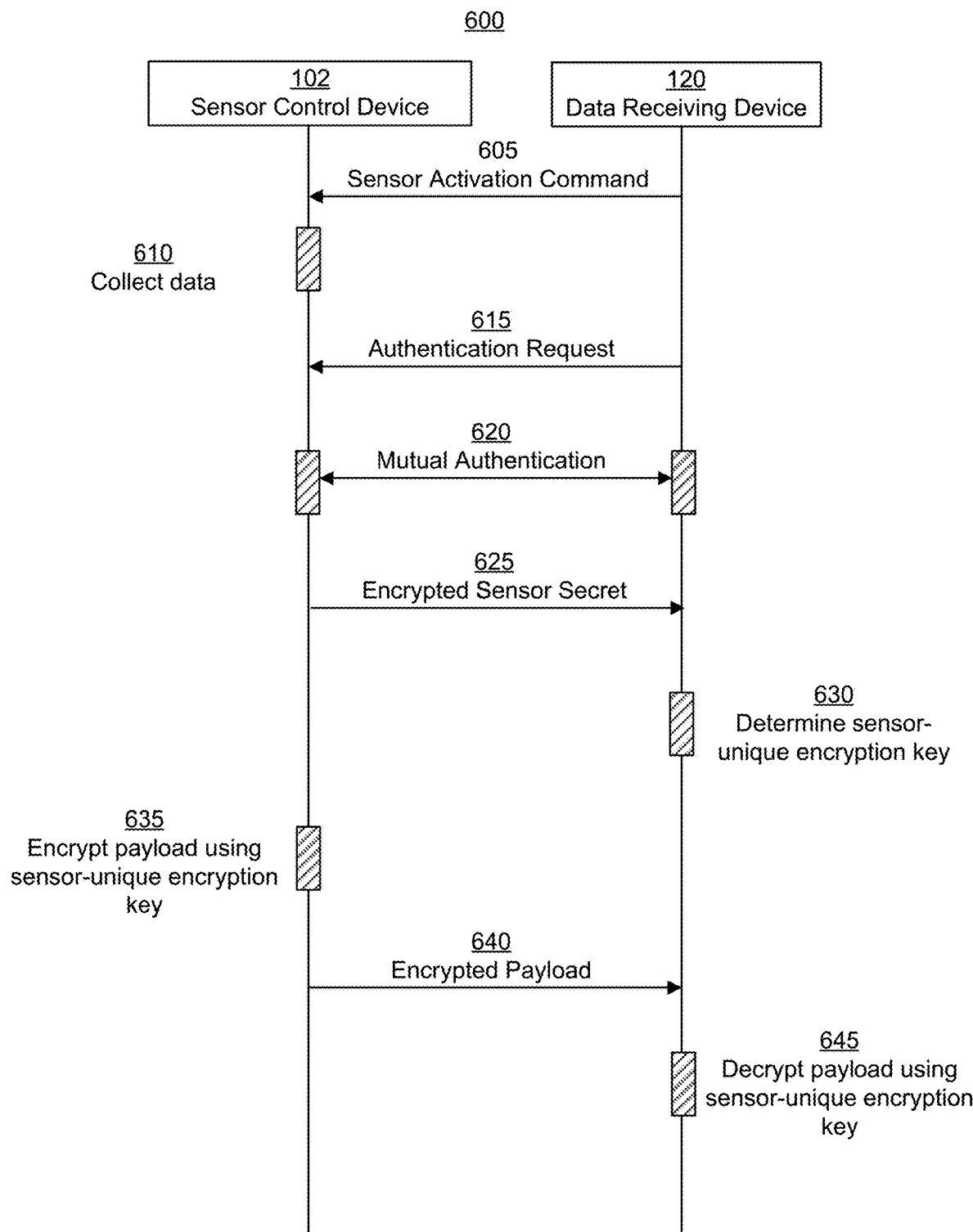
FIG. 17 is a diagram illustrating an example data flow for secure exchange of data between two devices according to the disclosed subject matter.

For purpose of illustration and not limitation, reference is made to the exemplary embodiment of a message sequence diagram 600 for use with the disclosed subject matter as shown in FIG. 17 and demonstrating an example exchange of data between a pair of devices, particularly a sensor control device 102 and a data receiving device 120. The data receiving device 120 can, as embodied herein, be a data receiving device 120 or a multi-purpose data receiving device 130. At step 605, the data receiving device 120 can transmit a sensor activation command 605 to the sensor control device 102, for example via a short-range communication protocol. The sensor control device 102 can, prior to step 605 be in a primarily dormant state, preserving its battery until full activation is needed. After activation during step 610, the sensor control device 102 can collect data or perform other operations as appropriate to the sensing hardware 5060 of the sensor control device 102. At step 615 the data receiving device 120 can initiate an authentication request command 615. In response to the authentication request command 615, both the sensor control device 102 and data receiving device 120 can engage in a mutual authentication process 620. The mutual authentication process 620 can involve the transfer of data, including challenge parameters that allow the sensor control device 102 and data receiving device 120 to ensure that the other device is sufficiently capable of adhering to an agreed-upon security framework described herein. Mutual authentication can be based on mechanisms for authentication of two or more entities to each other with or without on-line trusted third parties to verify establishment of a secret key via challenge-response. Mutual authentication can be performed using two-, three-, four-, or five-pass authentication, or similar versions thereof.

Following a successful mutual authentication process 620, at step 625 the sensor control device 102 can provide the data receiving device 120 with a sensor secret 625. The sensor secret can contain sensor-unique values and be derived from random values generated during manufacture. The sensor secret can be encrypted prior to or during transmission to prevent third-parties from accessing the secret. The sensor secret 625 can be encrypted via one or more of the keys generated by or in response to the mutual authentication process 620. At step 630, the data receiving device 120 can derive a sensor-unique encryption key from the sensor secret. The sensor-unique encryption key can further be session-unique. As such, the sensor-unique encryption key can be determined by each device without being transmitted between the sensor control device 102 or data receiving device 120. At step 635, the sensor control device 102 can encrypt data to be included in payload. At step 640, the sensor control device 102 can transmit the encrypted payload 640 to the data receiving device 120 using the communication link established between the appropriate communication models of the sensor control device 102 and data receiving device 120. At step 645, the data receiving device 120 can decrypt the payload using the sensor-unique encryption key derived during step 630. Following step 645, the sensor control device 102 can deliver additional (including newly collected) data and the data receiving device 120 can process the received data appropriately.

As discussed herein, the sensor control device 102 can be a device with restricted processing power, battery supply, and storage. The encryption techniques used by the sensor control device 102 (e.g., the cipher algorithm or the choice of implementation of the algorithm) can be selected based at least in part on these restrictions. The data receiving device 120 can be a more powerful device with fewer restrictions of this nature. Therefore, the data receiving device 120 can employ more sophisticated, computationally intense encryption techniques, such as cipher algorithms and implementations.

The sensor control device 102 can be configured to alter its discoverability behavior to attempt to increase the probability of the receiving device receiving an appropriate data packet and/or provide an acknowledgement signal or otherwise reduce restrictions that can be causing an inability to receive an acknowledgement signal. Altering the discoverability behavior of the sensor control device 102 can include, for example and without limitation, altering the frequency at which connection data is included in a data packet, altering how frequently data packets are transmitted generally, lengthening or shortening the broadcast window for data packets, altering the amount of time that the sensor control device 102 listens for acknowledgement or scan signals after broadcasting, including directed transmissions to one or more devices (e.g., through one or more attempted transmissions) that have previously communicated with the sensor control device 102 and/or to one or more devices on a whitelist, altering a transmission power associated with the communication module when broadcasting the data packets (e.g., to increase the range of the broadcast or decrease energy consumed and extend the life of the battery of the analyte sensor), altering the rate of preparing and broadcasting data packets, or a combination of one or more other alterations. Additionally, or alternatively, the receiving device can similarly adjust parameters relating to the listening behavior of the device to increase the likelihood of receiving a data packet including connection data.

As embodied herein, the sensor control device 102 can be configured to broadcast data packets using two types of windows. The first window refers to the rate at which the sensor control device 102 is configured to operate the communication hardware. The second window refers to the rate at which the sensor control device 102 is configured to be actively transmitting data packets (e.g., broadcasting). As an example, the first window can indicate that the sensor control device 102 operates the communication hardware to send and/or receive data packets (including connection data) during the first 2 seconds of each 60 second period. The second window can indicate that, during each 2 second window, the sensor control device 102 transmits a data packet every 60 milliseconds. The rest of the time during the 2 second window, the sensor control device 102 is scanning.

The sensor control device 102 can lengthen or shorten either window to modify the discoverability behavior of the sensor control device 102.

In particular embodiments, the discoverability behavior of the analyte sensor can be stored in a discoverability profile, and alterations can be made based on one or more factors, such as the status of the sensor control device 102 and/or by applying rules based on the status of the sensor control device 102. For example, when the battery level of the sensor control device 102 is below a certain amount, the rules can cause the sensor control device 102 to decrease the power consumed by the broadcast process. As another example, configuration settings associated with broadcasting or otherwise transmitting packets can be adjusted based on the ambient temperature, the temperature of the sensor control device 102, or the temperature of certain components of communication hardware of the sensor control device 102. In addition to modifying the transmission power, other parameters associated with the transmission capabilities or processes of the communication hardware of the sensor control device 102 can be modified, including, but not limited to, transmission rate, frequency, and timing. As another example, when the analyte data indicates that the subject is, or is about to be, experiencing a negative health event, the rules can cause the sensor control device 102 to increase its discoverability to alert the receiving device of the negative health event.

Mobile devices can install programming packages, sometimes referred to as applications, that upgrade the software features of the mobile device. For example, such mobile devices can install these application packages through connecting with one or more centralized application storefronts using the mobile device's wide area network capabilities (e.g., through a WiFi or cellular radio module). The application storefronts handle the task of managing updates to the applications. For example, an application storefront can receive an update from the provider of the application. After, in some cases, verification and certain security certification checks, users can be notified that an update is available for an application. In some embodiments, the update can be pushed to mobile devices automatically so that the end user is not necessarily made aware that an update has occurred. So-called "background" updates can be particularly advantageous when the updates are directed to providing updates that do not add new features to an application such as bug fixes or security updates. For feature updates, it can be advantageous to inform users of the nature of the updates to reduce confusion.

While application storefronts of this type are advantageous for devices that are capable of establishing a connection to the application storefront, such as through wide-area networking capabilities, the advantages of the seamless update process cannot be realized by devices without communication capabilities to access the storefront. As an example, and as described herein, a data receiving device 120 can have limited network capabilities through the inclusion of only short- or medium-range communication modules. In particular embodiments, the networking capabilities of the data receiving device 120 can be intentionally designed with selected communication capabilities as a mechanism for reducing the vectors through which security risks can be exposed. When the data receiving device 120 is used mostly to communicate with a sensor control device 102 and relay information from the sensor control device 102 to a user, design of the data receiving device 120 can be simplified by omitting long-range or wide-area networking capabilities. Instead, the data receiving device 120 can utilize connections to a user device 140 to offload historical data. In certain embodiments, the connection to the user device 140 can be a physical connection to further reduce the opportunities for security risks to be determined and exposed. A user can also install updates to the data receiving device 120 through this physical connection to the user device 140.

Many users, however, do not use a user device 140 as their primary computing device. Instead, increasingly more users are using a mobile electronic device such as a smartphone or tablet as a primary device. These users are often accustomed to the speed and simplicity of receiving and installing new applications and updates to applications on application storefronts.

In certain systems, options for allowing a user to update functionality of data receiving devices 120 and sensor control devices 102 can be difficult to implement, or for simplicity, can be omitted altogether. In such systems, the data receiving device 120 can be sent to the manufacturer of the device or operator of an analyte monitoring system 100 or a trusted representative for updates. Alternatively, the user can manually download updates and install them through a physical connection to a user device 140 by manually downloading application and/or firmware updates for a data receiving device 120 to a user device 140, connecting the data receiving device 120 to the user device 140, and initializing the installation of the updates. However, this process can present challenges to users, for example who are not as familiar with the technology involved. Moreover, by putting the burden on the user to ensure that devices stay updated, important functional updates can be unintentionally delayed for significant periods of time. Additionally, because of a relatively short shelf life and usage period of the sensor control device 102, users may not be inclined to incur the cost or use the time to update the sensor control device 102 in such manual manners.

FIG. 1B illustrates an example operating environment of an example bundled updating system for use with the techniques described herein. The updating system can be a secured update system for a data receiving device 120 facilitating an operator of the analyte monitoring system bundling updates for the data receiving device 120 into updates for an application executing on the multi-purpose data receiving device 130. Using available communication channels between the data receiving device 120 and the multi-purpose data receiving device 130, the multi-purpose data receiving device 130 can receive regular updates for the data receiving device 120 and initiate installation of the updates on the data receiving device 120. The multi-purpose data receiving device 130 acts as an installation or update platform for the data receiving device 120 and/or the sensor control device 102. Similarly, the data receiving device 120 can act as an installation or update platform for the sensor control device 102. Bundling updates for the data receiving device 120 and sensor control device 102 with updates for the multi-purpose data receiving device 130 also allows for more rapid deployment of updates through established and secured channels provided by the application storefront server 160 that are readily available and used by many mobile device users on a regular basis.

In particular embodiments, a user can register a multi-purpose data receiving device 130 and a data receiving device 120 with an operator or manufacturer of an analyte monitoring system 100 such as through communication with a remote application server 155 associated with the analyte monitoring system 100. Registration can enable the analyte monitoring system 100 to inform the user or the multi-purpose data receiving device that an update for the data receiving device 120 is available. For example, the user can have an account with the manufacturer. The manufacturer can provide interfaces for the user to register one or more monitoring devices (e.g., a data receiving device 120 or multi-purpose data receiving device 130) with the account. The user can also register the data receiving device 120 with the multi-purpose data receiving device 130. Registering the data receiving device 120 with the multi-purpose data receiving device 130 can facilitate efficient creation of communication sessions between the devices. As an example, the devices can exchange one or more device identifiers based on the hardware of the device (e.g., a MAC address for each device) or based on a communication protocol used between the devices (e.g., a Bluetooth address for each device). On subsequent attempts at establishing communication sessions, the devices can each whitelist the other in order to prefer the creation of communication sessions.

The multi-purpose data receiving device 130 and the data receiving device 120 can periodically communicate to ensure that each device has up-to-date information regarding the status of the user. For example the data receiving device 120 can be used to record specialized information based on hardware not available to the multi-purpose data receiving device 130. The data receiving device 120 can provide this specialized information to the multi-purpose data receiving device 130 as a mechanism for backup storage or to allow the multi-purpose data receiving device 130 to relay the information to a remote server 150 on behalf of the data receiving device 120.

A remote application server 155 operated by the manufacturer of the sensor control device 102 and/or the operator of the analyte monitoring system 100 can provide software and firmware updates to the devices of the analyte monitoring system 100. In particular embodiments, the remote application server 155 can provides the updated software and firmware to a user device 140 or directly to a multi-purpose data receiving device.

In particular embodiments, the remote application server 155 provides application software updates to an application storefront server 160 using interfaces provided by the application storefront. As an example, the application storefront server 160 is used by developers of a variety of applications to provide application software executable on multi-purpose data receiving devices 130. These applications can include applications unrelated to the analyte monitoring system 100. The application storefront server 160 can also be used by developers to provide updates to multi-purpose data receiving devices 130 that have already downloaded a version of an application. The multi-purpose data receiving device 130 can contact the application storefront server 160 periodically to determine if there are any updates available for the applications installed on and executing on the multi-purpose data receiving device. For example, the multi-purpose data receiving device 130 can provide a list of all installed applications and their current version numbers. The application storefront server 160 can compare the version numbers to the most up-to-date versions available through the storefront. Upon detecting that a newer version is available, the application storefront server 160 can initiate an update process to provide the newer version to the multi-purpose data receiving device 130.

In particular embodiments, the operator of the analyte monitoring system 100 can use the update process to provide updates to an application or software library that has been installed on a multi-purpose data receiving device 130. For example, the operator can push updates to the application storefront server 160 that include bug fixes, security updates, and new features. The application corresponding to the analyte monitoring system 100, e.g., that enables the multi-purpose data receiving device 130 to communicate with a sensor control device 102, data receiving device 120 and/or remote application server can further include an updating mechanism for the data receiving device 120 and/or the sensor control device 102. The application provided by the manufacturer of the sensor control device 102 and/or data receiving device 120 facilitates a user's personal mobile electronic device functioning as a data receiving device within the analyte monitoring system 100 and performing additional processing algorithms on data received from the analyte sensor 100. In particular embodiments the application bundled with updates can be a special-purpose update platform application configured to enable receiving and handling data receiving device 120 updates.

Figure 18:
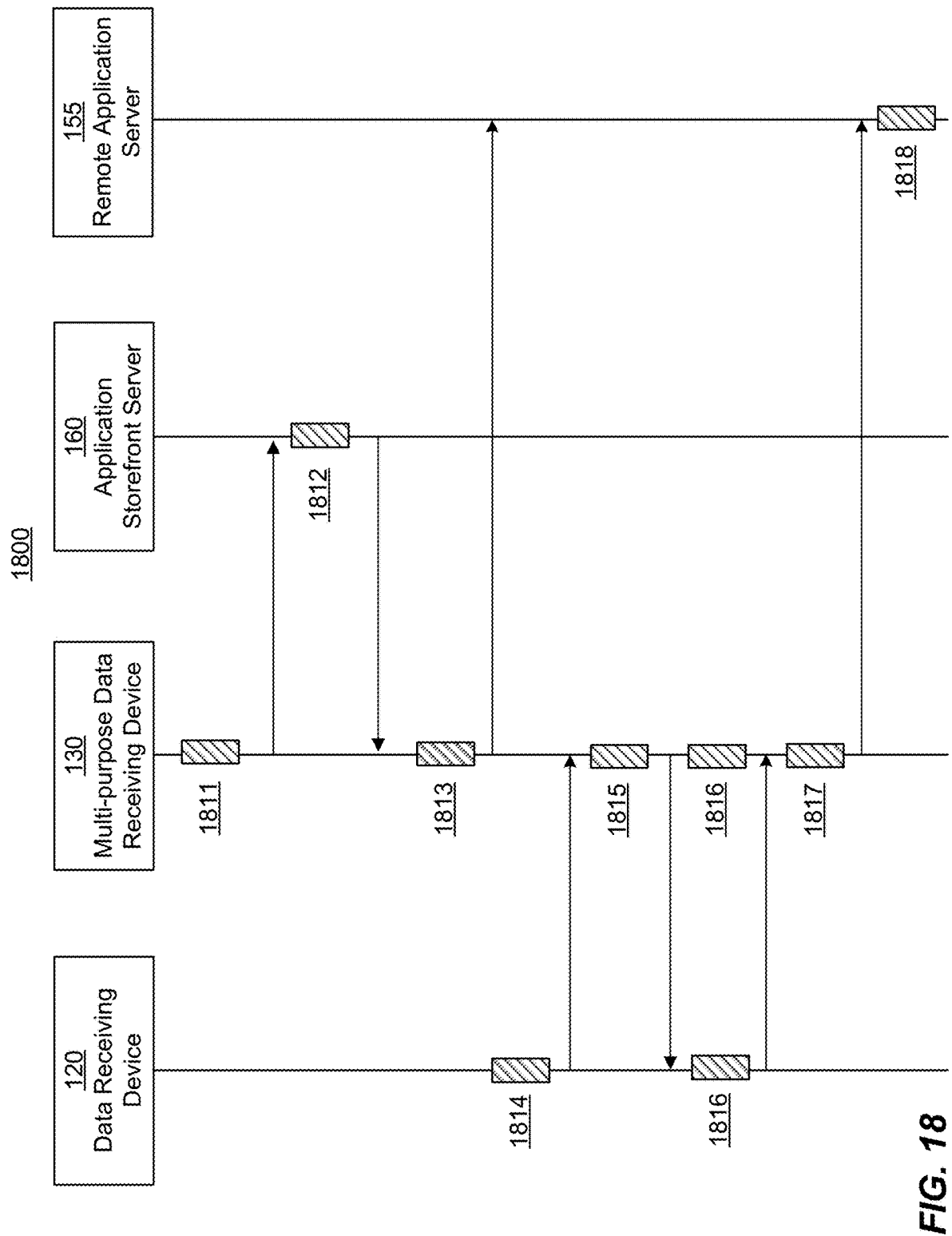
FIG. 18 is a diagram illustrating an example operational and data flow for registering data receiving devices with an application server according to the disclosed subject matter.

FIG. 18 is a diagram illustrating an example operational and data flow for registering a data receiving device 120 with a remote application server 155 through a multi-purpose data receiving device 130 so that updates to the data receiving device 120 can be propagated via updates issued to the multi-purpose data receiving device according to the disclosed subject matter. In the example registration procedure 1800 illustrated in FIG. 18, the data receiving device 120 communicates with a multi-purpose data receiving device 120 through a short-range communication protocol (e.g., Bluetooth or BLE) and does not communicate with the application server 150 directly.

At 1811, the multi-purpose data receiving device 130 requests installation of an application associated with the operator of an analyte monitoring system 100. The user of the multi-purpose data receiving device 130 can be a new patient or otherwise a new user of sensors 110 provided in the analyte monitoring system 100. To use a personal mobile computing device (e.g., a smartphone, tablet) as a multi-purpose data receiving device 130, the user can access an application storefront server 160 based on the operating system or computing platform of their personal mobile computing device. Until the personal mobile computing device has installed and activated the application package provided by the operator of the analyte monitoring system 100, it should be referred to as a personal mobile computing device because it is not yet capable of interfacing with sensor control devices 102 to monitor data. The user can search for a particular application associated with the operator of the analyte monitoring system 100 and request installation of the application. The personal mobile computing device communicates the installation request to the application storefront server 160.

At 1812, the application storefront server 160 receives the request from the personal mobile computing device of the user. The application storefront server 160 queries its data stores for the installation package for the request application. In some embodiments, the application storefront server 160 maintains, or automatically uses, only the most recently updated version of the application. In some embodiments, the application storefront server 160 supports application developers using multiple versions of the same application depending, for example, on device compatibility concerns. The application storefront server 160 confirms that the personal mobile computing device satisfies the installation and compatibility requirements (e.g., correct minimum operation system version, required amount of available storage, appropriate hardware configuration) for the application package. Upon confirming that the personal mobile computing device can install and execute the application, the application storefront server 160 sends the application installation package to the personal mobile computing device.

At 1813, the personal mobile computing device receives the application installation package from the application storefront server. The personal mobile computing device processes the installation of the application installation package. After installation, the personal mobile computing device beings to execute the application. Through the application the user can register an account with the remote application server 155. This registration process allows the user to use and share data between multiple devices, such as multiple multi-purpose data receiving devices 130 and data receiving devices 120.

At 1814, the data receiving device 120 searches for nearby devices to which to connect. In particular embodiments, the data receiving device 120 can be configured to automatically search for nearby devices on a periodic basis (e.g., once every minute while no communication session is active). Additionally or alternatively, the data receiving device 120 can be manually placed into a device search or pairing mode by a user. Through the pairing mode, the data receiving device 120 can configured to search for and request communication sessions with nearby devices. The range of a "nearby" device can be based on the particular communication protocol(s) supported by the data receiving device. For example, the data receiving device 120 can use BLE to communicate with nearby devices, including sensor control devices 102 and multi-purpose data receiving devices. The data receiving device 120 can issue advertising packets to facilitate establishing connections with other devices. As another example, the data receiving device 120 can use NFC to establish an initial pairing (as described herein) and then use BLE for data transmission.

At 1815, the multi-purpose data receiving device 130 detects the presence of the data receiving device 120 through the supported communication protocol. At 1816, the data receiving device 120 and multi-purpose data receiving device 130 can mutually authenticate each other. In particular embodiments, the mutual authentication scheme can be customized by the operator of the analyte monitoring system 100 as an additional layer on top of the hardware authentication schemes supported by the communication protocol. The mutual authentication scheme can be defined in the firmware of the data receiving device 120 and the application package received from the application storefront server 160 and installed on the multi-purpose data receiving device 130. Therefore, by installing the application provided by the operator of the analyte monitoring system, the personal mobile computing device of the user is made capable of establishing a secured communication session and pairing with the hardware of the data receiving device 120. During or subsequent to the mutual authentication procedure, the data receiving device 120 and multi-purpose data receiving device 130 can exchange identifying information such as device identifiers, hardware identifiers, universally unique identifiers, serial numbers, communication protocol-based identifiers (e.g., BLE IDs), etc. Both devices can store the exchange identifiers. The identifiers can be used, for example, to expedite device recognition or expedite the establishment of secured communication sessions in the future.

At 1817, the multi-purpose data receiving device 130 receives identification information for the data receiving device 120. In particular embodiments, the multi-purpose data receiving device 130 receives confirmation from the user of the multi-purpose data receiving device 130 that the user wants to register the data receiving device 120 to be easily access by the multi-purpose data receiving device 130 and/or to register the data receiving device 120 to the account of the user with the operator of the analyte monitoring system. The multi-purpose data receiving device 130 packages the identification information of the data receiving device 120 and sends the identification information to the remote application server 155 associated with the analyte monitoring system 100.

At 1818, the remote application server 155 of the analyte monitoring system 100 receives the identification information for the data receiving device 120 in a request to associate the data receiving device 120 with multi-purpose data receiving device 130 and/or with the account of the user of the multi-purpose data receiving device 130. The remote application server 155 can validate the identification information. For example, the remote application server 155 can determine whether the identification information is in fact a valid identifier for a data receiving device. In particular embodiments, the analyte monitoring system 100 can restrict the number of multi-purpose data receiving devices 130 that can be paired with each data receiving device 120. The remote application server 155 can therefore determine whether the identification information for the data receiving device 120 is already registered to another user account and/or registered with another multi-purpose data receiving device 130. If a potential error is detected, the remote application server 155 can issue an error message to the multi-purpose data receiving device 130 which can be presented to the user with additional information about the error (e.g., providing the identity of a previously paired multi-purpose data receiving device). In some embodiments, the remote application server 155 can issue a warning message to the multi-purpose data receiving device 130 that provides additional information but is not necessarily indicative of an error. The user can attempt to rectify the error to proceed with registration. Once the identification information of the data receiving device 120 is validated and errors or warnings are resolved, the remote application server 155 can provide a confirmation of registration to the multi-purpose data receiving device 130.

Once registered, the remote application server 155 can track activity of the analyte monitoring system 100 with respect to the data receiving device 120 and the multi-purpose data receiving device 130. For example, the remote application server 155 can determine when updates to the software and/or firmware operating on either the data receiving device 120 or the multi-purpose data receiving device 130 are available.

Figure 19:
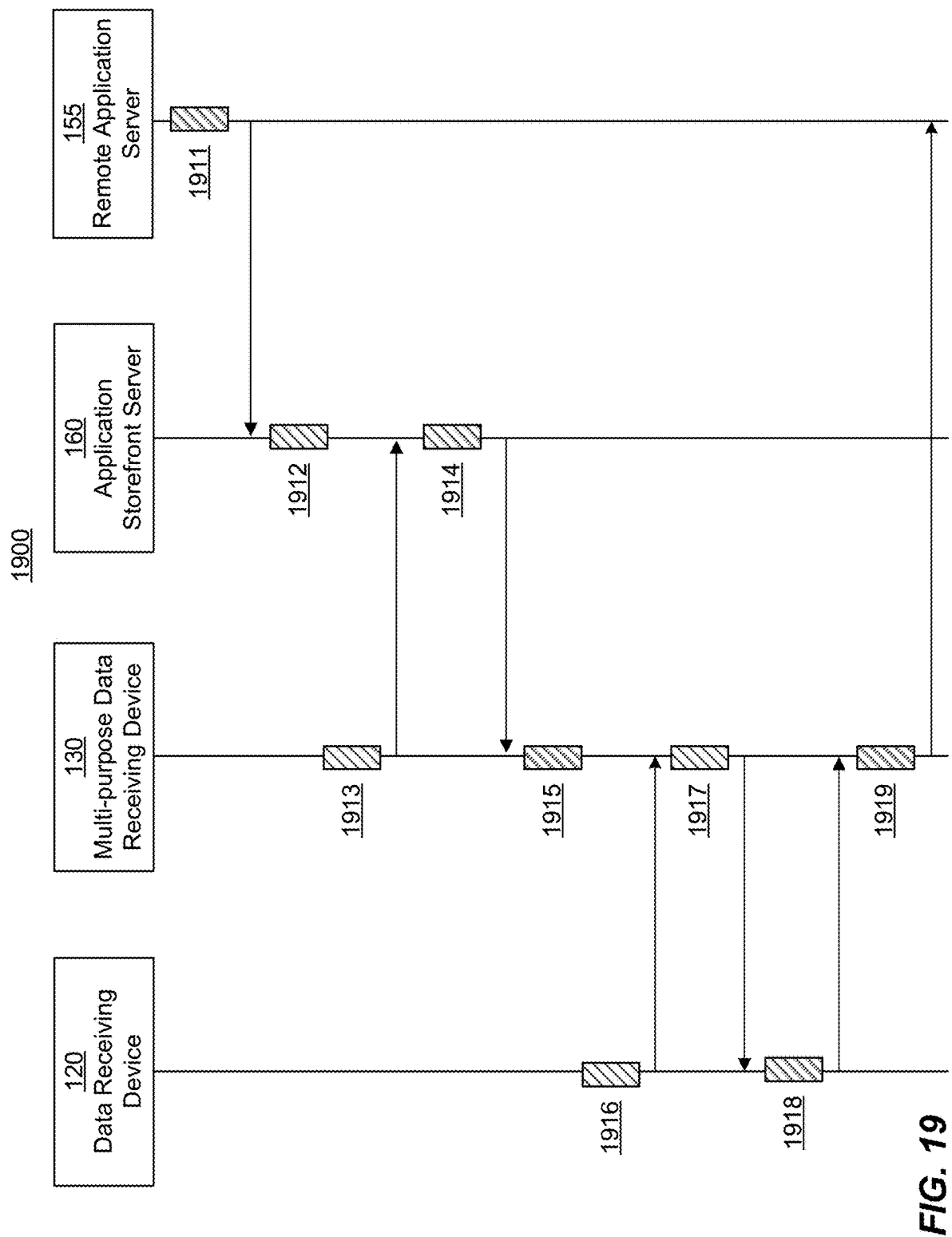
FIG. 19 is a diagram illustrating an example operational and data flow for updating data receiving devices with an application server according to the disclosed subject matter.

FIG. 19 is a diagram illustrating an example operational and data flow for updating software or firmware on a data receiving device 120 without wide-area networking capabilities via an application update provided to a multi-purpose data receiving device 130 according to the disclosed subject matter. In the example updating procedure 1900 illustrated in FIG. 19, the data receiving device 120 receives a software or firmware update from a multi-purpose data receiving device 120 through a short-range communication protocol (e.g., Bluetooth or BLE).

At 1911, the remote application server 155 prepares and pushes an application update to the application storefront server 160. The remote application server 155 can be one of many servers involved in the operations of the analyte monitoring system 100. The remote application server 155 can, for example, be a server used by the operator of the analyte monitoring system 100 to disseminate application and system updates. In many cases, the operator of the analyte monitoring system supports multiple computing platforms simultaneously because the users of the analyte monitoring system 100, and in particular those users who interface with the analyte monitoring system 100 or with sensor control devices 102 through a multi-purpose data receiving device 130, are not necessarily restricted to a particular platform. Therefore, the operator of the analyte monitoring system 100 can operate multiple application servers 155 and interface with multiple application storefront servers 160.

As described herein, the application update that is pushed to the application storefront server 160 can include software updates for the application associated with the analyte monitoring system 100 that executes on the multi-purpose data receiving device 130. The software updates can include additional features or feature updates, bug fixes, data management and algorithm improvements, security updates, or any other manner of software updates for the application. Additionally, the application update can include updated software or firmware for data receiving devices 120. As described herein, the software or firmware updates for the data receiving devices 120 can be bundled in with the software updates for the application because the application, through the multi-purpose data receiving devices 130 acts as a local update platform for the data receiving device 120 which lacks the capability to otherwise communicate with the application server 150 to receive regular updates (e.g., through a wide-area network). Bundling updates for the data receiving device 120 with updates for the multi-purpose data receiving device 130 also allows for more rapid deployment of updates through established and secured channels provided by the application storefront server 160 that are available and pre-configured for use by many mobile devices.

At 1912, the application storefront server 160 receives the updated application package from the remote application server 155. The application storefront server 160 can perform a variety of validation, verification, and confirmation tests on the updated application package in order to ensure that no system-level bugs or security risks have been introduced by the updated application package. These validation, verification, and confirmation tests can be performed by application storefront servers 160, including for example where the application storefront is one of a select number of methods through which a user's personal mobile device can receive new applications and application updates.

At 1913, the multi-purpose data receiving device 130 contacts the application storefront server 160 to determine if there are any pending application updates. In particular embodiments, the multi-purpose data receiving device 130 can be configured to periodically check in with the application storefront server 160 to determine if any of the applications currently installed on the multi-purpose data receiving device 130 are associated with an updated version that is available from the application storefront server 160. For example, the multi-purpose data receiving device can report a version number associated with each installed application to the application storefront server 160. The application storefront server 160 can compare the installed version number with the latest version number available to the application storefront server 160. Additionally or alternatively, the application storefront server 160 can affirmatively communicate with the multi-purpose data receiving device 130 to notify the device when an update to an application is available. For example, the application storefront server 160 can store the latest version that has been installed on a multi-purpose data receiving device 130 and, upon determining that a newer version is available, inform the multi-purpose data receiving device that an update should be scheduled.

In particular embodiments, prior to 1913, the remote application server 155 can optionally send a notification to the application associated with the analyte monitoring system 100 and executing on the multi-purpose data receiving device 130 to inform the multi-purpose data receiving device 130 that an application update has or will soon be provided to the application storefront server 160. This can cause the multi-purpose data receiving device to affirmatively contact the applications storefront server 160 to search for the update. By providing a notification to the multi-purpose data receiving device 130 directly, the remote application server 155 can continue to rely on the update delivery model supported by the application storefront server 160, while still maintaining the rapidity of deployed updates that can be made available in an update model relying on a connection between the remote application server 155 and the multi-purpose data receiving device 130. The notification can also be provided to the user of the multi-purpose data receiving device 130 and include instructions for facilitating the update, such as instructions to keep the data receiving device 120 and the multi-purpose data receiving device 130 connected to a power source and in close proximity until the update is complete. In particular embodiments, the user of the multi-purpose data receiving device 130 is not the same user as the user of the sensor control device 102 and the data receiving device 120. The user of the multi-purpose data receiving device 130 can be, for example, a caregiver or caretaker of the user of the sensor control device 102, such as a medical professional (e.g., physician, nurse, specialist), family member, or other caretaker (e.g., teacher, coach).

At 1914, the application storefront server 160 determines that there are updates available to one or more applications installed on the multi-purpose data receiving device and in particular, for the purposes of this disclosure to the application associated with the analyte monitoring system 100. As described herein, the availability of the update can be determined based on, for example, the application store server 160 determining that a version number associated with the currently available version of the application and the version installed on the multi-purpose data receiving device 130 do not match. Other data relating to the version of the application available from the application storefront server 160 and installed on the multi-purpose data receiving device 130 can be used to determine whether the installed version should be updated, including, but not limited to a timestamp associated with each version, an integrity check for each version, a checksum generated based on each version, expiration of a regularly-schedule update period, other related information, or a combination of the information. Once the application storefront server 160 determines that an update to the application associated with the analyte monitoring system 100 is available, the application storefront server can provide a notification to the multi-purpose data receiving device 130. The application storefront server 160 can further provide the update and other requisite installation packages to the multi-purpose data receiving device 130.

At 1915, the multi-purpose data receiving device 130 installs the application update. In this example, the application update includes a firmware or software update for the data receiving device 120. The firmware or software update can be delivered with application update for the multi-purpose data receiving device because the firmware or software update is bundled with the update as data included with the update.

At 1916, the data receiving device 120 establishes a connection with the multi-purpose data receiving device 130. In particular embodiments, the application update from the application storefront server 160 can be installed by the multi-purpose data receiving device 130 without the connection between the data receiving device 120 and the multi-purpose data receiving device 130 terminating or expiring. In these embodiments, step 1916 can be optional.

At 1917, the multi-purpose data receiving device 130 determines that a firmware or software update is available for the data receiving device 120. Similar mechanisms to how the application storefront server (and/or multi-purpose data receiving device 130) determines that an application update is available for the multi-purpose data receiving device 130 can be used by the multi-purpose data receiving device 130 (and/or data receiving device 120) to determine that a software or firmware update is available for the data receiving device 120. The multi-purpose data receiving device 130 can, for example, check for updates to the data receiving device each time a new communication session is established, once per predetermined time period, or through other similar mechanisms. Additionally or alternatively, the remote application server 155 can directly notify the multi-purpose data receiving device 130, for example through the application update or through a direct notification, that a software or firmware update is available for the data receiving device 120.

After determining that the update is available, the multi-purpose data receiving device 130, through the application provided by the operator of the analyte monitoring system 100 can prepare the software or firmware update for delivery to the data receiving device 120. As an example, the multi-purpose data receiving device 130 can compress or segment the data associated with the software or firmware update based on the communication protocol used between the data receiving device 120 and the multi-purpose data receiving device 130. The communication protocol can have limits associated with packet sizes or message sizes and the multi-purpose data receiving device 130 can determine a communication scheme for the update accordingly. In particular embodiments, the firmware or software update can be received by the multi-purpose data receiving device 130 in an encrypted state and the multi-purpose data receiving device 130 can decrypt the update before transmitting it to the data receiving device 120. Additionally or alternatively, the firmware or software update can be received by the multi-purpose data receiving device in an unencrypted state and the multi-purpose data receiving device 130 can encrypt it using an agreed-upon encryption scheme before transmitting it to the data receiving device 120. In particular embodiments, the multi-purpose data receiving device facilitates an integrity check of the data for the firmware or software update. The multi-purpose data receiving device 130 generates one or more checksums or other check values for the data for the firmware or software update. Where the data has been segmented into multiple parts, an additional checksum or other integrity check value can be generated for each of the parts. The checksum(s) can be sent separately to the data receiving device 120 by the multi-purpose data receiving device 120. As described herein, the checksum(s) can be used by the data receiving device 120 to verify the integrity of the data and identify errors in the data that can be introduced through, for example, transmission errors between the two devices. The multi-purpose data receiving device 130 sends the data for the firmware or software update to the data receiving device 120 via the communication protocol. The multi-purpose data receiving device 130 can also send a command to the data receiving device to initiate the update. In particular embodiments, the data receiving device 120 lacks wide-area networking functionality and the data for the update is transmitted by the multi-purpose data receiving device 130 to the data receiving device 120 via a short-range communication protocol (e.g., Bluetooth, NFC, ZigBee, etc.). Additionally or alternatively, the multi-purpose data receiving device 130 can provide a notification to the user of the multi-purpose data receiving device 130 and include instructions for facilitating the update, such as instructions to keep the data receiving device 120 and the multi-purpose data receiving device 130 connected to a power source and in close proximity until the update is complete.

At 1918, the data receiving device 120 receives the data for the update and the command to initiate the update from the multi-purpose data receiving device 130. If a checksum or other check value were also provided, the data receiving device 120 can use the checksum to determine that the data for the update has been receiving in full and that no apparent transmission errors have occurred. The data receiving device 120 can then install the firmware or software update. To install the update, the data receiving device 120 can place or restart itself in a so-called "safe" mode with limited operational capabilities. The safe mode can be used to reduce the number of active threads or processes and therefore free up resources while the installation is occurring and also reduce the opportunities for conflicts to arise because a software block is both being updated and used simultaneously.

In particular embodiments, while the data receiving device 120 is performing a firmware or software update, it can be temporarily unable to perform data receiving and monitoring functions on behalf of the user. The data receiving device 120 and/or the multi-purpose data receiving device 130 can notify the user that the data receiving device 120 will be temporarily unavailable. Additionally or alternatively, the multi-purpose data receiving device 130 can take over certain functions that ordinarily can be performed by the data receiving device 120. Furthermore, in embodiments where multiple other device devices are associated with the account of the user, the user can be empowered to choose which other device takes over the additional functions. As an example, functions that can be transferred temporarily to the multi-purpose data receiving device 130 (or other device as selected by the user) can include functions relating to the health of the user. These functions can include live data readings, determining of trending data, alerting and notification functions (e.g., alerts of severe or critical levels of an analyte measured by the sensor control device 102 and reported to the data receiving device 120 or multi-purpose data receiving device 130), and related functions. Similarly, while the multi-purpose data receiving device 130 is updating, the data receiving device 120 can take over for functions performed by the multi-purpose data receiving device 130.

Once the update is completed, the data receiving device 120 re-enters or resets into a standard operational mode. The data receiving device 120 can performed one or more self-tests to determine that the firmware or software update was installed successfully. The self-tests can include, for example, processing sample data, issuing example notifications, confirming a communication status with the multi-purpose data receiving device 130, and other related self-tests. The self-tests can be previously provided by to the data receiving device 120 (e.g., during manufacture, a previous update, or by the multi-purpose data receiving device 130), provided with the data for the firmware or software update, or can be provided by the multi-purpose data receiving device after the update is completed. Once the update and any self-testing is finished by the data receiving device 120, the data receiving device 120 can notify the multi-purpose data receiving device that the software or firmware update has been successfully completed.

At 1919, the multi-purpose data receiving device 130 can receive the notification of the successful update. The multi-purpose data receiving device 130 can then report a confirmation of the successful update to the remote application server 155. The remote application server 155 can in turn update its records of the software and/or firmware versions executing on the data receiving device 120. In particular embodiments, if no confirmation is received from the data receiving device 120 for a pre-determined amount of time, the multi-purpose data receiving device 130 can interpret the lack of confirmation as an indication of an error during the installation process and attempt to push the update to the data receiving device 120 again, as in step 1917. If, after a predetermined number of attempts the multi-purpose data receiving device 130 does not receive an installation confirmation notification from the data receiving device 120, the multi-purpose data receiving device 130 can interpret this as an indication of a critical error and inform one or more of the remote application server 155 and the user.

Figure 20:
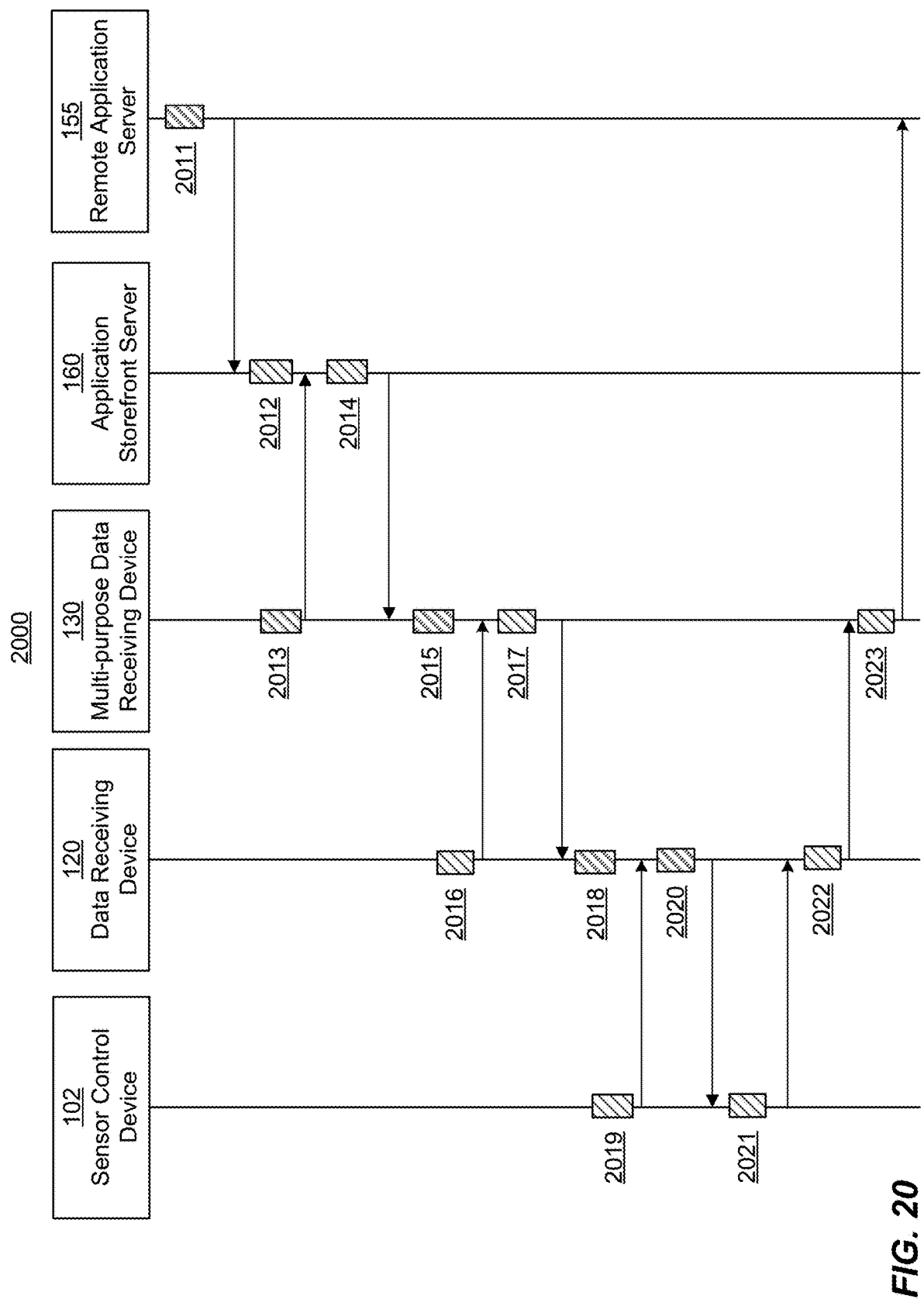
FIG. 20 is a diagram illustrating an example operational and data flow for updating a sensor control device according to the disclosed subject matter.

FIG. 20 is a diagram illustrating an example operational and data flow for updating software or firmware on a sensor control device 102 without wide-area networking capabilities via an application update provided to a multi-purpose data receiving device 130 and data receiving device 120 according to the disclosed subject matter. In the example updating procedure 2000 illustrated in FIG. 20, the data receiving device 120 receives a software or firmware update from a multi-purpose data receiving device 130 through a short-range communication protocol (e.g., Bluetooth or BLE). The update to the data receiving device 120 also includes an update for the sensor control device 102. Although in the example illustrated in FIG. 20, the update is delivered by the data receiving device 120, it should be understood that, as the sensor control device 102 can maintain bi-directional communication with the multi-purpose data receiving device 130, the update can equally be delivered to the sensor control device 102 through updates delivered to the multi-purpose device. In other words, the use of the data receiving device 120 is illustrated as an example here, but the use of the data receiving device is optional in the embodiment contemplated by this disclosure.

At 2011, the remote application server 155 prepares and pushes an application update to the application storefront server 160. The remote application server 155 can be one of many servers involved in the operations of the analyte monitoring system 100. The remote application server 155 can, for example, be a server used by the operator of the analyte monitoring system 100 to disseminate application and system updates. In many cases, the operator of the analyte monitoring system supports multiple computing platforms simultaneously because the users of the analyte monitoring system 100, and in particular those users who interface with the analyte monitoring system 100 or with sensor control devices 102 through a multi-purpose data receiving device 130, are not necessarily restricted to a particular platform. Therefore, the operator of the analyte monitoring system 100 can operate multiple application servers 155 and interface with multiple application storefront servers 160.

The application update that is pushed to the application storefront server 160 can include software updates for the application associated with the analyte monitoring system 100 that executes on the multi-purpose data receiving device 130. The software updates can include additional features or feature updates, bug fixes, data management and algorithm improvements, security updates, or any other manner of software updates for the application. Additionally, the application update can include updated software or firmware for data receiving devices 120. As described herein, the software or firmware updates for the data receiving devices 120 can be bundled in with the software updates for the application because the application, through the multi-purpose data receiving devices 130 acts as a local update platform for the data receiving device 120 which lacks the capability to otherwise communicate with the application server 150 to receive regular updates (e.g., through a wide-area network). Moreover, the application update can include updated software or firmware for sensor control devices 102. As described herein, the software or firmware updates for the sensor control devices 102 can be bundled in with the software updates for the application executing on the multi-purpose data receiving device 130 or the data receiving device 120 because the application, through either the multi-purpose data receiving device 130 or the data receiving device 120 can act as a local update platform for the sensor control device 102. The sensor control device 102 has even more restricted communication capabilities when compared to the data receiving device 120 and lacks the capability to otherwise communicate with the application server 150 to receive regular updates (e.g., through a wide-area network). Bundling updates for the sensor control device 102 in this manner allows for the sensor control device 102 to be updated well after the sensor control device 102 has completed manufacture. Bundling updates for the sensor control device 102 in this manner also allows for more rapid deployment of updates through established and secured channels provided by the application storefront server 160 that are available and pre-configured for use by many mobile devices.

At 2012, the application storefront server 160 receives the updated application package from the remote application server 155.

At 2013, the multi-purpose data receiving device 130 contacts the application storefront server 160 to determine if there are any pending application updates. The multi-purpose data receiving device 130 can be notified of updates in a manner consistent with that described above, including with respect to 1913, and additional details are not repeated for the purpose of brevity.

At 2014, the application storefront server 160 determines that there are updates available to one or more applications installed on the multi-purpose data receiving device and in particular, for the purposes of this disclosure to the application associated with the analyte monitoring system 100. The availability of the update can be determined in a manner consistent with that described above, including with respect to 1914, and additional details are not repeated for the purpose of brevity.

At 2015, the multi-purpose data receiving device 130 installs the application update. In this example, the application update includes a firmware or software update for the data receiving device 120 that includes an update for the sensor control device 102. The firmware or software update can be delivered with application update for the multi-purpose data receiving device 130 because the firmware or software update is bundled with the update as data included with the update.

At 2016, the data receiving device 120 establishes a connection with the multi-purpose data receiving device 130. In particular embodiments, the application update from the application storefront server 160 can be installed by the multi-purpose data receiving device 130 without the connection between the data receiving device 120 and the multi-purpose data receiving device 130 terminating or expiring. In these embodiments, step 2016 can be optional.

At 2017, the multi-purpose data receiving device 130 determines that a firmware or software update is available for the data receiving device 120. The multi-purpose data receiving device 130 can determine that a firmware or software update is available in a manner consistent with that described above, including with respect to 1917, and additional details are not repeated for the purpose of brevity.

At 2018, the data receiving device 120 receives the data for the update and the command to initiate the update from the multi-purpose data receiving device 130. The data receiving device 120 can then install the firmware or software update in a manner consistent with that described above, including with respect to 1918, and additional details are not repeated for the purpose of brevity. The data receiving device 120 can optionally deliver a notice to the multi-purpose data receiving device 130 that the update has been completed, consistent with that disclosed at 1919.

At 2019, the sensor control device 102 establishes a connection with the data receiving device 120. Optionally, the data receiving device 120 can initiate and establish the connection or the sensor control device 102 and data receiving device 120 can cooperate to mutually establish the connection consistent with techniques described herein.

At 2020, the data receiving device 120 determines that a firmware or software update is available for the sensor control device. Similar mechanisms to how the multi-purpose data receiving device 130 determines that an update is available for the data receiving device 120 can be used by the data receiving device 120 (and/or sensor control device 102) to determine that a software or firmware update is available for the sensor control device 102. The data receiving device 120 can, for example, check for updates to the sensor control device 102 each time a new communication session is established, once per predetermined time period, or through other similar mechanisms. Additionally or alternatively, the data receiving device 120 can be directly notified through its own update, that that a software or firmware update is available for the sensor control device 102.

After determining that the update is available, the data receiving device 120 can prepare the software or firmware update for delivery to the sensor control device 102. As an example, the data receiving device 120 can compress or segment the data associated with the software or firmware update based on the communication protocol used between the sensor control device 102 and the data receiving device 120. The communication protocol can have limits associated with packet sizes or message sizes and the data receiving device 120 can determine a communication scheme for the update accordingly. In particular embodiments, the firmware or software update can be received by the data receiving device 120 in an encrypted state and the data receiving device 120 can decrypt the update before transmitting it to the sensor control device 102. Such a scheme can be preferable where the sensor control device 102 has restrictions on computational power and/or battery life. Additionally or alternatively, the firmware or software update can be received by the data receiving device 120 in an unencrypted state and the data receiving device 120 can encrypt it using an agreed-upon encryption scheme before transmitting it to the sensor control device 102. In particular embodiments, the data receiving device 120 facilitates an integrity check of the data for the firmware or software update. The data receiving device 120 generates one or more checksums or other check values for the data for the firmware or software update. Where the data has been segmented into multiple parts, an additional checksum or other integrity check value can be generated for each of the parts. The checksum(s) can be sent separately to the sensor control device 102 by the data receiving device 120. As described herein, the checksum(s) can be used by the sensor control device 102 to verify the integrity of the data and identify errors in the data that can be introduced through, for example, transmission errors between the two devices. The data receiving device 120 sends the data for the firmware or software update to the sensor control device 102 via the communication protocol. The data receiving device 120 can also send a command to the sensor control device 102 to initiate the update. In particular embodiments, the sensor control device 102 lacks wide-area networking functionality and the data for the update is transmitted to the sensor control device 102 via a short-range communication protocol (e.g., Bluetooth, NFC, ZigBee, etc.). Additionally or alternatively, the data receiving device 120 can provide a notification to the user of the data receiving device 110 and include instructions for facilitating the update, such as instructions to keep the sensor control device 102 and the data receiving device 120 in proximity and/or to keep the data receiving device 120 connected to a power source until the update is complete.

At 2021, the sensor control device 102 receives the data for the update and the command to initiate the update from the data receiving device 120. If a checksum or other check value were also provided, the sensor control device 102 can use the checksum to determine that the data for the update has been receiving in full and that no apparent transmission errors have occurred. The sensor control device 102 can then install the firmware or software update. To install the update, the sensor control device 102 can place or restart itself in a so-called "safe" mode with limited operational capabilities. The safe mode can be used to reduce the number of active processes and therefore free up resources while the installation is occurring and also reduce the opportunities for conflicts to arise because a software block is both being updated and used simultaneously. In particular embodiments, while the sensor control device 102 is performing a firmware or software update, it can be temporarily unable to perform functions on behalf of the user. The data receiving device 120 and/or the multi-purpose data receiving device 130 can notify the user that the sensor control device 102 will be temporarily unavailable during the update. To mitigate concerns about the sensor control device 102 being unable to monitor analyte levels during the update, the sensor control device 102 can be restricted to updating during a so-called warm-up period while the sensor is acclimating after being implanted in the user. Additionally or alternatively, the certain functions of the sensor control device 102 can be maintained during the update. For example, the sensor control device 102 can be configured to continue to receive data signals from the sensor itself (e.g., through analog front end) and can continue to store those data signals in a memory of the sensor control device 102.

Processing of the signal (e.g., into calibrated analyte levels) can be held until the update is complete, but the data will still be available.

Once the update is completed, the sensor control device 102 re-enters or resets into a standard operational mode. The sensor control device 102 can perform one or more self-tests to determine that the firmware or software update was installed successfully. The self-tests can include, for example, processing sample data, confirming a communication status with the data receiving device 120, and other related self-tests. Once the update and any self-testing is finished by the sensor control device 102, the sensor control device 102 can notify the data receiving device 120 that the software or firmware update has been successfully completed.

At 2022, the data receiving device 120 can receive the notification of the successful update. The data receiving device 120 can in turn update its records of the software and/or firmware versions executing on the sensor control device 102. In particular embodiments, if no confirmation is received from the sensor control device 102 for a predetermined amount of time, the data receiving device 120 can interpret the lack of confirmation as an indication of an error during the installation process and attempt to push the update to the sensor control device 102 again. If, after a predetermined number of attempts the data receiving device 120 does not receive an installation confirmation notification from the sensor control device 102, the data receiving device 120 can interpret this as an indication of a critical error and inform and the user.

At 2023, the multi-purpose data receiving device 130 can receive the notification of the successful update from the data receiving device 120. The multi-purpose data receiving device 130 can then report a confirmation of the successful update to the remote application server 155. The remote application server 155 can in turn update its records of the software and/or firmware versions executing on the data receiving device 120 and sensor control device 102. In particular embodiments, if no confirmation is received from the data receiving device 120 for a pre-determined amount of time, the multi-purpose data receiving device 130 can interpret the lack of confirmation as an indication of an error during the installation process and attempt to push the update to the data receiving device 120 again and/or request the data receiving device 120 to push the update to the sensor control device 120 again. If, after a predetermined number of attempts the multi-purpose data receiving device 130 does not receive an installation confirmation notification from the data receiving device 120, the multi-purpose data receiving device 130 can interpret this as an indication of a critical error and inform one or more of the remote application server 155 and the user.

Not illustrated is the manufacture of the devices used in the analyte monitoring system 100, including the sensor control device 102, data receiving device 120, as well as software or application programming interfaces that can be used by or with the remote server 150, multi-purpose data receiving devices 130, and other user devices 140. The manufacturer can choose to provide the information and programming necessary for the devices to securely communicate through secured programming and updates (e.g., one-time programming, encrypted software or firmware updates, etc.). For example, the manufacturer can provide information that can be used to generate encryption keys for each device, including secured root keys for the sensor control device 102 and optionally for the data receiving device 120 that can be used in combination with device-specific information and operational data (e.g., entropy-based random values) to generate encryption values unique to the device, session, or data transmission as need. These encryption keys can be used, for example, to validate OTA programming commands and OTA programming data transmitted from external devices (e.g., data receiving devices 120, multi-purpose data receiving devices 130, user device 140, etc.) to sensor control devices 102.

The manufacturer can imbue each sensor control device 102 with a unique identifier ("UID") and other identifying information, such as an identifier for the manufacturer, identifier for the communication module and manufacturer, or any other suitable identifying information for the sensor or sensor components. As an example, the UID can be derived from sensor-unique data, such as from a serial number assigned to each ASIC 5000 embodied in the sensor control device 102 by the ASIC vendor, from a serial number assigned to a communication module 5040 embodied in the sensor control device 102 by a communication module vendor, from a random value generated by the sensor manufacturer, etc. Additionally or alternatively, the UID can also be derived from manufacturing values including a lot number for the sensor control device 102 or its components, a day, date, or time of manufacturer of the sensor control device 102 or its key components, the manufacturing location, process, or line of the sensor or its key components, and other information that can be used to identify when and how the sensor was manufactured. The UID can be accompanied by encryption keys and several generated random values that are also unique to each sensor control device 102. Similar processes can be used to establish the secure identity of the data receiving device 120.

As the data collected by the sensor control device 102 and exchanged between the sensor control device 102 and other devices in the analyte monitoring system 100 pertain to information about a user, the data is highly sensitive and can be beneficial to be protected. Analyte data associated with a patient is sensitive data at least in part because this information can be used for a variety of purposes, including for health monitoring and medication dosing decisions. In addition to patient data, the analyte monitoring system 100 can enforce security hardening against efforts by outside parties to reverse-engineering. The security architecture described herein can include various combinations of control features described herein, including, but not limited to the protection of communication between devices, the protection of proprietary information within components and applications, and the protection of secrets and primary keying material. As embodied herein, encryption and authentication can be used as exemplary technical controls for providing protective features. As embodied herein, the various components of the analyte monitoring system 100 can be configured compliant with a security interface designed to protect the Confidentiality, Integrity and Availability ("CIA") of this communication and associated data. To address these CIA concerns, security functions can be incorporated into the design of the hardware and software of the analyte monitoring system 100.

As embodied herein, to facilitate the confidentiality of data, communication connections between any two devices (e.g., a sensor control device 102 and data receiving device 120) can be mutually authenticated prior to transmitting sensitive data by either device. Communication connections can be encrypted using a device-unique or session-unique encryption key. As embodied herein, the encryption parameters can be configured to change with every data block of the communication.

As embodied herein, to protect the integrity of data, encrypted communications between any two devices (e.g., a sensor control device 102 and data received device 120) can be verified with transmission integrity checks built into the communications. As an example, as described herein, OTA programming data can be verified or validated with transmission integrity checks. Furthermore, data written to a memory of the sensor control device 102 can be verified or validated with integrity checks prior to execution. As embodied herein, session key information, which can be used to encrypt the communication, can be exchanged between two devices after the devices have each been authenticated. Integrity checks can include, for example, an error detection code or error correction code, including as an example and not by way of limitation, non-secure error-detecting codes, minimum distance coding, repetition codes, parity bits, checksums, cyclic redundancy checks, cryptographic hash functions, error correction codes, and other suitable methods for detecting the presence of an error in a digital message.

As embodied herein, minimum distance coding includes a random-error correcting code that provides a strict guarantee on number of detectable errors. Minimum distance coding involves choosing a codeword to represent a received value that minimizes the Hamming distance between the value and the representation. Minimum distance coding, or nearest neighbor coding, can be assisted using a standard array. Minimum distance coding is considered useful where the probability that an error occurs is independent of the position of a given symbol and errors can be considered independent events. These assumptions can be particularly applicable for transmissions over a binary symmetric channel.

Additionally or alternatively, as embodied herein, a repetition code relates to a coding scheme that repeats bits across a channel to guarantee that communication messages are received error-free. Given a stream of data to be transmitted, the data divided into blocks of bits. Each block is transmitted and re-transmitted some predetermined number of times. An error is detected if any transmission of the repeated block differs.

In addition, or as a further alternative, as embodied herein, a checksum is a value relative to a message or stored block of data based on a modular arithmetic sum of message code words of a fixed word length. The checksum can be directed from the entire block of data or subset thereof. Checksums are generated using a checksum function or cryptographic hash function that is configured to output significantly different checksum values (or hash values) for minor changes to the targeted message. A parity bit is a bit added to a group of bits in transmission to ensure that the counted number of certain bits in the outcome is even or odd. For example, the parity bit can be used to ensure that the number of bits with value 0 is odd. A parity bit can then detect single errors or a repeating fixed number of errors. A parity bit can be considered a special case of a checksum.

As described herein, the use of BLE on the sensor control device 102 can optionally not rely on standard BLE implementation of Bluetooth for security but can instead use application layer encryption using one or more block ciphers to establish mutual authentication and encryption. The use of a non-standard encryption design implemented in the application layer has several benefits. One benefit of this approach is that the user can complete the pairing of the sensor control device 102 and data receiving device 120 with only an NFC scan and without involving the user providing additional input, such as entering a security pin or confirming BLE pairing between the data receiving device and the sensor control device 102. Another benefit is that this approach mitigates the potential to allow devices that are not in the immediate proximity of the sensor control device 102 to inadvertently or intentionally pair, at least in part because the information used to support the pairing process is shared via a back-up short-range communication link (e.g., NFC) over a short range instead of over the longer-range BLE channel. Furthermore, as BLE pairing and bonding schemes are not involved, pairing of the sensor control device 102 can avoid implementation issues by chip vendors or vulnerabilities in the BLE specification.

As embodied herein, to further reduce or prevent unauthorized access to the devices of the analyte monitoring system 100, root keys (e.g., keys used to generate device-unique or session-unique keys) can optionally not be stored on the sensor control device 102 and can be encrypted in storage by the remote server 150 or on other device having more computing power than the sensor control device 102 (e.g., data receiving device 120). As embodied herein, the root keys can be stored in an obfuscated manner to prevent a third-party from easily accessing the root keys. The root keys can also be stored in different states of encryption based on where in the storage they are stored. As embodied herein, to facilitate the availability of data, sensor control device 102 operations can be protected from tampering during service life, in which the sensor control device 102 can be configured to be disposable, for example and as embodied herein by restricting access to write functions to the memory 220 via a communication interface (e.g., BLE and NFC). The sensor can be configured to grant access only to known devices (e.g., identifier by a MAC address or UID) or only to devices that can provide a predetermined code associated with the manufacturer or an otherwise authenticated user. Access to read functions of the memory 5020 can also be enforced, including for example where the read function attempts to access particular areas of the memory 5020 that have been designated secure or sensitive. The sensor control device 102 can further reject any communication connection request that does not complete authentication within a specified amount of time to safeguard against specific denial of service attacks on the communication interface including attempted man-in-the-middle (MITM) style attacks. Furthermore, the general authentication and encryption design, described herein, can support interoperable usage where sensor control device 102 data can be made available to other "trusted" data receiving devices without being permanently bound to a single device.

As embodied herein, the devices, including sensor control device 102 and data receiving device 120, can each employ a variety of security practices to ensure the confidentiality of data exchanged over communication sessions and facilitate the relevant devices to find and establish connections with trusted endpoints. As an example, the sensor control device 102 can be configured to proactively identify and connect with trusted local-area, wide-area, or cellular broadband networks and continuously verify the integrity of those connections. The sensor control device 102 can further deny and shut down connection requests if the requestor cannot complete a proprietary login procedure over a communication interface within a predetermined period of time (e.g., within four seconds). For example and without limitation, such configurations can further safeguard against denial-of-service attacks.

As embodied herein, the sensor control device 102 and data receiving device 120 can support establishing long-term connection pairs by storing encryption and authentication keys associated with other devices. For example, the sensor control device 102 or data receiving device can associate a connection identifier with encryption and authentication keys used to establish a connection to another device. In this manner, the devices can re-establish dropped connections more quickly, at least in part because the devices can avoid establishing a new authentication pairing and can proceed directly to exchanging information via encrypted communication protocols. After a connection is successfully established, the device can refrain from broadcasting connection identifiers and other information to establish a new connection and can communicate using an agreed channel-hopping scheme to reduce the opportunity for third-parties to listen to the communication.

Data transmission and storage integrity can be actively managed using on-chip hardware functions. While encryption can provide a secure means of transmitting data in a tamper-proof manner, encryption and decryption can be computationally expensive processes. Furthermore, transmission failures can be difficult to differentiate from attacks. As described previously, a fast, hardware-based error detection code can be used for data integrity. As an example, as embodied herein, an appropriately-sized error detection code for the length of the message (e.g., a 16-bit CRC) can be used, although other suitable hardware-based error detection codes can be used in accordance with the disclosed subject matter. Programming instructions that access, generate, or manipulate sensitive data can be stored in memory blocks or containers that are further protected with additional security measures, for example encryption.

As embodied herein, the analyte monitoring system 100 can employ periodic key rotation to further reduce the likelihood of key compromise and exploitation. A key rotation strategy employed by the analyte monitoring system 100 can be designed to ensure backward compatibility of field-deployed or distributed devices. As an example, the analyte monitoring system 100 can employ keys for downstream devices (e.g., devices that are in the field or cannot be feasibly provided updates) that are designed to be compatible with multiple generations of keys used by upstream devices. Additionally, and according to the subject matter herein, keys can be securely updated by invalidating memory blocks including out-of-date keys which are then replaced with data written to new memory. Rotation of keys can be initiated by the manufacturer or the operator of the analyte monitoring system 100. For example, the manufacturer or operator of the analyte monitoring system 100, can generate a new set of keys or define a new set of procedures for generating keys. During manufacture of analyte sensors and sensor control devices 102 that are intended to use the new set of keys, the manufacturer can propagate the new set of keys to newly manufactured sensor control devices 102. The manufacturer can also push updates to deployed devices in communication with the remote server 150 to extend the new set of keys or set of procedures for generating keys to the deployed devices. As a further alternative, key rotation can be based on an agreed-upon schedule, where the devices are configured to adjust the keys used according to some time- or event-driven function.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Thus, the foregoing description of specific embodiments of the disclosed subject matter has been presented for purposes of illustration and description. It is explicitly acknowledged that express recitation of every possible combination and substitution is overly burdensome, especially given that the permissibility of each and every such combination and substitution will be readily recognized by those of ordinary skill in the art.

While the embodiments are susceptible to various modifications and alternative forms, specific examples thereof have been shown in the drawings and are herein described in detail. It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents. Furthermore, any features, functions, steps, or elements of the embodiments may be recited in or added to the claims, as well as negative limitations that define the inventive scope of the claims by features, functions, steps, or elements that are not within that scope.

Also disclosed are the following clauses:

1. A method for updating a data receiving device for an analyte sensor, the method comprising:

receiving, by a computing device, an application update package including an update for an application installed on the computing device and a software or firmware update for the data receiving device, wherein the application installed on the computing device is configured to communicate with or process data from the analyte sensor and the data receiving device comprises software or firmware configured to communicate with or process data from the analyte sensor;

establishing, by the computing device, a short-range wireless communication session with the data receiving device;

transmitting, by the computing device, the software or firmware update for the data receiving device to the data receiving device through the short-range wireless communication session with the data receiving device; and receiving, by the computing device, confirmation of installation of the software or firmware update by the data receiving device.

2. The method of clause 1, wherein the data receiving device does not include wide area networking capability.

3. The method of clauses 1-2, wherein the short-range wireless communication session is a Bluetooth, Bluetooth Low Energy, or near-field communication session.

4. The method of clauses 1-3, further comprising, prior to receiving the application update package:

establishing, by the computing device, a second short-range wireless communication session with the data receiving device;

receiving identifying information for the data receiving device; and registering the identifying information for the data receiving device with the application installed on the computing device.

5. The method of clause 4, wherein the application installed on the computing device is associated with an analyte monitoring system including the data receiving device, the analyte sensor, and an application server; and wherein the method further comprises registering the identifying information for the data receiving device with the application server.

6. The method of clauses 1-5, wherein the application installed on the computing device is associated with an analyte monitoring system including the data receiving device, the analyte sensor, and an application server; and wherein the method further comprises receiving, by the computing device from the application server, a notification that the software or firmware update for the data receiving device is available to be accessed by the computing device.

7. The method of clause 6, further comprising, subsequent to receiving the confirmation of installation of the software or firmware update by the data receiving device, transmitting, by the computing device to the application server, a notification of installation of the software or firmware update by the data receiving device.

8. The method of clause 6, wherein the data receiving device and the analyte sensor are associated with a first user and the computing device is associated with a second user in a caregiving relationship with the first user.

9. The method of clauses 1-8, further comprising notifying a user of the computing device and the data receiving device than the software or firmware update for the data receiving device is available to be installed.

10. The method of clause 9, wherein notifying the user of the computing device and the data receiving device further comprises providing, by the computing device, instructions for facilitating the update.

11. The method of clauses 1-10, wherein the software or firmware update is performed by the data receiving device without notifying a user of the data receiving device.

12. The method of clauses 1-11, further comprising causing the data receiving device to enter a safe mode of operation prior to installing the firmware or software update.

13. The method of clauses 1-12, further comprising encrypting the software or firmware update for the data receiving device prior to transmitting the software or firmware update to the data receiving device.

14. The method of clauses 1-13, wherein, while updating, the data receiving device is unable to perform one or more functions; and wherein the method further comprises, prior to receiving the confirmation of installation of the software or firmware update, performing the one or more functions on behalf of the data receiving device.

15. The method of clause 14, wherein the one or more functions include receiving data from the analyte sensor, processing data received from the analyte sensor, or generating alerts based on data received from the analyte sensor.

16. The method of clauses 1-15, wherein the application update package is received by the computing device from a commercial application storefront.

17. The method of clauses 1-16, further comprising, prior to receiving the confirmation of installation of the software or firmware update by the data receiving device:

determining that a predetermined period of time has elapsed since transmitting the software or firmware update to the data receiving device; and retransmitting the software or firmware update for the data receiving device to the data receiving device through the short-range wireless communication session with the data receiving device.

18. The method of clauses 1-17, further comprising:
generating, by the computing device, one or more integrity check values for the software or firmware update for the data receiving device; and
transmitting, by the computing device, the one or more integrity check values to the data receiving device, wherein the data receiving device installs the software or firmware update after validating the one or more integrity check values.

19. A computer-readable non-transitory storage media comprising instructions that are configured, when executed by one or more processors of a computing device, to perform operations comprising:
receiving, by the computing device, an application update package including an update for an application installed on the computing device and a software or firmware update for a data receiving device for an analyte sensor, wherein the application installed on the computing device is configured to communicate with or process data from the analyte sensor and the data receiving device comprises software or firmware configured to communicate with or process data from the analyte sensor;
establishing, by the computing device, a short-range wireless communication session with the data receiving device;
transmitting, by the computing device, the software or firmware update for the data receiving device to the data receiving device through the short-range wireless communication session with the data receiving device; and
receiving, by the computing device, confirmation of installation of the software or firmware update by the data receiving device.

20. A computing device comprising: one or more processors; and one or more computer-readable non-transitory storage media in communication with the one or more processors and comprising instructions that, when executed by the one or more processors, are configured to cause the computing device to perform operations comprising:
receiving, by the computing device, an application update package including an update for an application installed on the computing device and a software or firmware update for a data receiving device for an analyte sensor, wherein the application installed on the computing device is configured to communicate with or process data from the analyte sensor and the data receiving device comprises software or firmware configured to communicate with or process data from the analyte sensor;
establishing, by the computing device, a short-range wireless communication session with the data receiving device;
transmitting, by the computing device, the software or firmware update for the data receiving device to the data receiving device through the short-range wireless communication session with the data receiving device; and
receiving, by the computing device, confirmation of installation of the software or firmware update by the data receiving device.

What is claimed is:

1. A method for updating a data receiving device for a glucose sensor, the method comprising:
receiving, by a computing device, an application update package that includes a first update and a second update, wherein the first update is for updating an application installed on the computing device and the second update is for updating a software or firmware of the data receiving device, wherein the application installed on the computing device is configured to communicate with or process data from the glucose sensor, wherein the software or firmware of the data receiving device is configured to communicate with or process data from the glucose sensor, wherein the glucose sensor is configured to be transcutaneously positioned at least in part in contact with an interstitial fluid under a skin layer of a user;
installing, by the computing device, the first update for the application installed on the computing device;
establishing, by the computing device, a short-range wireless communication session with the data receiving device;
extracting, by the computing device, the second update from the application update package;
configuring, by the computing device, the second update for transmission using a communication protocol associated with the short-range wireless communication session;
transmitting, by the computing device, the second update that has been extracted from the application update package and configured for transmission to the data receiving device through the short-range wireless communication session; and
receiving, by the computing device, confirmation of installation of the second update for the software or firmware of the data receiving device.

2. The method of claim 1, wherein the data receiving device does not include wide area networking capability.

3. The method of claim 1, wherein the short-range wireless communication session is a Bluetooth, Bluetooth Low Energy, or near-field communication session.

4. The method of claim 1, further comprising, prior to receiving the application update package:
establishing, by the computing device, a second short-range wireless communication session with the data receiving device;
receiving identifying information for the data receiving device; and
registering the identifying information for the data receiving device with the application installed on the computing device.

5. The method of claim 4, wherein the application installed on the computing device is associated with a glucose monitoring system including the data receiving device, the glucose sensor, and an application server; and
wherein the method further comprises registering the identifying information for the data receiving device with the application server.

6. The method of claim 1, wherein the application installed on the computing device is associated with a glucose monitoring system including the data receiving device, the glucose sensor, and an application server; and
wherein the method further comprises receiving, by the computing device from the application server, a notification that the second update for the software or firmware of the data receiving device is available to be accessed by the computing device.

7. The method of claim 6, further comprising, subsequent to receiving the confirmation of installation of the second update for the software or firmware of the data receiving device, transmitting, by the computing device to the application server, a notification of installation of the software or firmware update by the data receiving device.

8. The method of claim 6, wherein the data receiving device and the glucose sensor are associated with a first user and the computing device is associated with a second user in a caregiving relationship with the first user.

9. The method of claim 1, further comprising notifying a user of the computing device and the data receiving device that the second update for the software or firmware of the data receiving device is available to be installed.

10. The method of claim 9, wherein notifying the user of the computing device and the data receiving device further comprises providing, by the computing device, instructions for facilitating an execution of the application update package.

11. The method of claim 1, wherein the second update for the software or firmware is performed by the data receiving device without notifying a user of the data receiving device.

12. The method of claim 1, further comprising causing the data receiving device to enter a safe mode of operation prior to installing the second update for the firmware or software.

13. The method of claim 1, further comprising encrypting the second update for the software or firmware prior to transmitting the second update to the data receiving device.

14. The method of claim 1, wherein, while updating, the data receiving device is unable to perform one or more functions; and
wherein the method further comprises, prior to receiving the confirmation of installation of the second update for the software or firmware, performing the one or more functions on behalf of the data receiving device.

15. The method of claim 14, wherein the one or more functions include receiving data from the glucose sensor, processing data received from the glucose sensor, or generating alerts based on data received from the glucose sensor.

16. The method of claim 1, wherein the application update package is received by the computing device from a commercial application storefront.

17. The method of claim 1, further comprising, prior to receiving the confirmation of installation of the second update for the software or firmware of the data receiving device:
determining that a predetermined period of time has elapsed since transmitting the second update to the data receiving device; and
retransmitting the second update to the data receiving device through the short-range wireless communication session with the data receiving device.

18. The method of claim 1, further comprising:
generating, by the computing device, one or more integrity check values for the second update for the software or firmware; and
transmitting, by the computing device, the one or more integrity check values to the data receiving device, wherein the data receiving device installs the second update for the software or firmware after validating the one or more integrity check values.

19. The method of claim 1, wherein configuring the second update for transmission using the communication protocol comprises compressing or segmenting data associated with the second update based on the communication protocol.

20. A computer-readable non-transitory storage media comprising instructions that are configured, when executed by one or more processors of a computing device, to perform operations comprising:
receiving, by the computing device, an application update package that includes a first update and a second update, wherein the first update is for updating an application installed on the computing device and the second update is for updating a software or firmware of a data receiving device associated with a glucose sensor, wherein the application installed on the computing device is configured to communicate with or process data from the glucose sensor, wherein the software or firmware of the data receiving device is configured to communicate with or process data from the glucose sensor, wherein the glucose sensor is configured to be transcutaneously positioned at least in part in contact with an interstitial fluid under a skin layer of a user;
installing, by the computing device, the first update for the application installed on the computing device;
establishing, by the computing device, a short-range wireless communication session with the data receiving device;
extracting, by the computing device, the second update from the application update package;
configuring, by the computing device, the second update for transmission using a communication protocol associated with the short-range wireless communication session;
transmitting, by the computing device, the second update that has been extracted from the application update package and configured for transmission to the data receiving device through the short-range wireless communication session; and
receiving, by the computing device, confirmation of installation of the second update for the software or firmware of the data receiving device.

21. A computing device comprising: one or more processors; and
one or more computer-readable non-transitory storage media in communication with the one or more processors and comprising instructions that, when executed by the one or more processors, are configured to cause the computing device to perform operations comprising:
receiving, by the computing device, an application update package that includes a first update and a second update, wherein the first update is for updating an application installed on the computing device and the second update is for updating a software or firmware a data receiving device associated with a glucose sensor, wherein the application installed on the computing device is configured to communicate with or process data from the glucose sensor, wherein the software or firmware of the data receiving device is configured to communicate with or process data from the glucose sensor, wherein the glucose sensor is configured to be transcutaneously positioned at least in part in contact with an interstitial fluid under a skin layer of a user;
installing, by the computing device, the first update for the application installed on the computing device;
establishing, by the computing device, a short-range wireless communication session with the data receiving device;
extracting, by the computing device, the second update from the application update package;
configuring, by the computing device, the second update for transmission using a communication protocol associated with the short-range wireless communication session;
transmitting, by the computing device, the second update that has been extracted from the application update package and configured for transmission to the data receiving device through the short-range wireless communication session; and
receiving, by the computing device, confirmation of installation of the second update for the software or firmware of the data receiving device.

* * * * *